US008322992B2

(12) United States Patent
Fuller

(10) Patent No.: US 8,322,992 B2
(45) Date of Patent: Dec. 4, 2012

(54) MODULAR WIND-DRIVEN ELECTRICAL POWER GENERATOR AND METHOD OF MANUFACTURE

(76) Inventor: Adam Fuller, Racine, WI (US)

( * ) Notice: Subject to any disclaimer, the term of this patent is extended or adjusted under 35 U.S.C. 154(b) by 1234 days.

(21) Appl. No.: 12/104,655

(22) Filed: Apr. 17, 2008

(65) Prior Publication Data

US 2008/0258468 A1    Oct. 23, 2008

Related U.S. Application Data

(60) Provisional application No. 60/923,862, filed on Apr. 17, 2007.

(51) Int. Cl.
*F03D 3/02*    (2006.01)

(52) U.S. Cl. ... 416/197 A; 415/4.2; 415/4.4; 416/200 R; 29/889.7

(58) Field of Classification Search .................. 415/4.2, 415/4.4, 905, 907; 416/194, 197 A, 200 R, 416/DIG. 4, DIG. 5; 290/44, 55; 29/889.7
See application file for complete search history.

(56) References Cited

U.S. PATENT DOCUMENTS

| 200,874 | A | * | 3/1878 | Robert | 416/234 |
|---|---|---|---|---|---|
| 727,762 | A | * | 5/1903 | Edgar | 416/178 |
| 1,200,308 | A | | 10/1916 | Bunnell | |
| 1,234,405 | A | | 7/1917 | Solomon | |
| 1,441,774 | A | | 1/1923 | Adams | |
| 1,812,741 | A | | 6/1931 | Espinosa | |
| 1,974,008 | A | | 9/1934 | Biehn | |
| 2,431,111 | A | | 11/1947 | Brie | |
| 4,079,264 | A | | 3/1978 | Cohen | |
| 4,134,707 | A | | 1/1979 | Ewers | |
| 4,220,870 | A | | 9/1980 | Kelly | |
| 4,245,958 | A | | 1/1981 | Ewers | |
| 4,288,200 | A | | 9/1981 | O'Hare | |
| 4,295,783 | A | * | 10/1981 | Lebost | 415/4.4 |
| 4,362,470 | A | * | 12/1982 | Locastro et al. | 416/197 A |
| 4,474,529 | A | | 10/1984 | Kinsey | |
| 4,486,143 | A | * | 12/1984 | McVey | 415/164 |
| 4,609,827 | A | | 9/1986 | Nepple | |
| 4,715,776 | A | | 12/1987 | Benesh | |
| 4,792,281 | A | | 12/1988 | Coleman | |
| 4,857,753 | A | | 8/1989 | Mewburn-Crook et al. | |
| 4,926,061 | A | * | 5/1990 | Arreola, Jr. | 290/55 |

(Continued)

OTHER PUBLICATIONS

Excerpt from the U.S. Department of Energy, Wind & Hydropower Technologies Program. "How Wind Turbines Work." 6 pages. Date: Nov. 30, 2006.

(Continued)

*Primary Examiner* — Ninh H Nguyen
(74) *Attorney, Agent, or Firm* — Jansson Shupe & Munger Ltd.

(57) ABSTRACT

A method of making a vane assembly for use in a modular wind-driven electrical power generator is disclosed. The method including the steps of: providing an axial shaft; securing a plurality of spaced-apart plates around the shaft, providing plural sheets of bendable material, each sheet for forming a vane; bending each sheet to create a vane; securing the upper and lower sides of each vane between two plates to form the vane assembly, each vane extending radially outward from the shaft so that the shaft is balanced during shaft rotational displacement about the axis, the closed leading side faces a direction of shaft rotation and the open trailing side faces a direction opposite to the direction of shaft rotation; and securing an end cap over each vane outboard end.

19 Claims, 67 Drawing Sheets

U.S. PATENT DOCUMENTS

| | | | |
|---|---|---|---|
| 5,037,268 A | 8/1991 | Fenlon | |
| 5,246,342 A | 9/1993 | Bergstein | |
| 5,320,491 A | 6/1994 | Coleman et al. | |
| 5,333,996 A | 8/1994 | Bergstein | |
| 5,336,933 A | 8/1994 | Ernster | |
| 5,354,175 A | 10/1994 | Coleman et al. | |
| 5,527,151 A | 6/1996 | Coleman et al. | |
| 5,527,152 A | 6/1996 | Coleman et al. | |
| 5,664,418 A | 9/1997 | Walters | |
| 6,015,258 A | 1/2000 | Taylor | |
| 6,693,409 B2 | 2/2004 | Lynch et al. | |
| 6,857,846 B2 | 2/2005 | Miller | |
| 6,948,905 B2 | 9/2005 | Horjus | |
| 6,966,747 B2 | 11/2005 | Taylor et al. | |
| 6,984,899 B1 | 1/2006 | Rice | |
| 7,008,171 B1 | 3/2006 | Whitworth | |
| 7,075,192 B2 | 7/2006 | Bywaters et al. | |
| 7,109,600 B1 | 9/2006 | Bywaters et al. | |
| 7,119,453 B2 | 10/2006 | Bywaters et al. | |
| 7,145,266 B2 | 12/2006 | Lynch et al. | |
| 7,183,665 B2 | 2/2007 | Bywaters et al. | |
| 7,189,050 B2 | 3/2007 | Taylor et al. | |
| 7,347,660 B2 | 3/2008 | Taylor et al. | |
| 7,759,812 B2 | 7/2010 | Taylor et al. | |
| 7,896,608 B2 * | 3/2011 | Whitworth et al. | 415/4.2 |
| 2007/0029807 A1 | 2/2007 | Kass | |

OTHER PUBLICATIONS

American Wind Energy Association. "What are the Basic Wind Turbine Configurations?" 2 pages. Date: Copyright 1998.

Danish Wind Industry Association. "Gearboxes for Wind Turbines." 3 pages. Date: Copyright 1997-2003. Updated Sep. 19, 2003.

Alxion Automatique & Productique. "STK Wind Turbine Alternators." 6 pages. Date: Undated.

U.S. Department of Energy. "Wind Partnerships for Advanced Component Technology: WindPACT Advanced Wind Turbine Drivetrain Designs." 1 page. Date: Mar. 2006.

U.S. Department of Energy. "Low Wind Speed Technology Phase II: Development of a 2-MW Direct-Drive Wind Turbine for Low Wind Speed Sites." 1 page. Date: Mar. 2006.

* cited by examiner

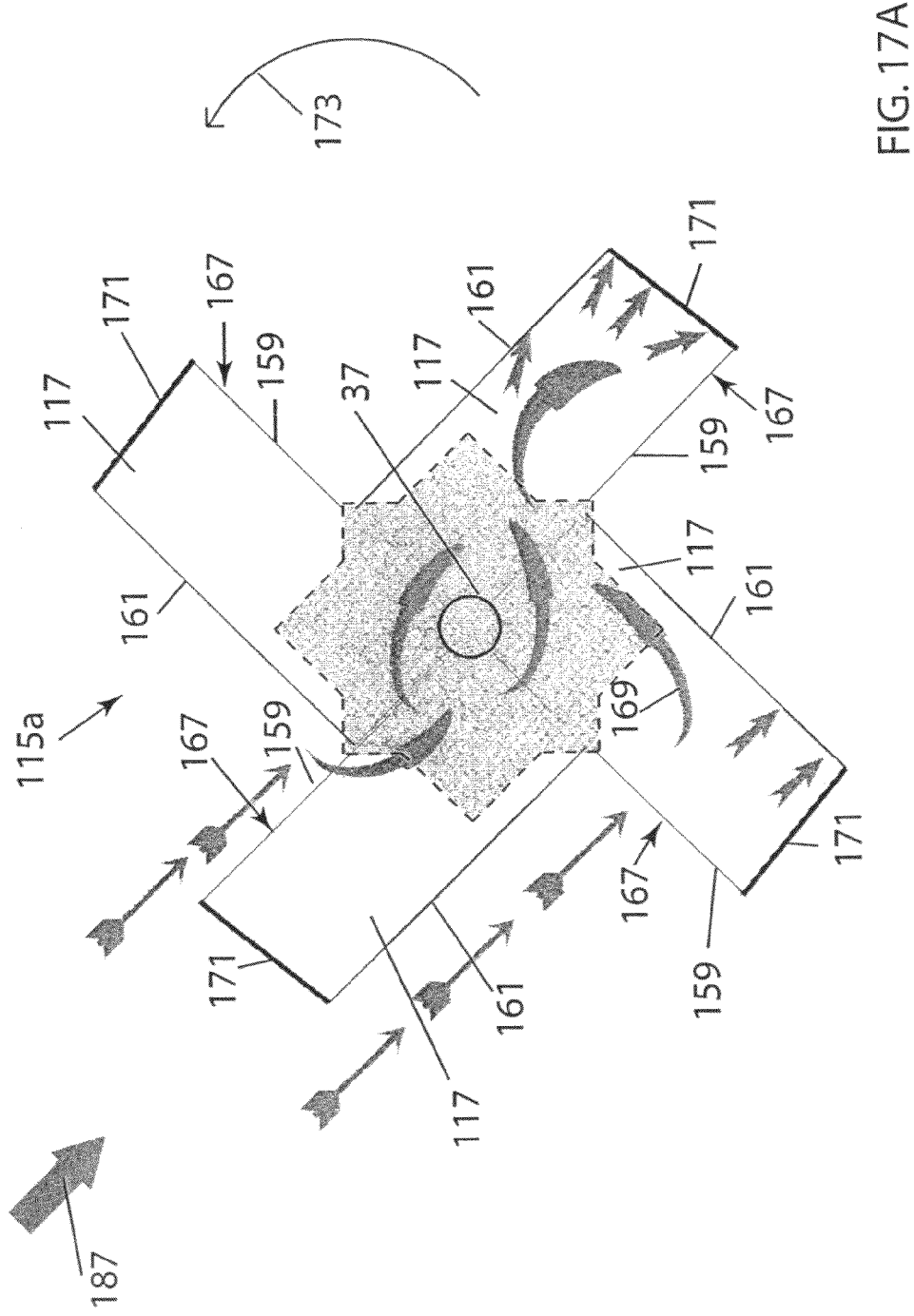

TYPICAL BEARING ASSEMBLY DETAIL

MODULAR WIND-DRIVEN ELECTRICAL POWER GENERATOR AND METHOD OF MANUFACTURE

RELATED APPLICATIONS

This application claims the benefit of U.S. Provisional Application No. 60/923,862, filed Apr. 17, 2007.

BACKGROUND

There is an ongoing need for production of electrical power from renewable and non-polluting energy sources, such as wind energy. The present invention relates to improvements in wind-driven electrical power generation and methods of manufacturing modular wind-driven electrical power generator apparatus.

BRIEF DESCRIPTION OF THE DRAWINGS

Exemplary modular wind-driven electrical power generator apparatus and methods of manufacture may be understood by reference to the following description taken in conjunction with the accompanying drawings, in which like reference numerals identify like elements throughout the different views. For convenience and brevity, like reference numbers are used for like parts amongst the alternative embodiments. The drawings are not necessarily to scale, emphasis instead being placed upon illustrating the principles of the invention. In the accompanying drawings:

FIGS. 17A, 17B and 17C are schematic illustrations of a four vane portion of a vane assembly at different positions relative to wind direction and showing exemplary air flow paths;

Figure 1:
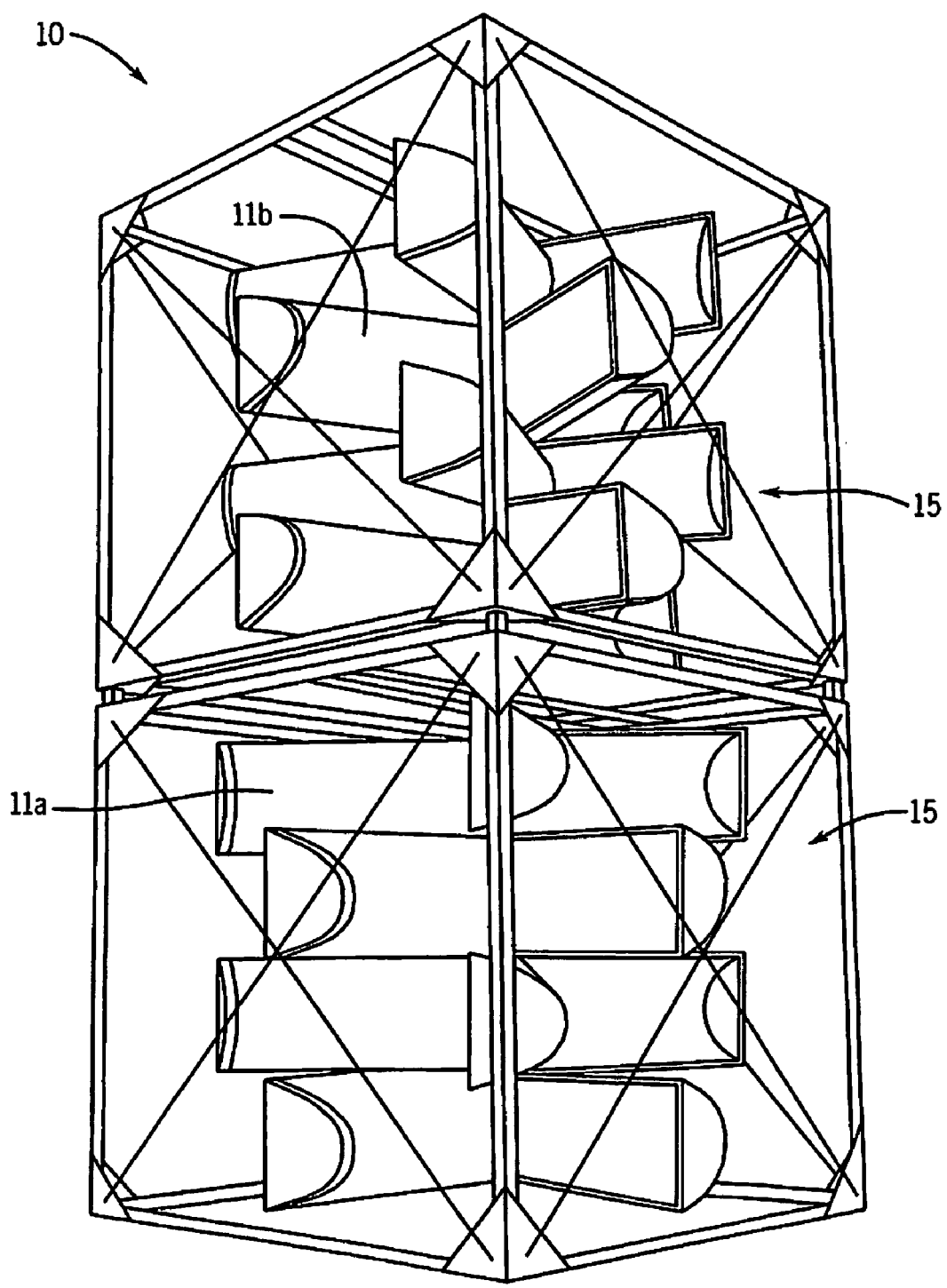
FIGS. 1-2 are perspective views of exemplary drive modules of an exemplary modular wind-driven electrical power generator apparatus.

While the apparatus and methods are susceptible to various modifications and alternative forms, specific embodiments thereof have been shown by way of example in the drawings and are herein described in detail. It should be understood, however, that the description herein of specific embodiments and methods is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Figure 24:
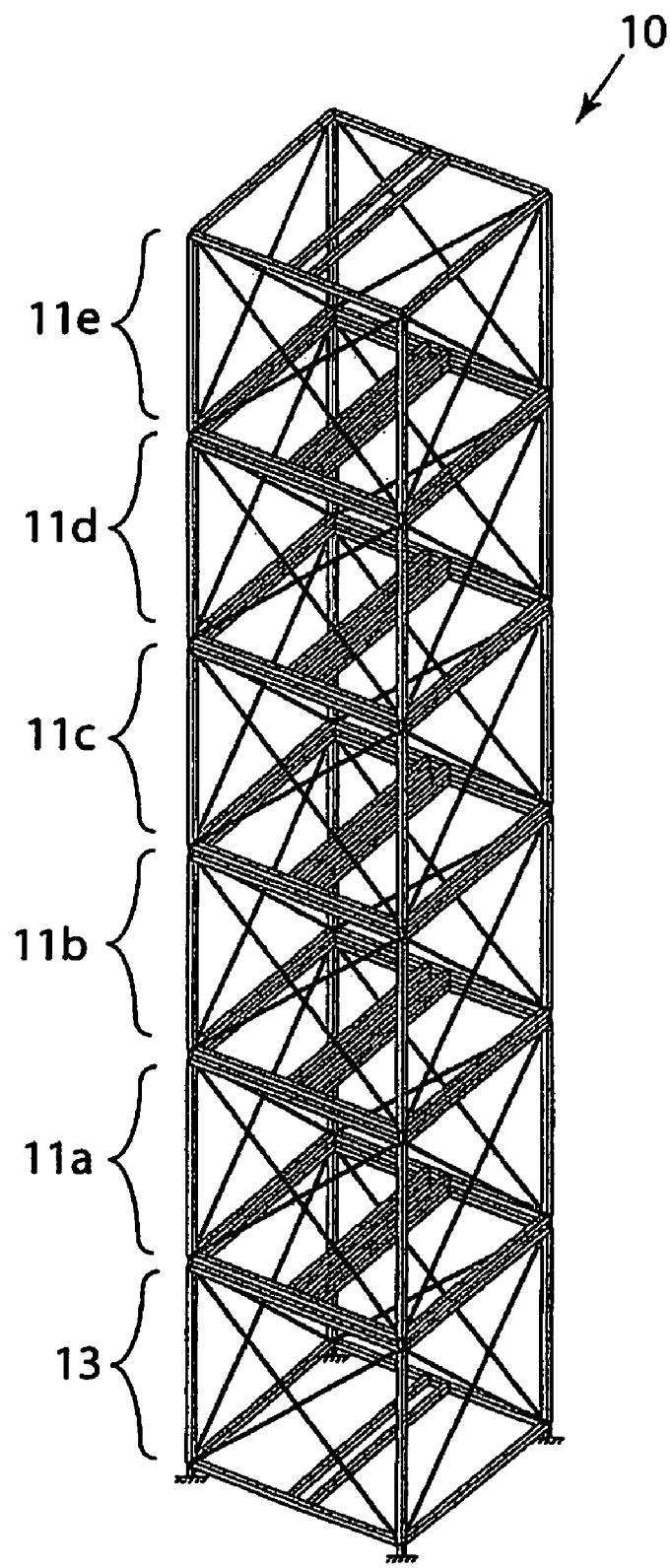
FIG. 24 is a perspective view of drive and generator module frames joined together to provide the framework of an erected exemplary unguyed-type modular wind-driven electrical power generator apparatus including modules of the type shown in FIGS. 1-3, 16, and 18-21.
Figure 25:
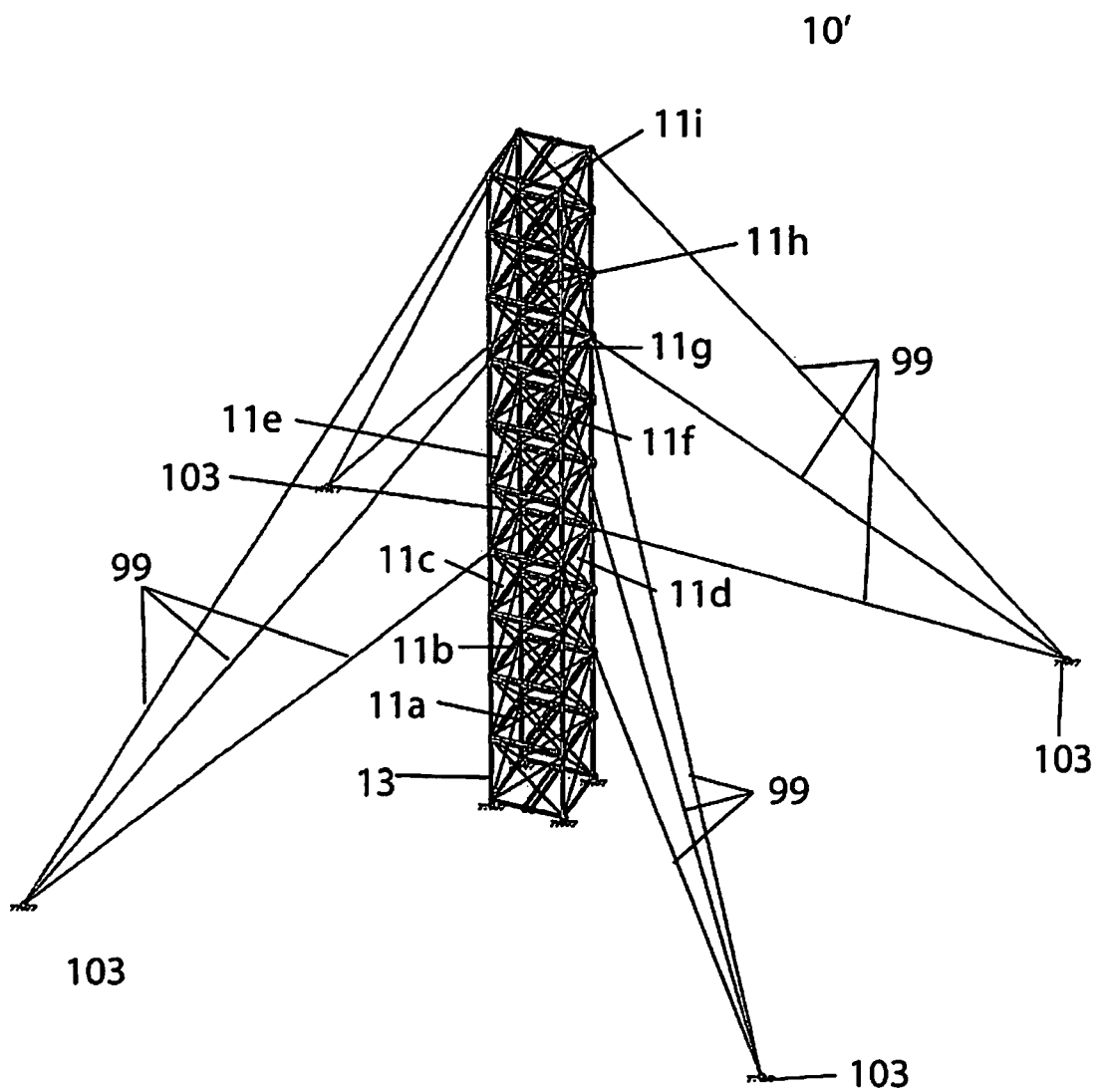
FIG. 25 is a perspective view of drive and generator module frames joined together to provide the framework of an erected exemplary guyed-type modular wind-driven electrical power generator apparatus including modules of the type shown in FIGS. 1-3, 16, and 18-21.
Figure 26:
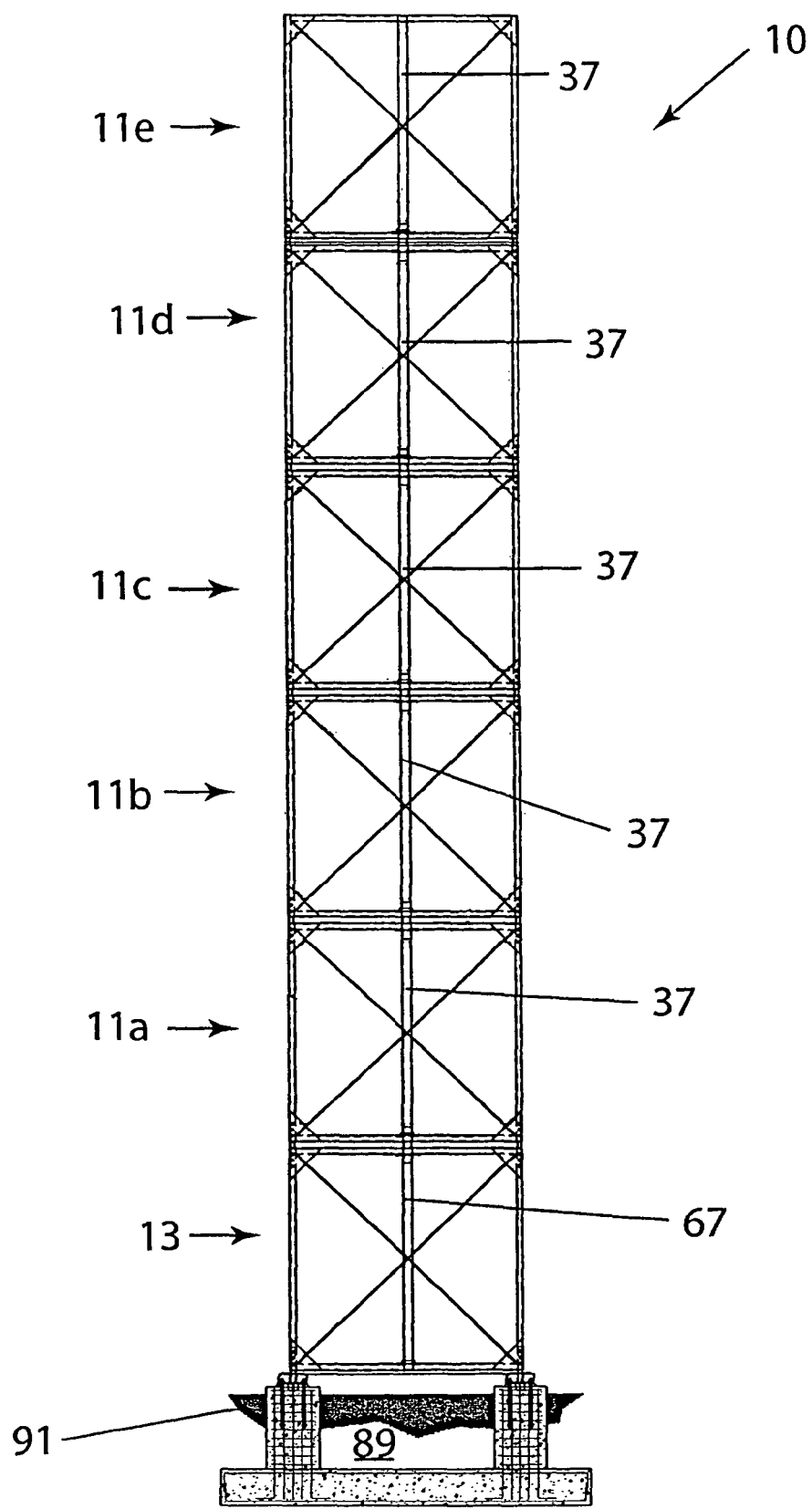
FIG. 26 is a side elevation view of the framework of FIG. 24.
Figure 27:
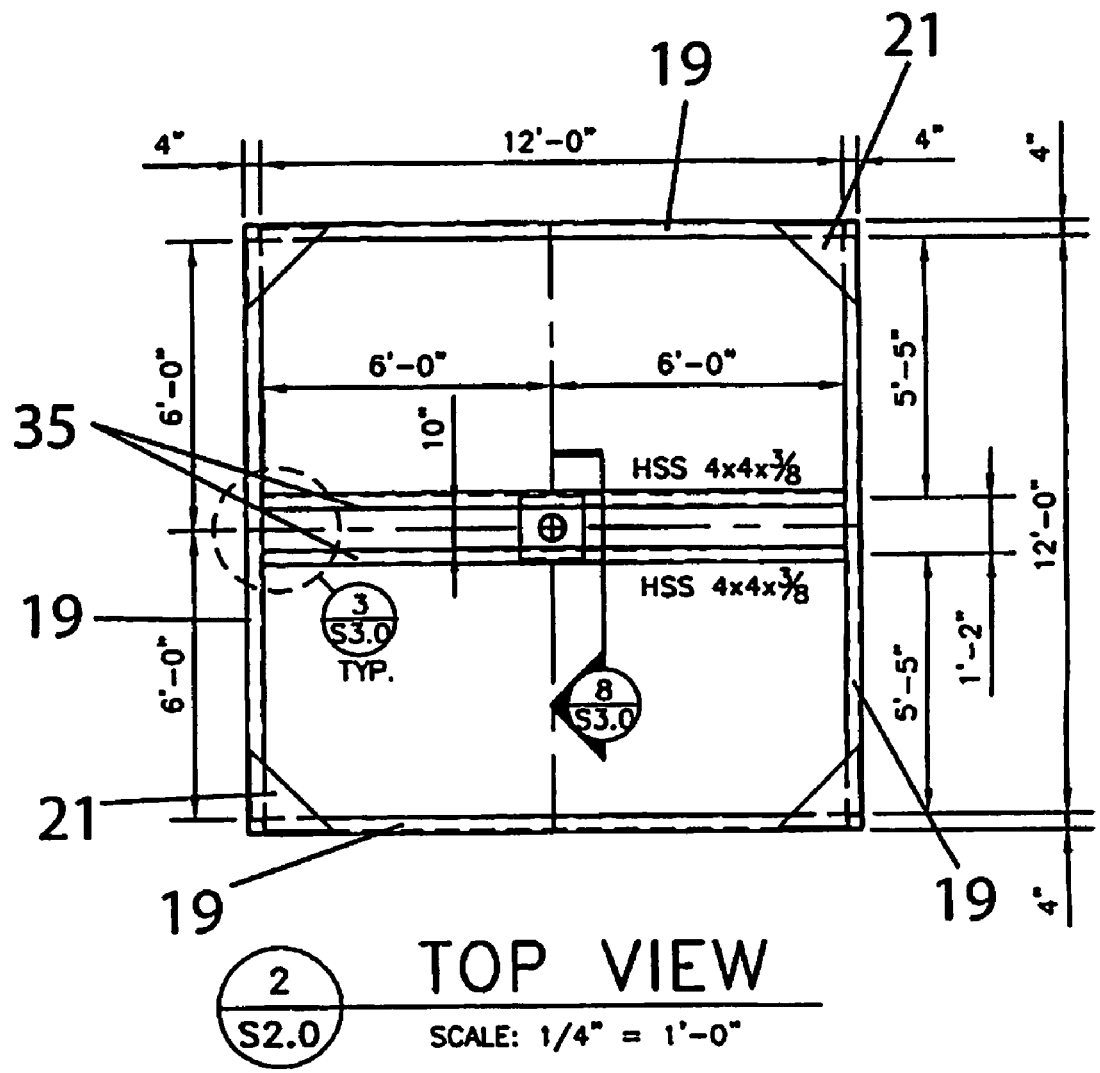
FIG. 27 is a top view of the framework of FIG. 24.
Figure 28:
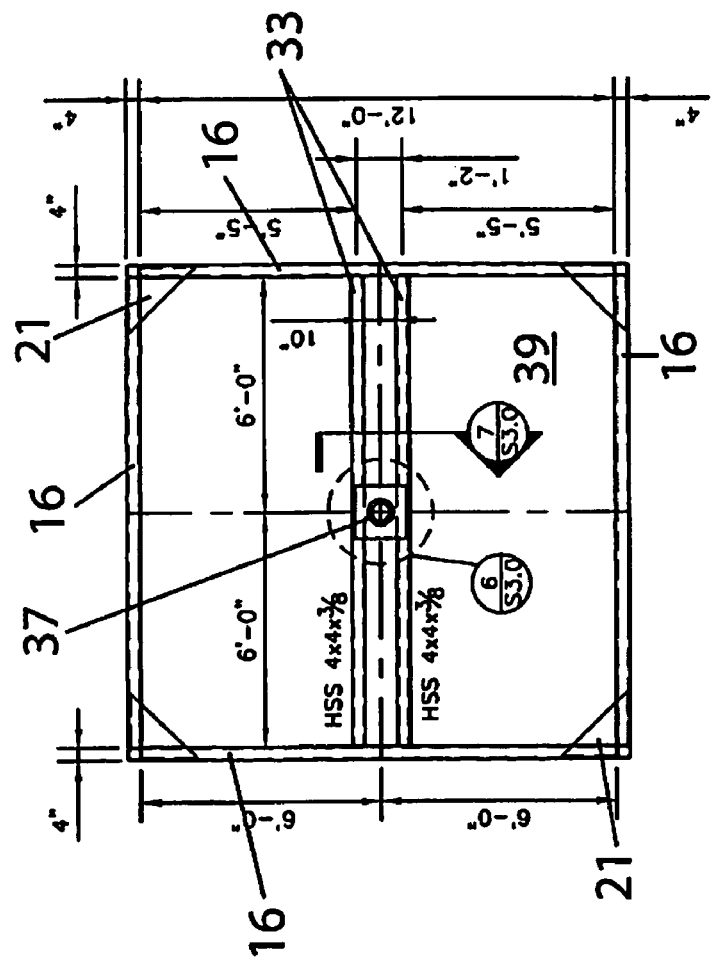
FIG. 28 is a bottom view of a drive module of FIG. 24.
Figure 29:
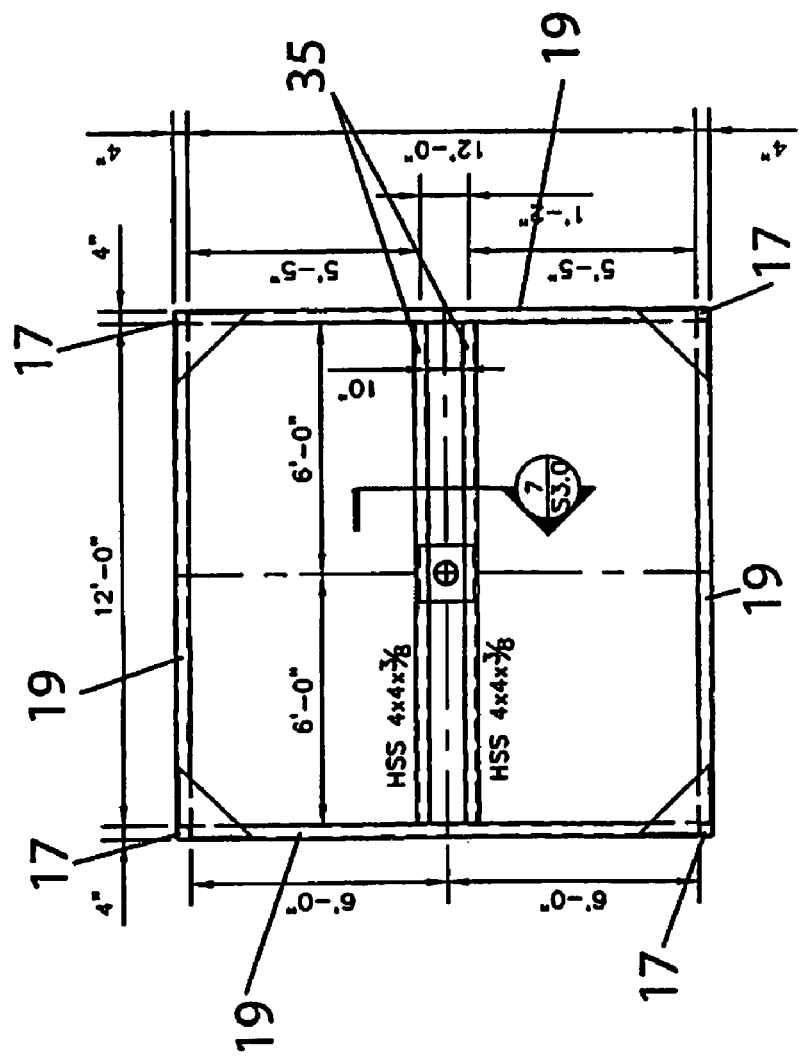
FIG. 29 is a top view of a drive module of FIG. 24.
Figure 30:
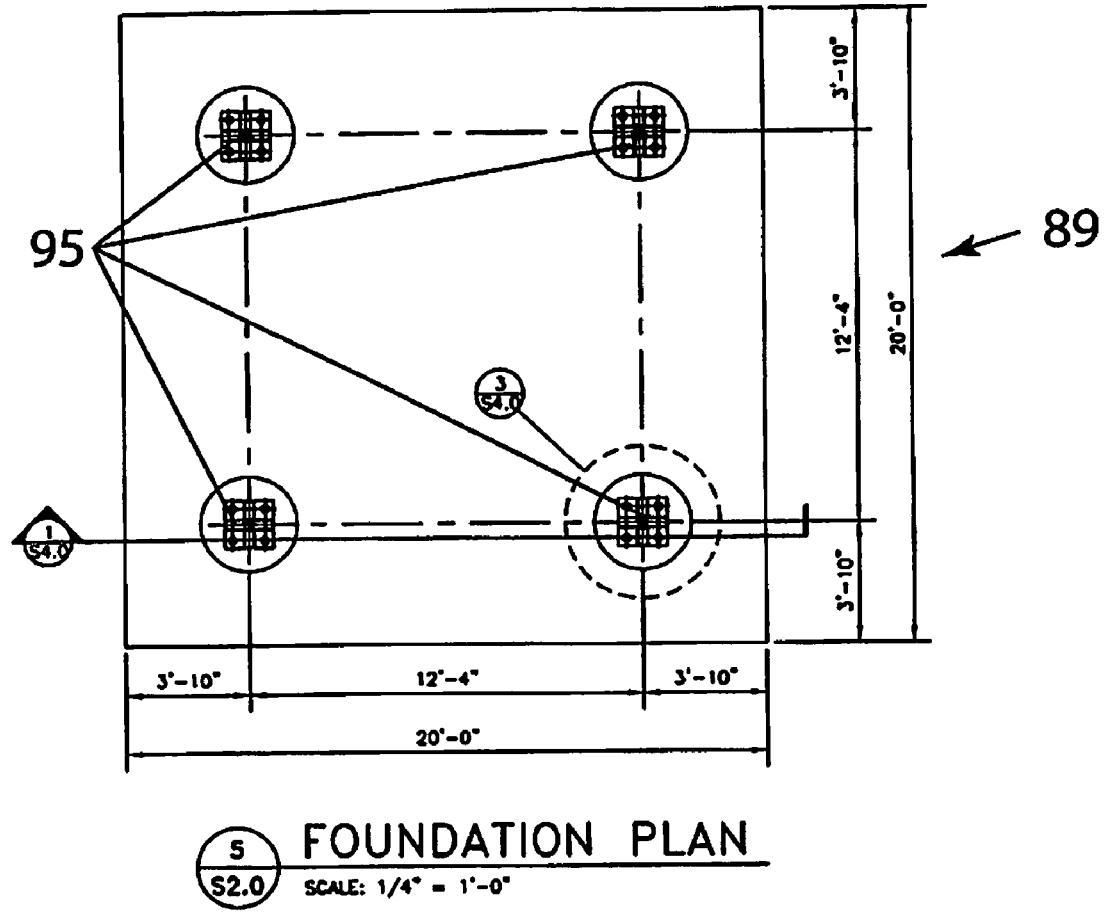
FIG. 30 is top view of the foundation plan for the framework of FIG. 24.
Figure 31:
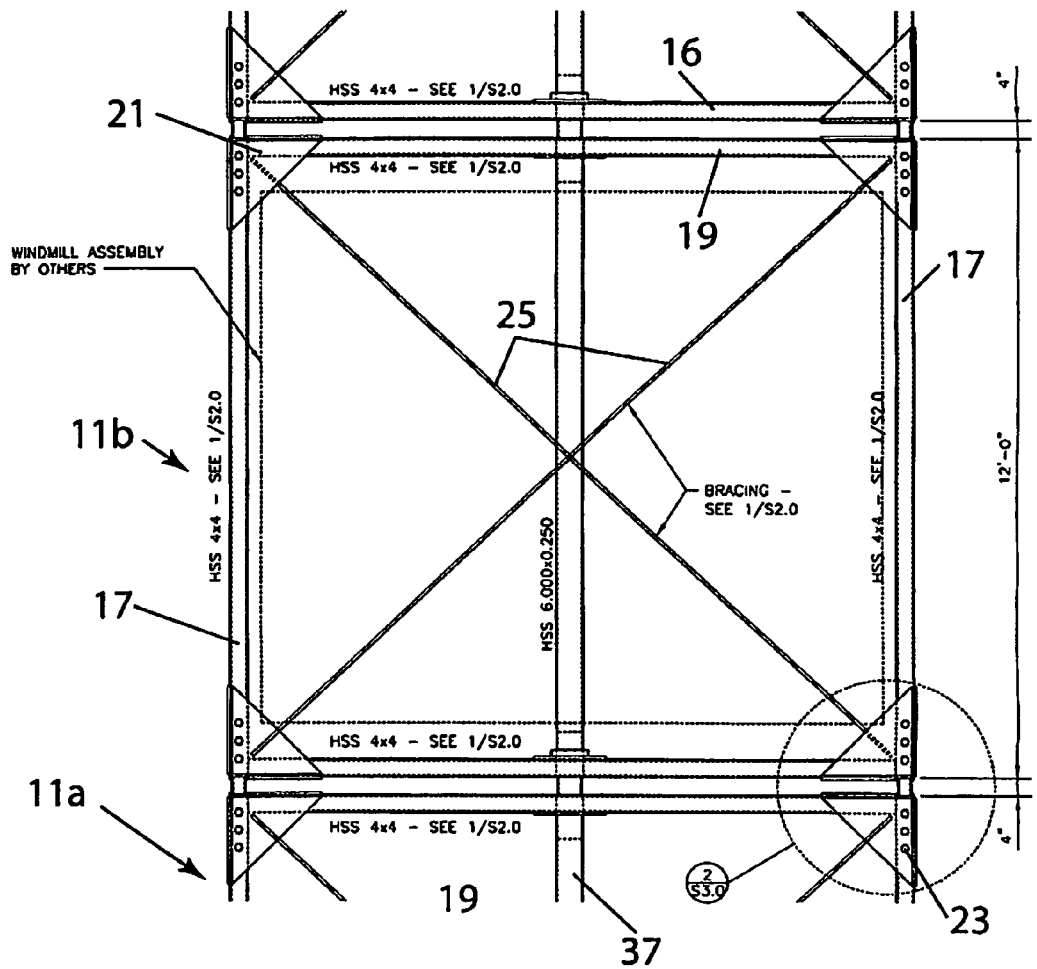
FIG. 31 is a partial side elevation view of the framework of FIG. 24.
Figure 32:
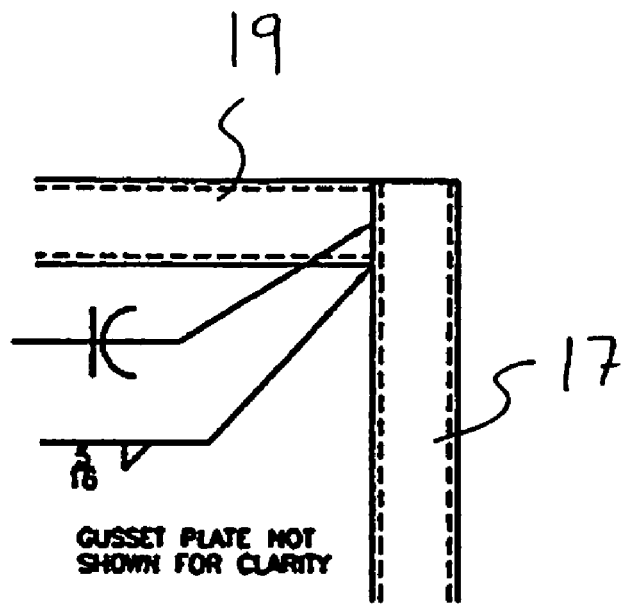
FIG. 32 is a partial side view of a corner of a drive module of FIG. 24 with gussets plates removed for clarity.
Figure 33:
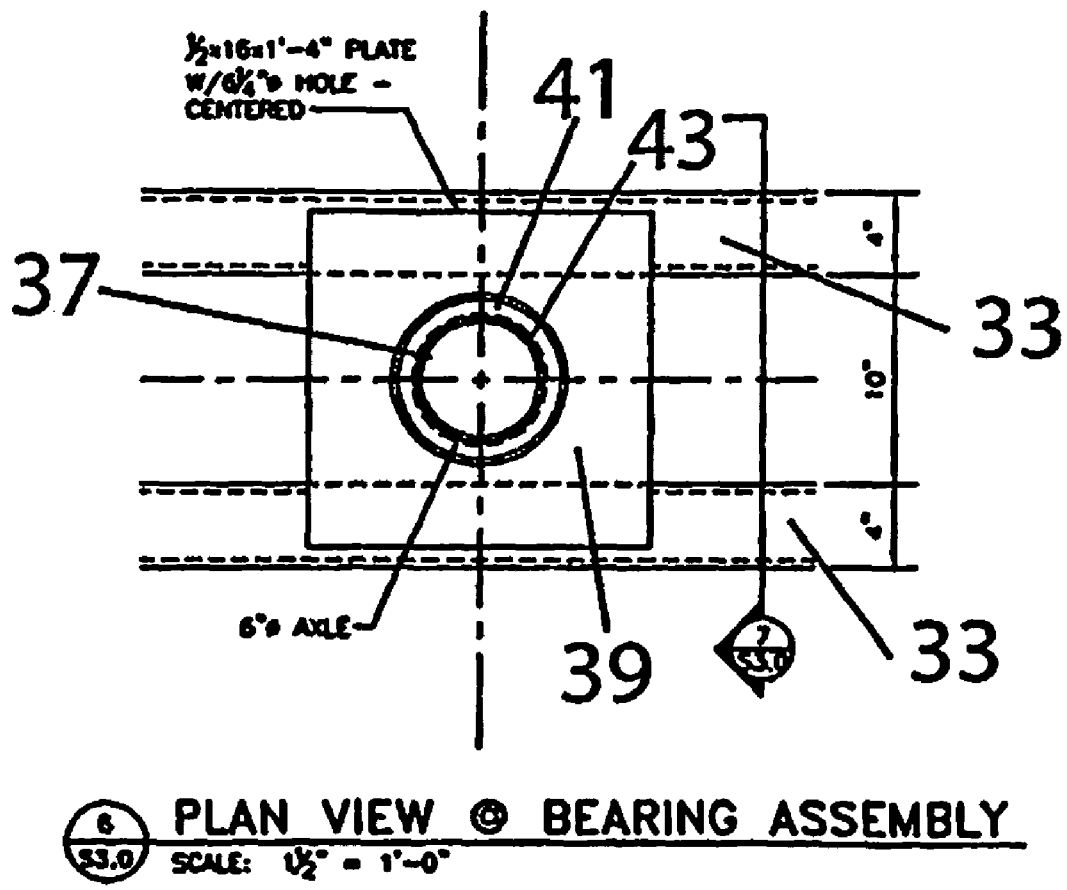
FIG. 33 is a partial top view of the shaft and bearing assembly of a drive module of FIG. 24.

Referring first to FIGS. 1-3, 16, and 18-21, those figures show exemplary modules for use in modular wind-driven electrical power generator apparatus embodiments 10 and 10'. The wind-driven electrical power generator 10 comprises one or more drive modules 11a, 11b (two shown in FIGS. 1-3, and 16) and a generator module 13. Additional drive modules 11a-11i may be utilized as illustrated in FIGS. 24-25. The drive modules 11a-11i are stacked one-on-top of the other and on top of a generator module 13. The drive and generator modules 11a-11i, 13 shown in the examples preferably have identical cube-shaped configurations which are vertically aligned for stacking and secured together to provide wind-driven electrical power generators 10, 10'. In the embodiments, generator module 13 is provided as the lowermost module of wind-driven electrical power generators 10,10'. Drive modules 11a-11i are stacked one-on-top of the other on the generator module 13.

As noted, any number of drive modules 11a-11i may be stacked together to provide the wind-driven electrical power generator. For example, FIGS. 24 and 26-42 illustrate an unguyed-type wind-driven electrical power generator embodiment 10 including the drive modules of FIGS. 1-3. Five drive modules 11a-11e (and one generator module 13) are utilized as illustrated in FIG. 24. By way of further example, FIGS. 25 and 43-61 illustrate a guyed-type wind-driven electrical power generator embodiment 10', also incorporating drive modules of the type shown in FIGS. 1-3 but including nine drive modules 11a-11i (and one generator module 13). The number of drive modules (e.g., drive module 11a) selected will be determined based on the particular application.

The structure of preferred drive module embodiments (e.g., drive modules 11a-11i) is illustrated in FIGS. 1-3, 16, 27-29, 31, 37, 43 and 49. Each drive module 11a-11i supports a vane assembly 15 including stacks of rotors as described in more detail herein. Each vane assembly 15 of the drive modules 11a-11i is driven by the wind to convert wind energy into shaft power, or torque, which can be converted to electrical energy by generator module 13.

In the examples, each drive module 11a-11i consists of an identical tubular metal frame consisting of four lower rails 16, four side rails 17, and four upper rails 19 (FIGS. 16, 27-29, 31. In the examples, rails 16, 17, 19 are sized to produce a cube-type frame having dimensions of 12'×12'×12'. Each frame comprising a drive module 11a-11i is preferably identical, thereby facilitating stacking and reducing manufacturing cost. While cube-shaped drive modules are preferred, there is no particular requirement with respect to the shape and size of the drive modules as such modules can be configured and scaled to meet end-user requirements.

Lower and upper rails 16, 19 are secured together at each corner, preferably by welding, as shown in FIGS. 1-3 and 16. Side rails 17 are attached to the respective corners, again preferably by welding, to provide each preferred cube-shaped module 11a-11i. A preferred material for use in fabrication of lower, side, and upper rails 16, 17, 19 is 4"×4"×⅜" A500 grade tubular steel. As shown in FIGS. 1-3, 26-29, 31, 37, 43 and 49, gussets 21 are welded to the lower, upper, and side rails 16, 17, 19 at each corner to reinforce each drive module 11a-11i. As illustrated in FIGS. 16, 31, 35, 37 and 49, each side rail 17 may also be connected to gussets 23 by bolts 23. Brace rods 25 welded to opposite gussets 21 are tensioned by turnbuckles 27 to further provide rigidity to drive modules 11a-11i.

As shown in FIGS. 1-3, 16, 37 and 49 adjacent drive modules (e.g., modules 11a, 11b) are connected together at each corner in stacked relationship by means of connecting pins 29 fitted into sleeves 31 provided in vertically-aligned adjacent side rails 17 (Sleeves 31 may be defined by the inner walls of tubular-type side rails 17 and/or 55). Pins 29 have an outer dimension which fits closely within an inner dimension of the tubular side rails 17. In the exemplary embodiments shown, pins 29 are 3"×3"×⅜"×4' hardened stainless or galvanized tubular steel thereby fitting snugly within the corresponding tubular side rails 17. Pins 29 are held in place at each corner by bolts 23 located through gussets 21.

Figure 34:
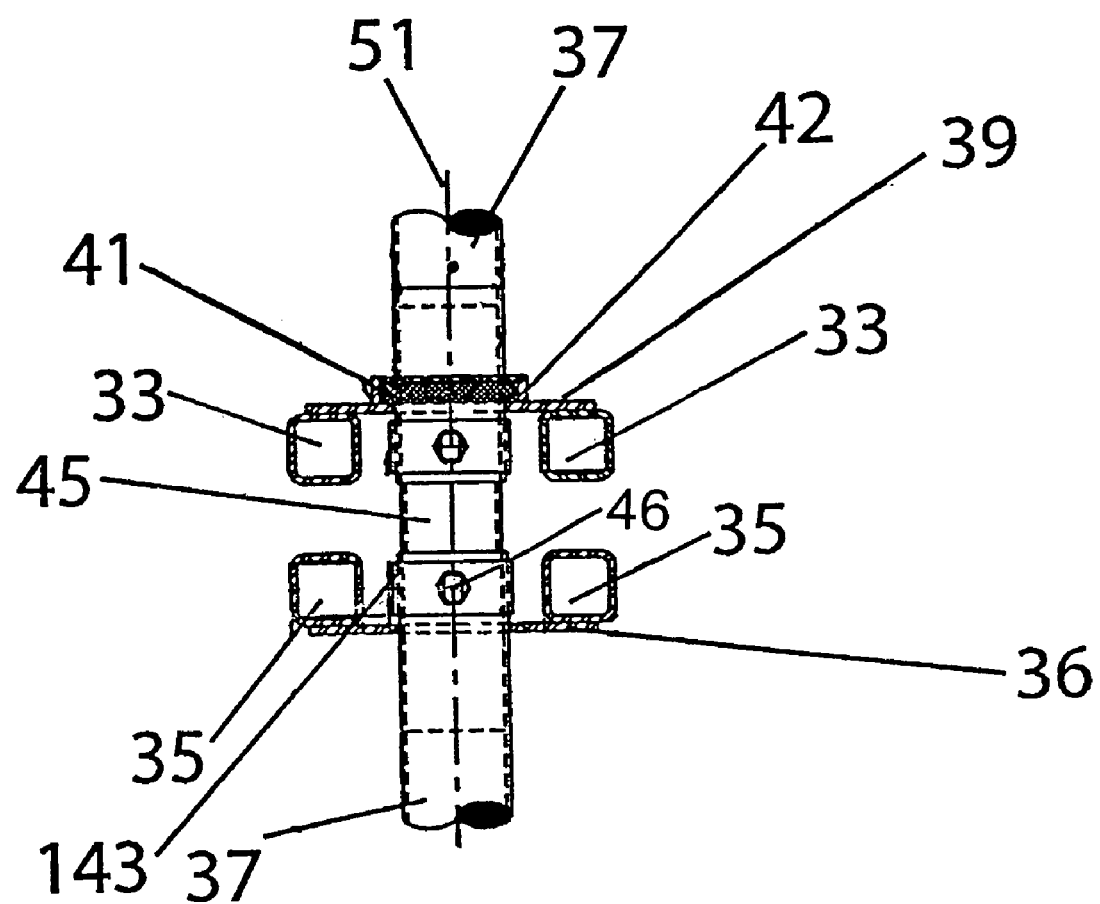
FIG. 34 is a cutaway side view of the shaft connection between two drive modules of FIG. 24.
Figure 35:
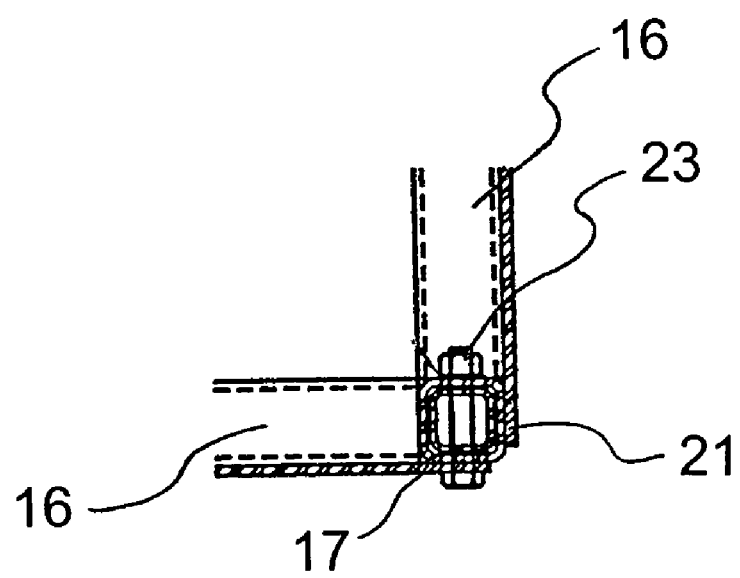
FIG. 35 is a cutaway partial top view of a corner of a drive module of FIG. 24.
Figure 36:
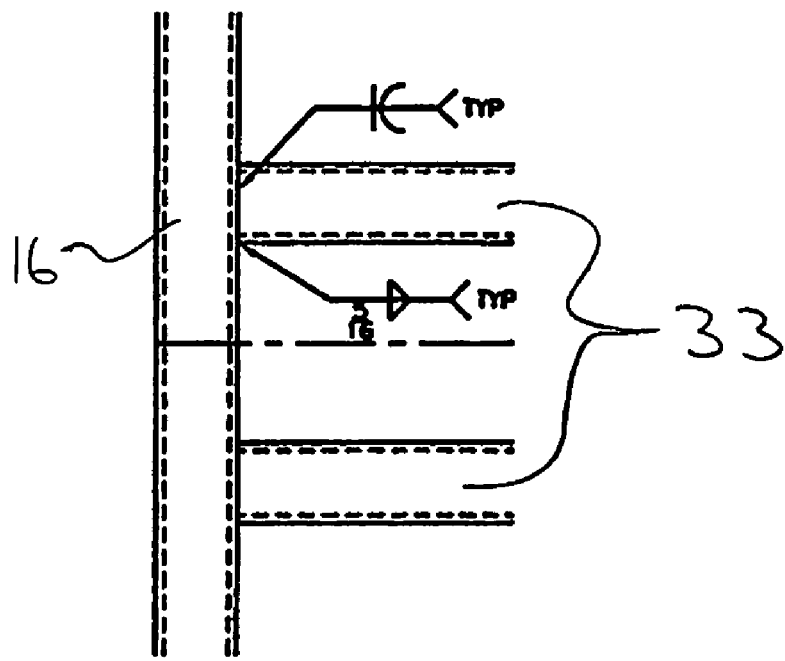
FIG. 36 is a partial bottom view of the lower frame rail and lower cross rails of a drive module of FIG. 24.
Figure 37:
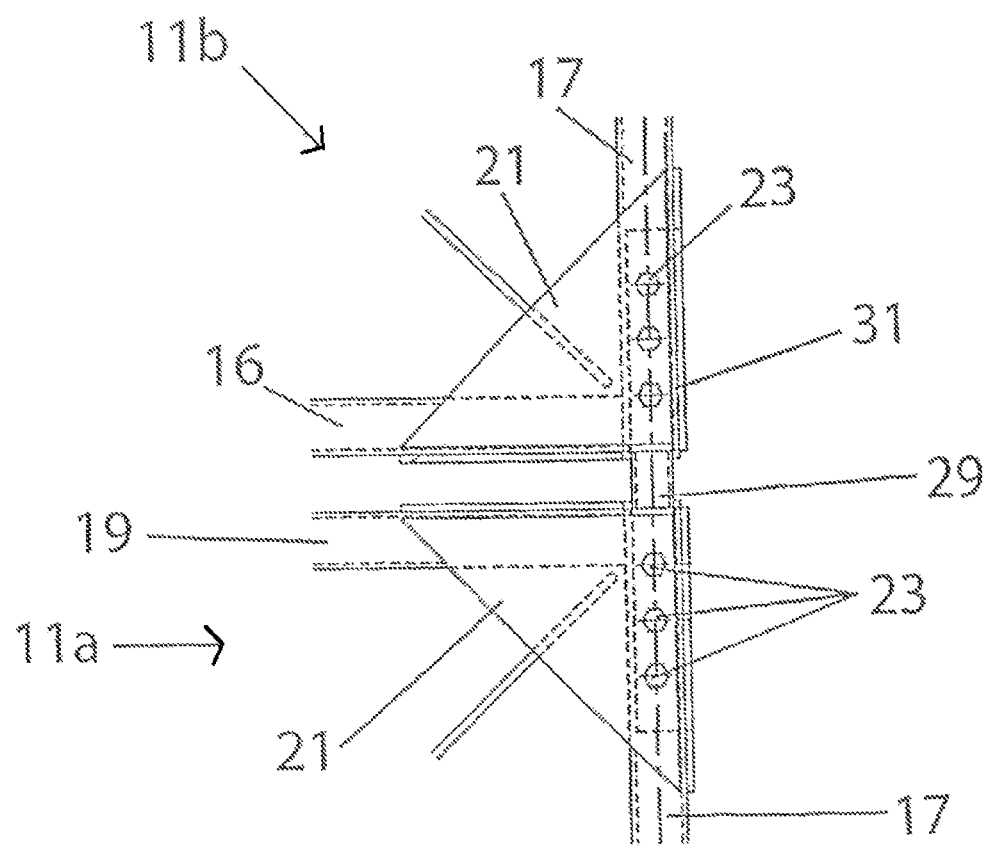
FIG. 37 is a partial side view of the corner connection between two modules of FIG. 24.
Figure 46:
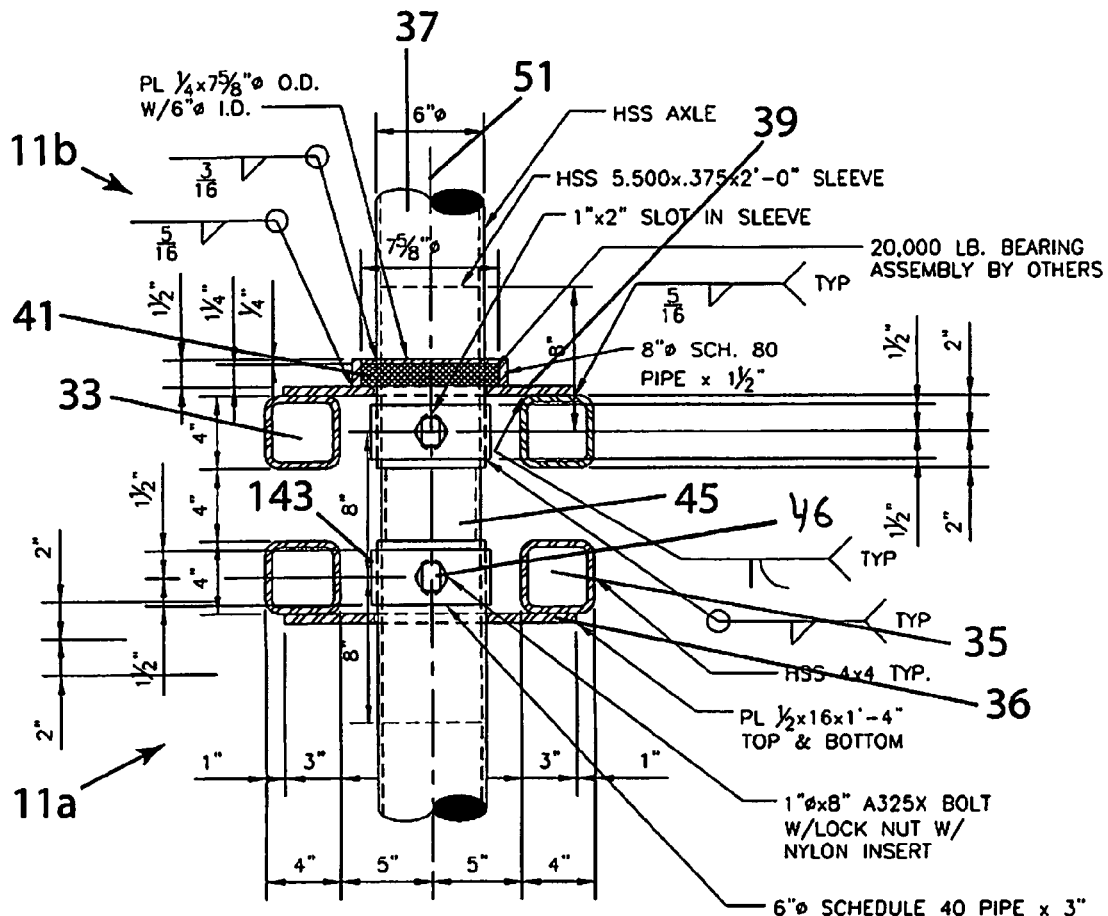
FIG. 46 is a cutaway side view of the shaft connection between two drive modules of FIG. 25.
Figure 47:
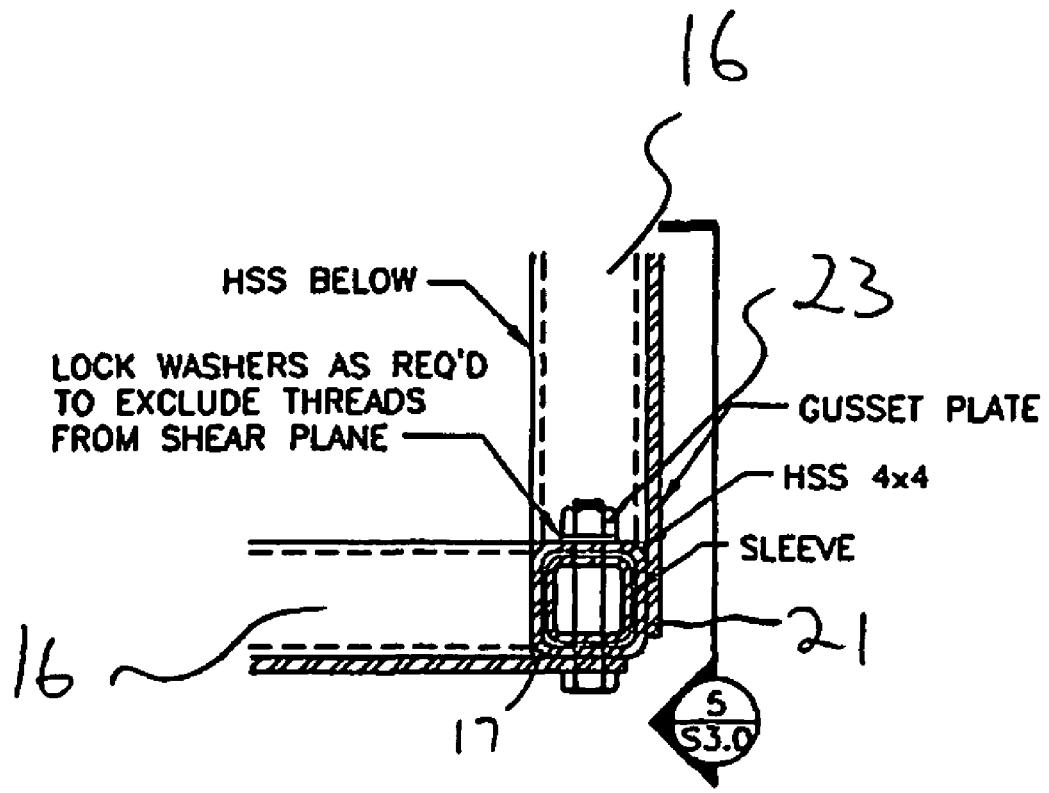
FIG. 47 is a cutaway partial top view of a corner of a drive module of FIG. 25.
Figure 48:
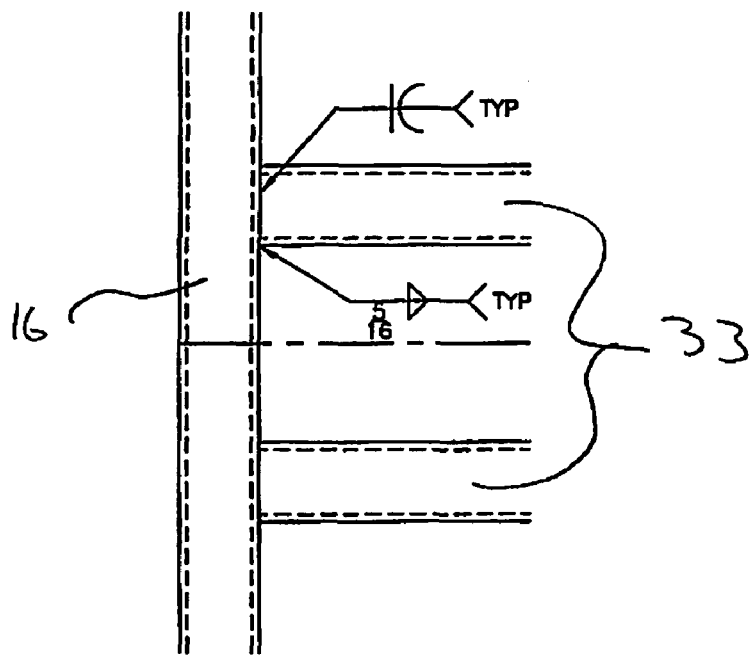
FIG. 48 is a bottom view of the lower frame rail and lower cross rails of a drive module of FIG. 25.
Figure 49:
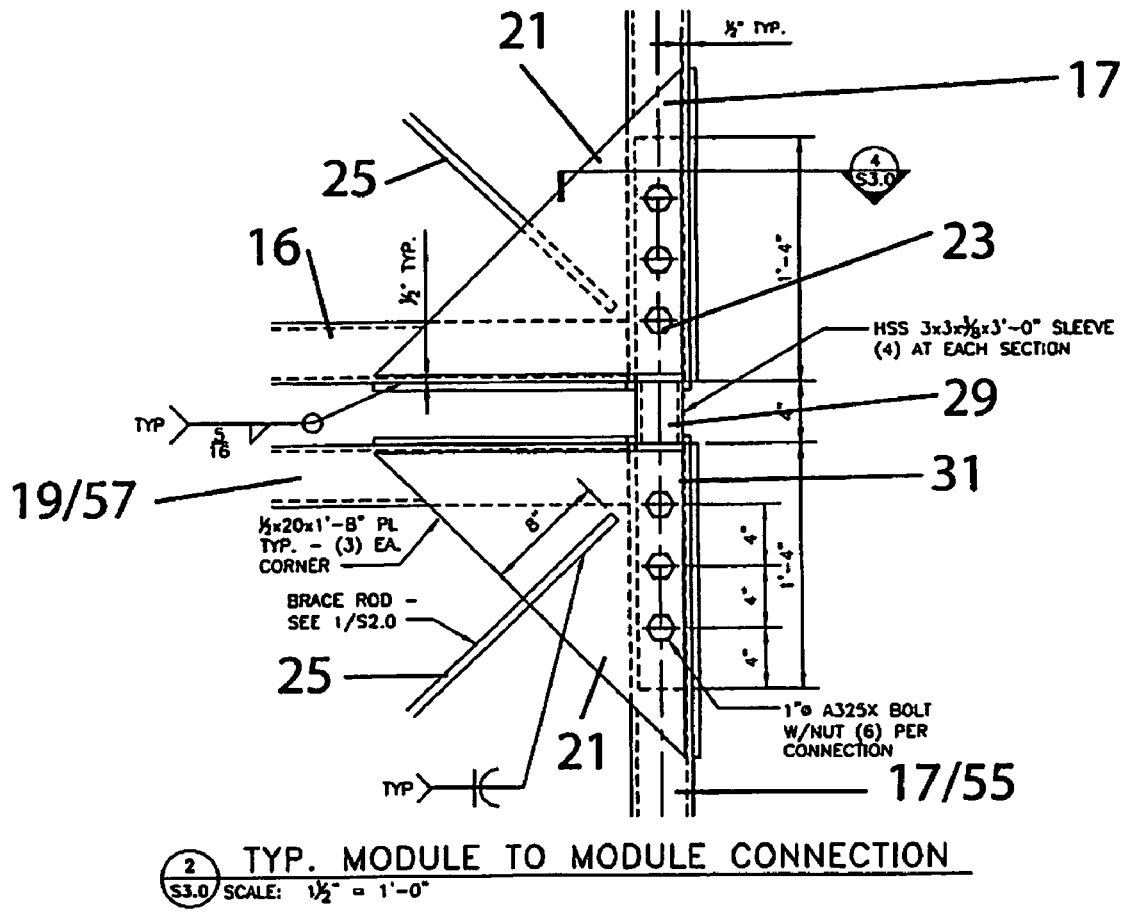
FIG. 49 is a partial side view of the corner connection between two modules of FIG. 25.

Referring again to FIGS. 1-3 and to FIGS. 24-25, 27-29, 33 and 45, each drive module 11a-11i includes a set of lower cross rails 33 which span between a parallel pair of the bottom rails 16 and a pair of upper cross rails 35 which span between a parallel pair of the upper cross rails 19. Each set of cross rails 33, 35 is spaced apart sufficiently to permit axial shaft 37 to pass therebetween. Shaft upper end 143 is positioned through an opening in plate 36 secured to upper cross rails 33 as shown in FIGS. 34 and 46. The opening in plate 36 is sized to be slightly larger than shaft 37 so that there is no contact between plate 36 and shaft 37 during operation. Plate 36 holds shaft upper end 143 upright after manufacture and prior to assembly of the wind-driven electrical power generator apparatus embodiments 10 and 10' as described in more detail below.

As illustrated in FIGS. 28, 33-34 and 45-46, a plate 39 is welded to lower cross rails 33. A thrust bearing 41 (for example a 20,000 pound bearing) secured by sleeve 42 attached to plate 39 supports shaft 37 positioned through opening 43 in plate 39. A suitable thrust bearing 41 is a model XW-6 bearing available from Consolidated Bearing Co. of Cedar Knolls, N.J. As explained below, annular collar 147 (FIG. 5) on shaft 37 proximate shaft lower end 145 supports shaft 37 on thrust bearing 41 and serves to limit lateral movement of shaft 37 in bearing 41. The vane assembly 15 of each drive module 11a-11i is supported on shaft 37 also as described in more detail below. Shaft 37 may, for example, be made of 6" OD×12'×¼" wall steel tube. An internal sleeve 45 internal to each shaft 37 of adjacent drive modules (e.g., modules 11e, 11d) secures the shaft 37 of each module 11a-11i together in an axially and vertically aligned position as illustrated in FIGS. 34 and 46. Sleeve 45 may be bolted to each shaft 37 via bolts 46. As a result of connection by sleeve 45, each shaft 37 of modules 11a-11i is secured together for co-rotation about rotational axis 51 to drive power generator module 13 drive shaft 67 as explained in more detail below.

Figure 38:
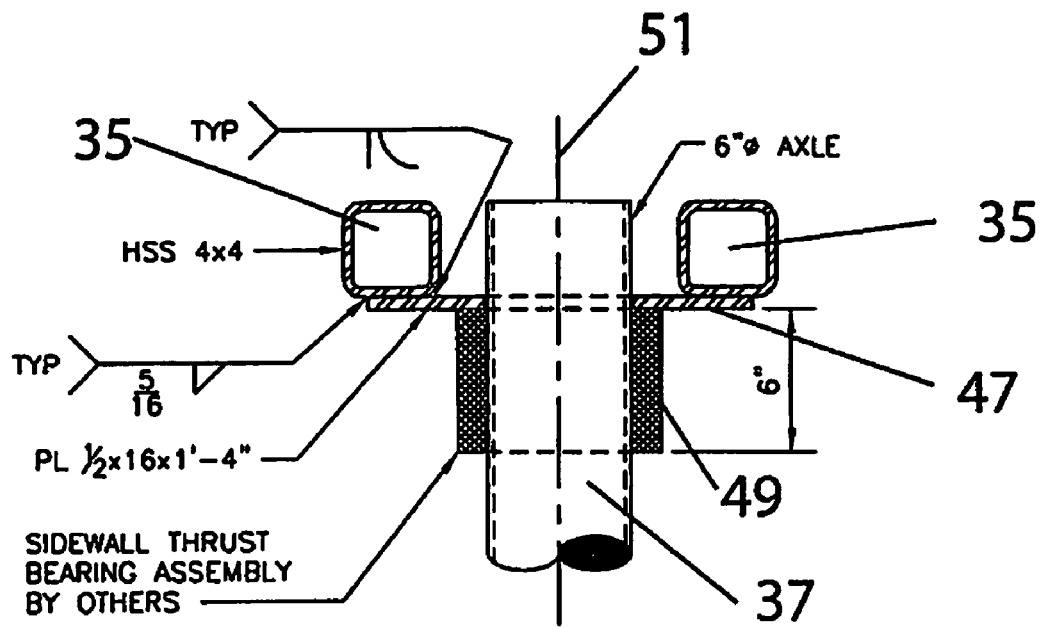
FIG. 38 is a partial cutaway side view of the shaft and bearings of a drive module of FIG. 24.
Figure 39:
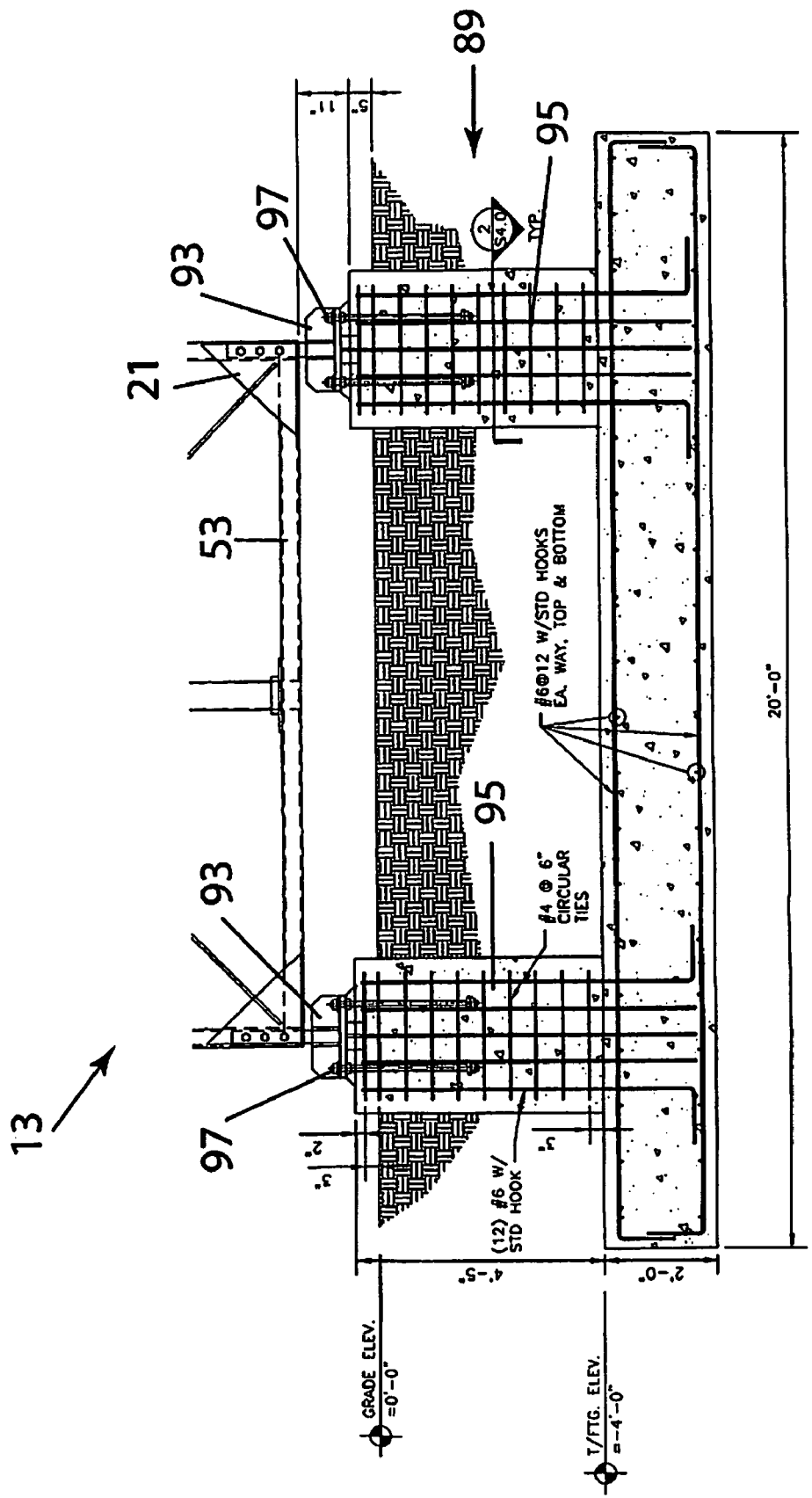
FIG. 39 is a cutaway side view of the foundation of the framework of FIG. 24.
Figure 40:
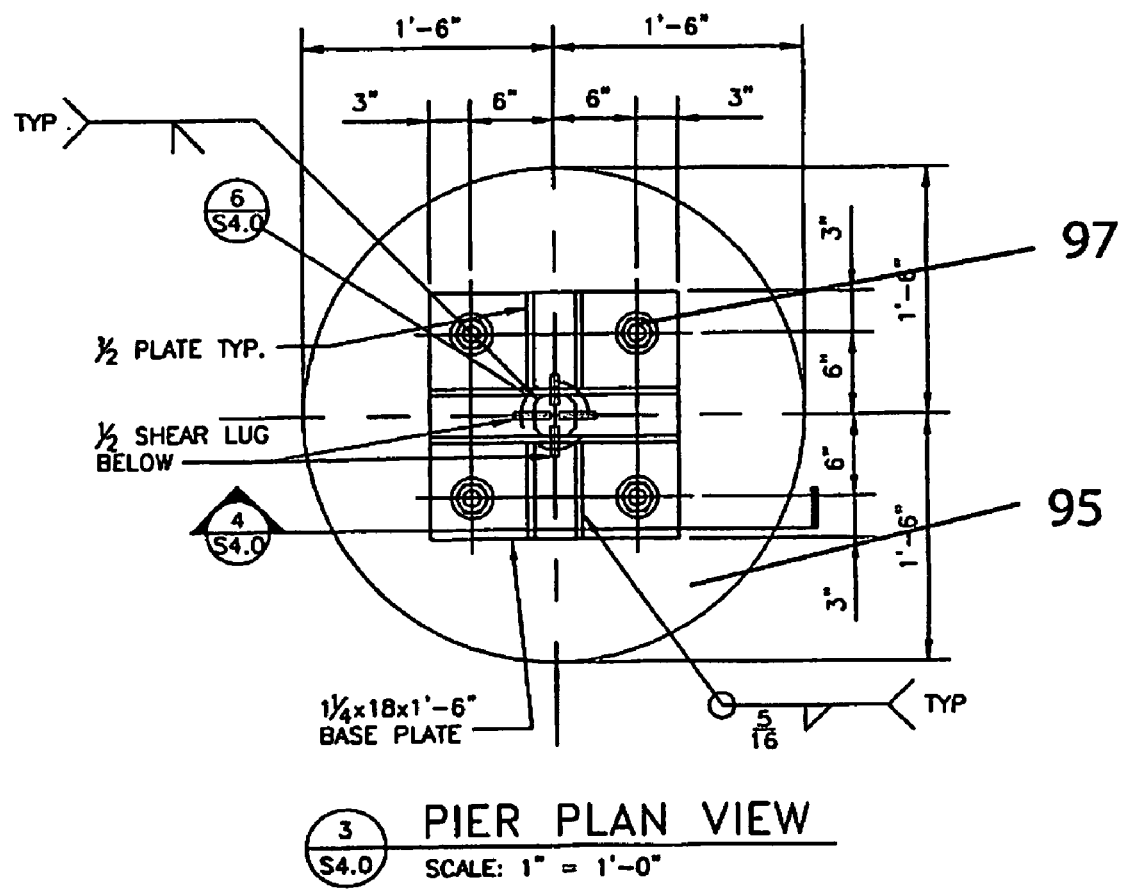
FIG. 40 is a top view of a pier of the foundation of FIG. 39.
Figure 41:
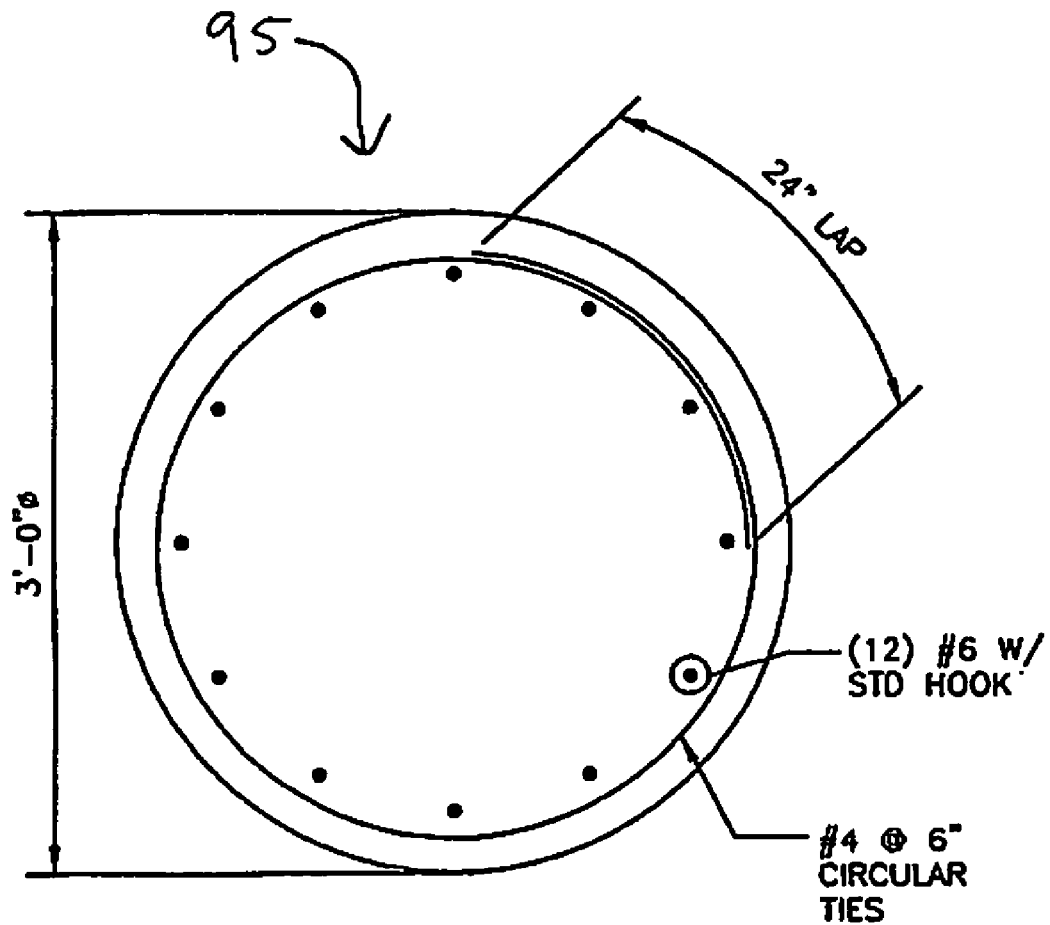
FIG. 41 is an sectional view of the pier of FIG. 40.
Figure 42:
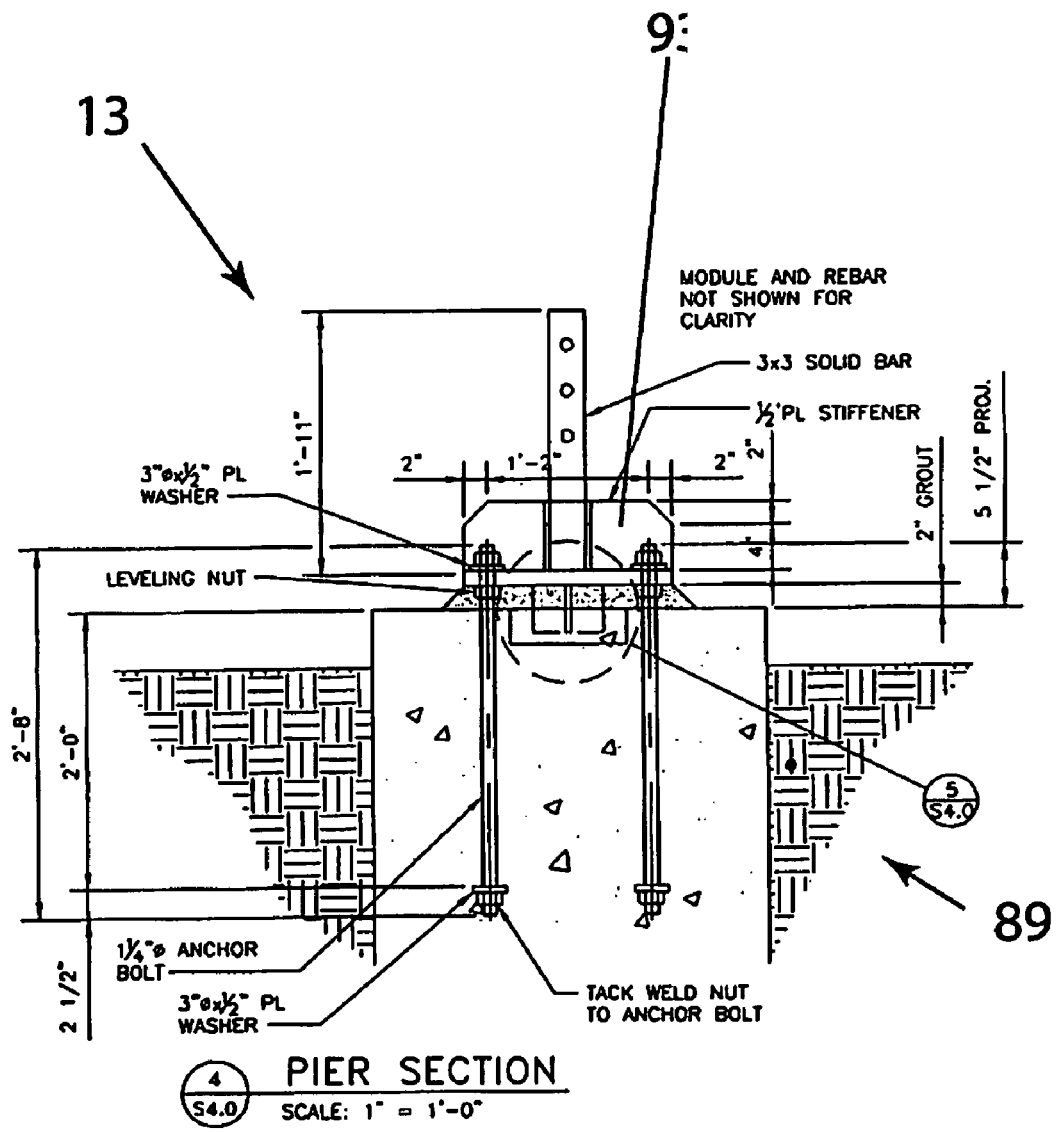
FIG. 42 is a cutaway side view of one pier of the foundation of FIG. 39.
Figure 43:
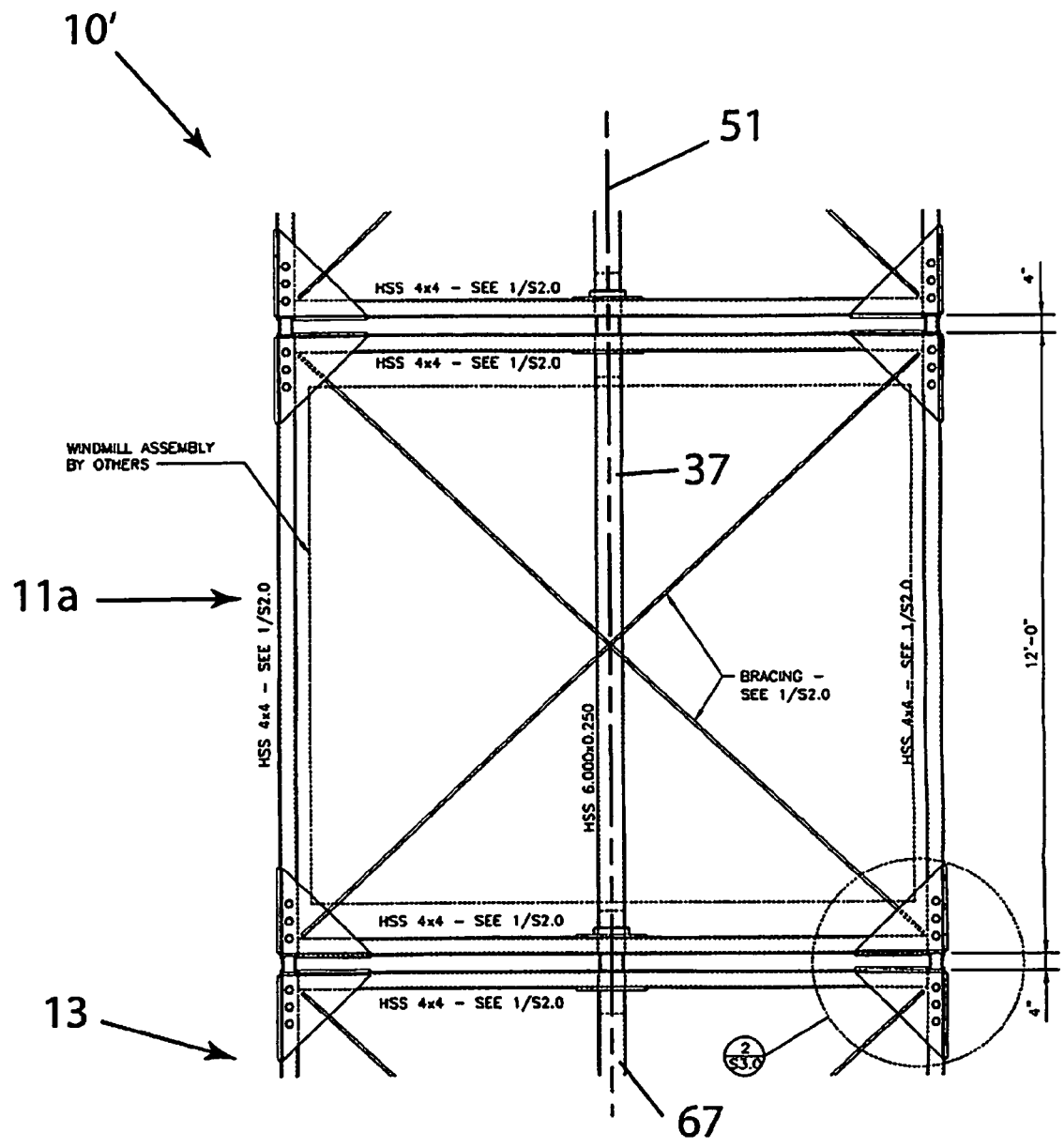
FIG. 43 is a partial side elevation view of the framework of FIG. 25.
Figure 44:
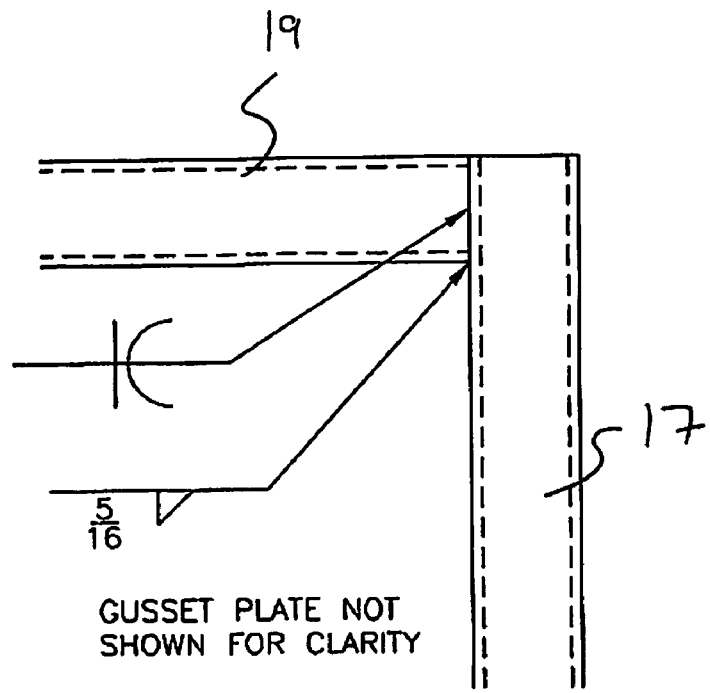
FIG. 44 is a partial side view of a corner of a drive module of FIG. 25 with gussets plates removed for clarity.
Figure 45:
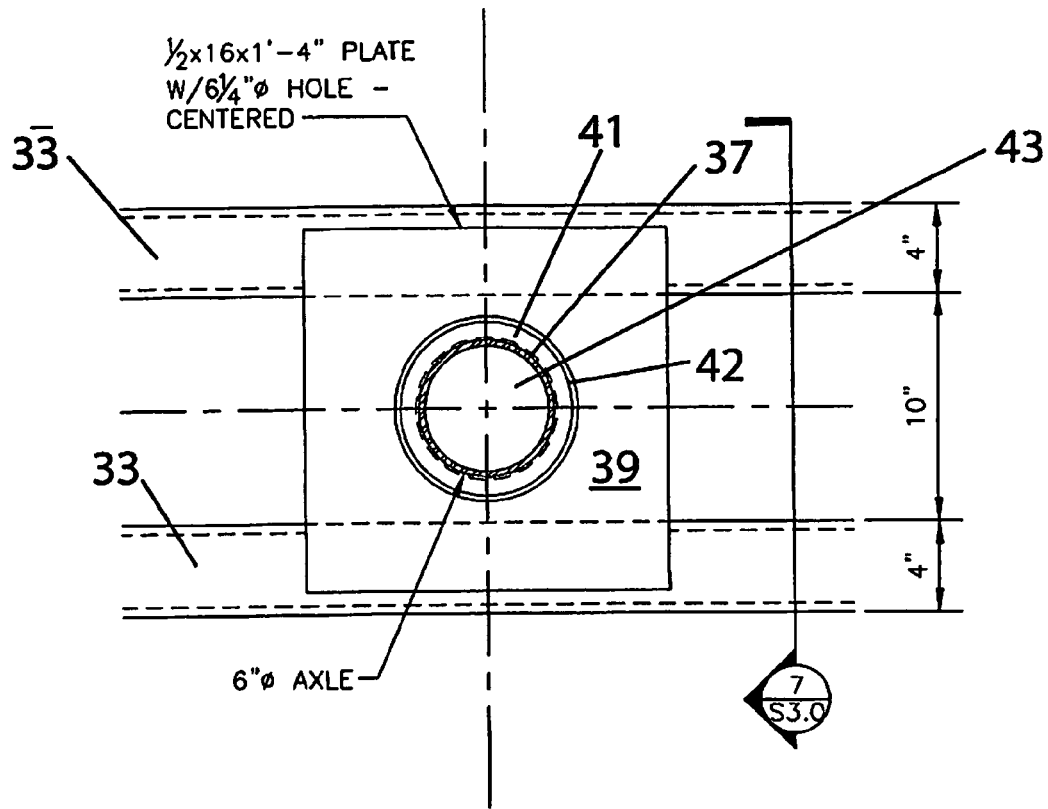
FIG. 45 is a partial top view of the shaft of a drive module of FIG. 25.
Figure 50:
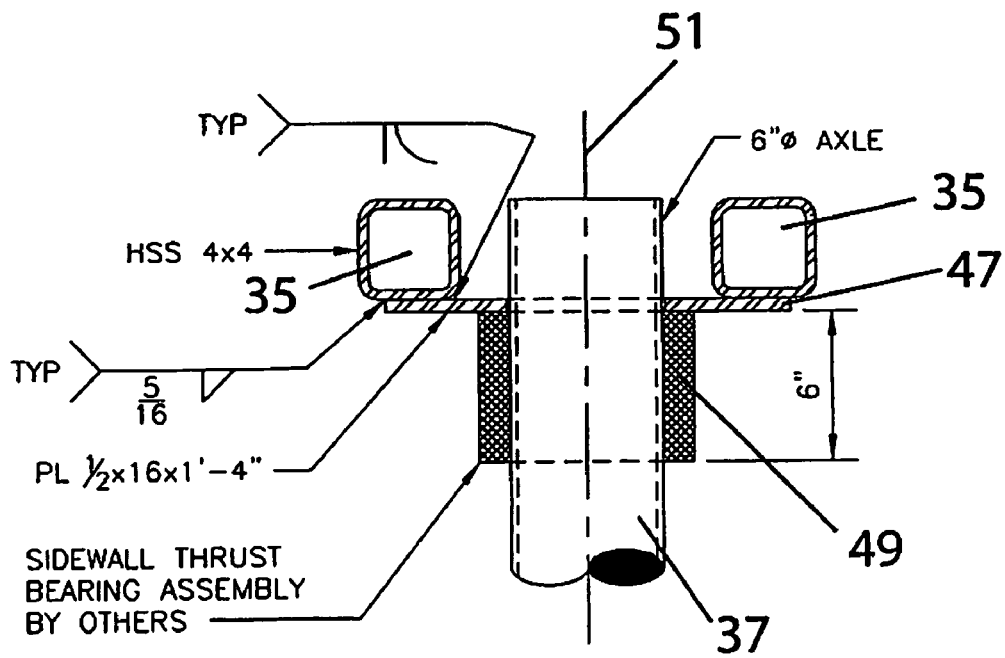
FIG. 50 is a partial cutaway side view of the shaft and bearings of a drive module of FIG. 25.
Figure 51:
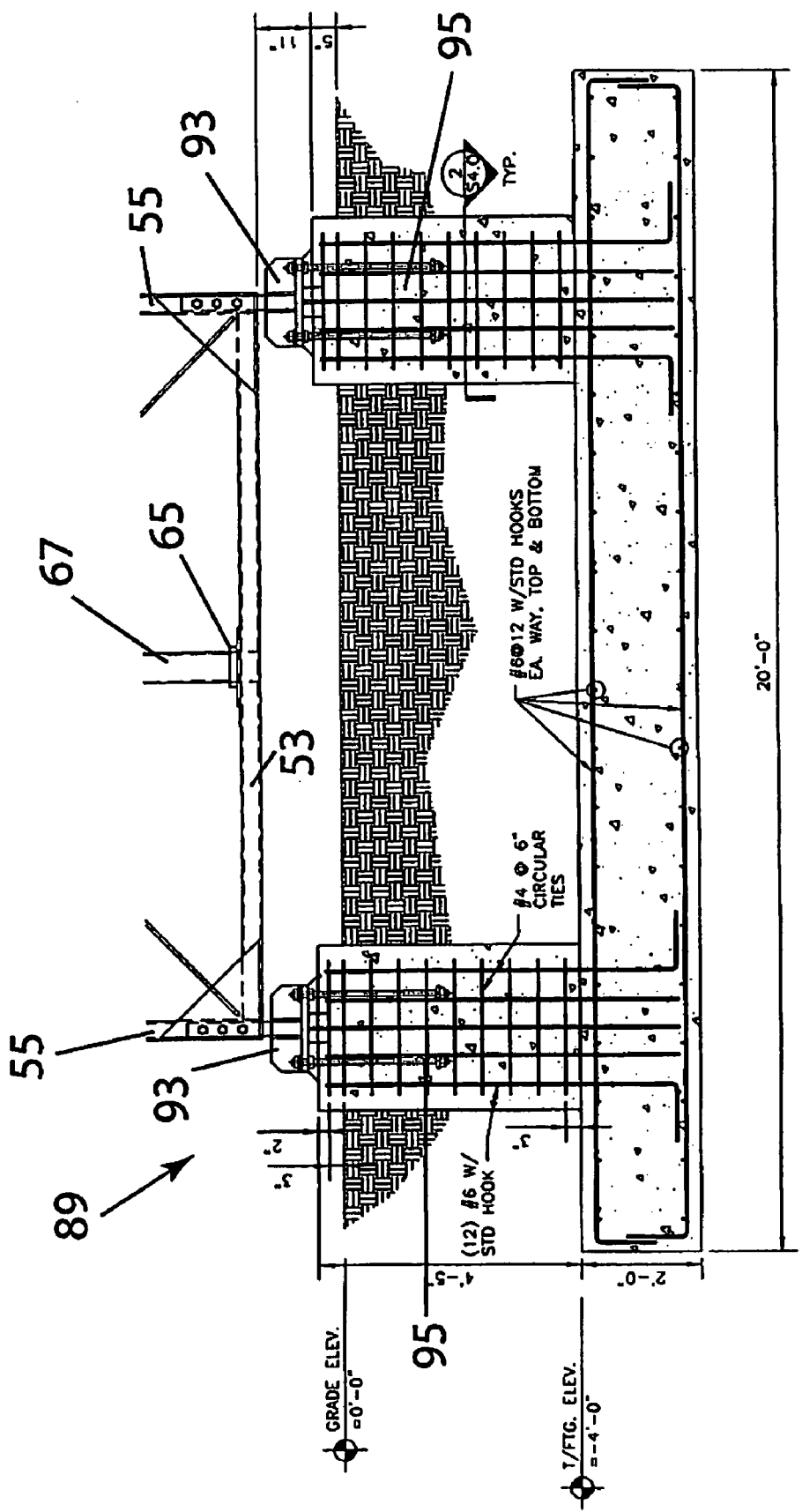
FIG. 51 is a cutaway side view of the foundation of the framework of FIG. 25.
Figure 52:
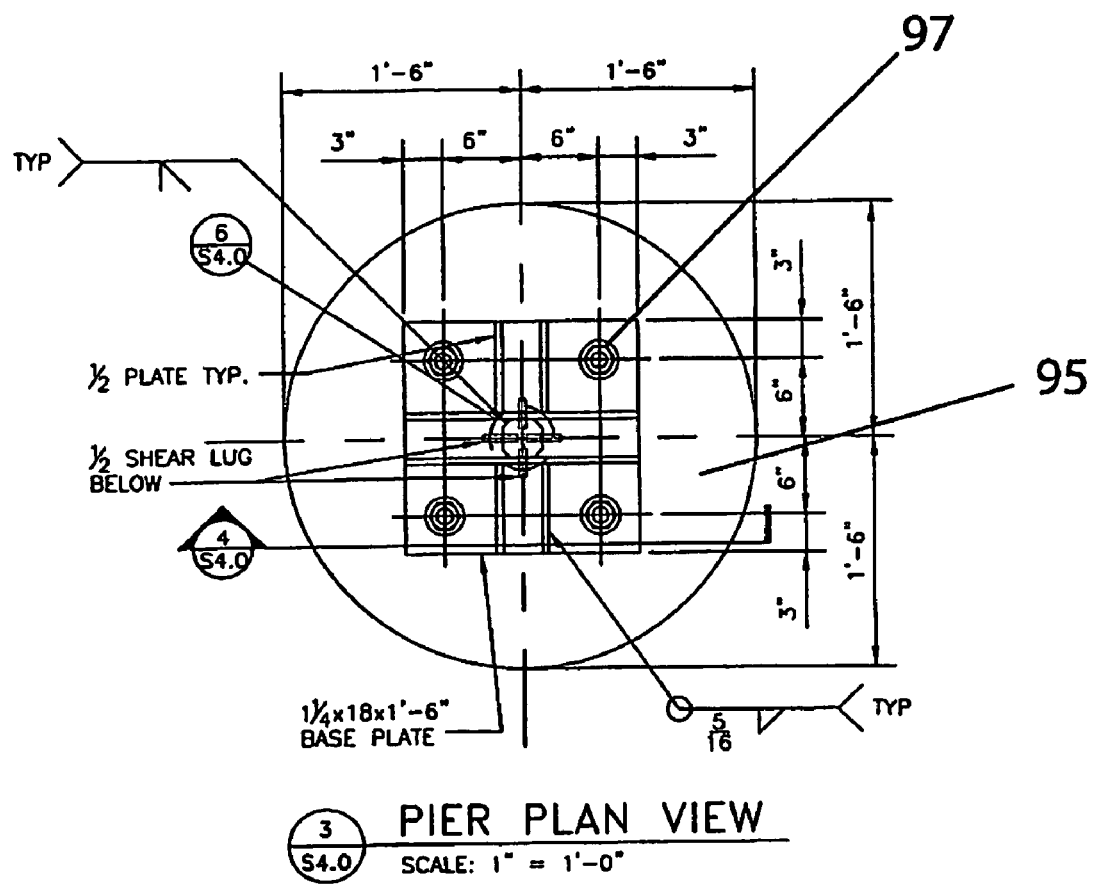
FIG. 52 is a top view of a pier of the foundation of FIG. 51.
Figure 53:
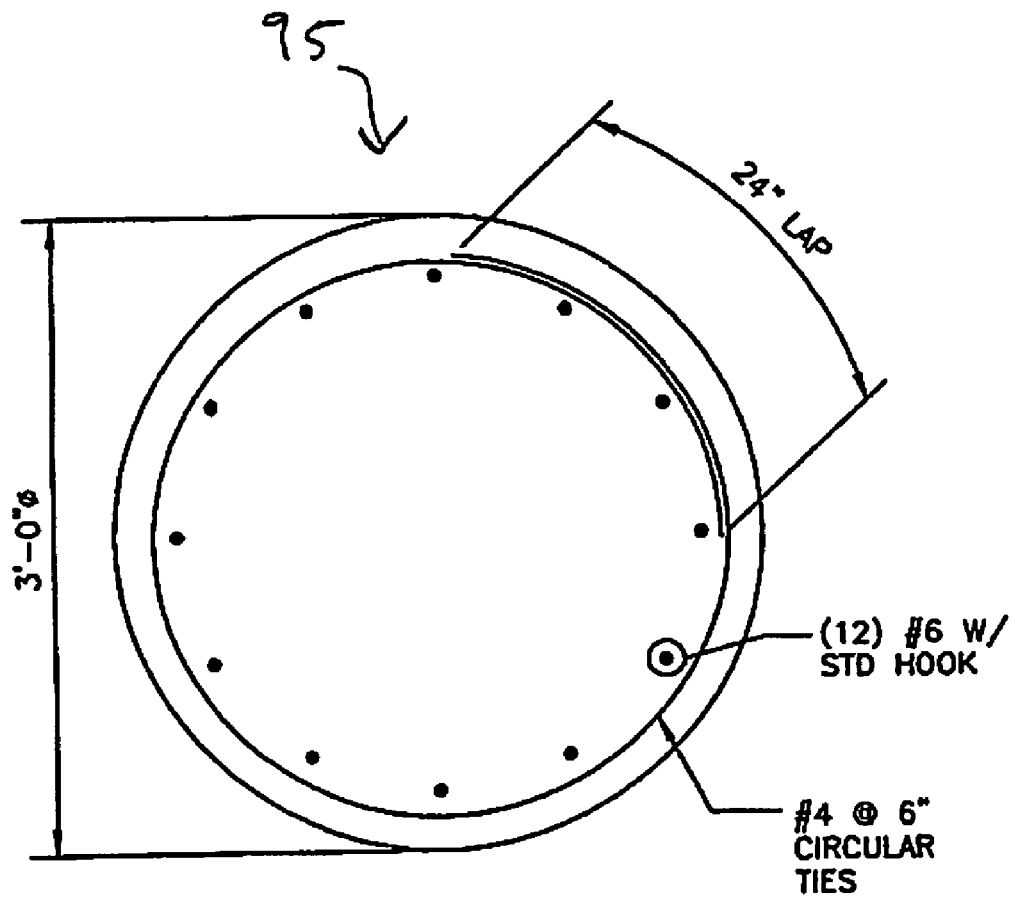
FIG. 53 is an sectional view of the pier of FIG. 52.
Figure 54:
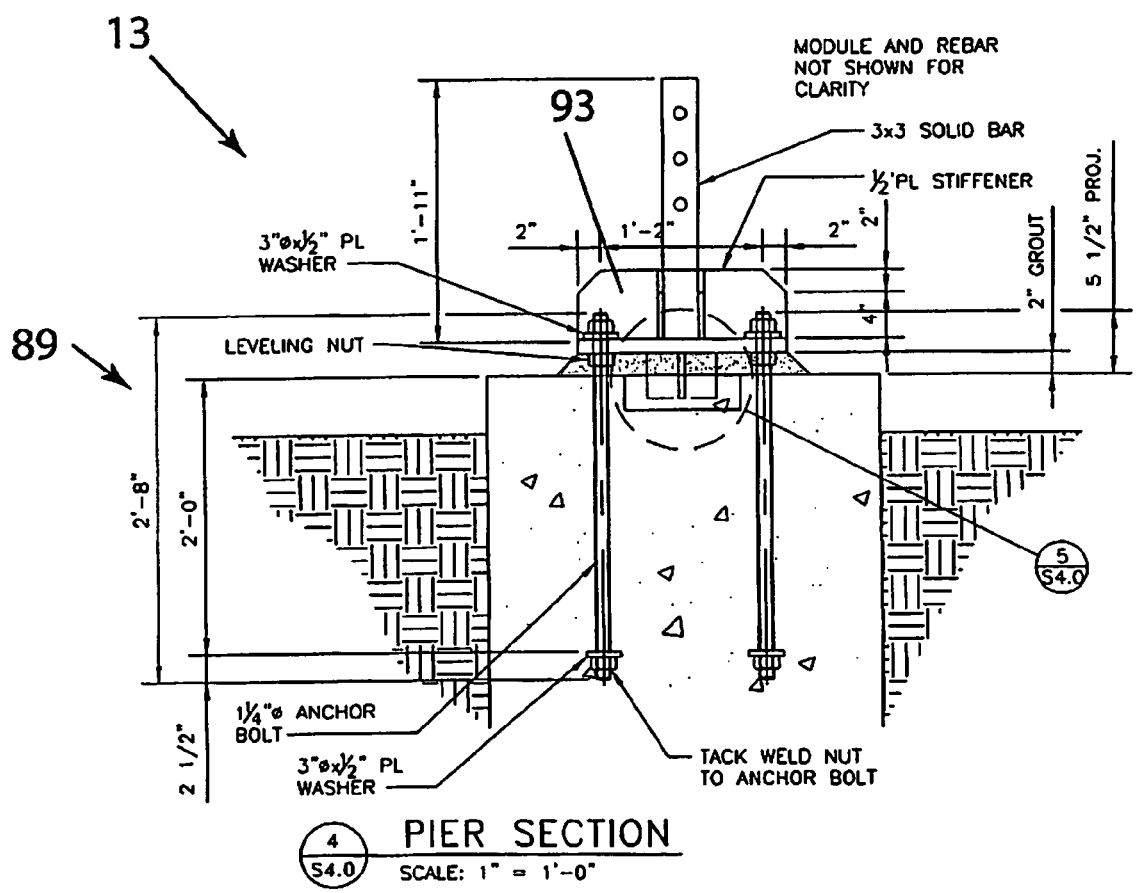
FIG. 54 is a cutaway side view of one pier of the foundation of FIG. 51.
Figure 55:
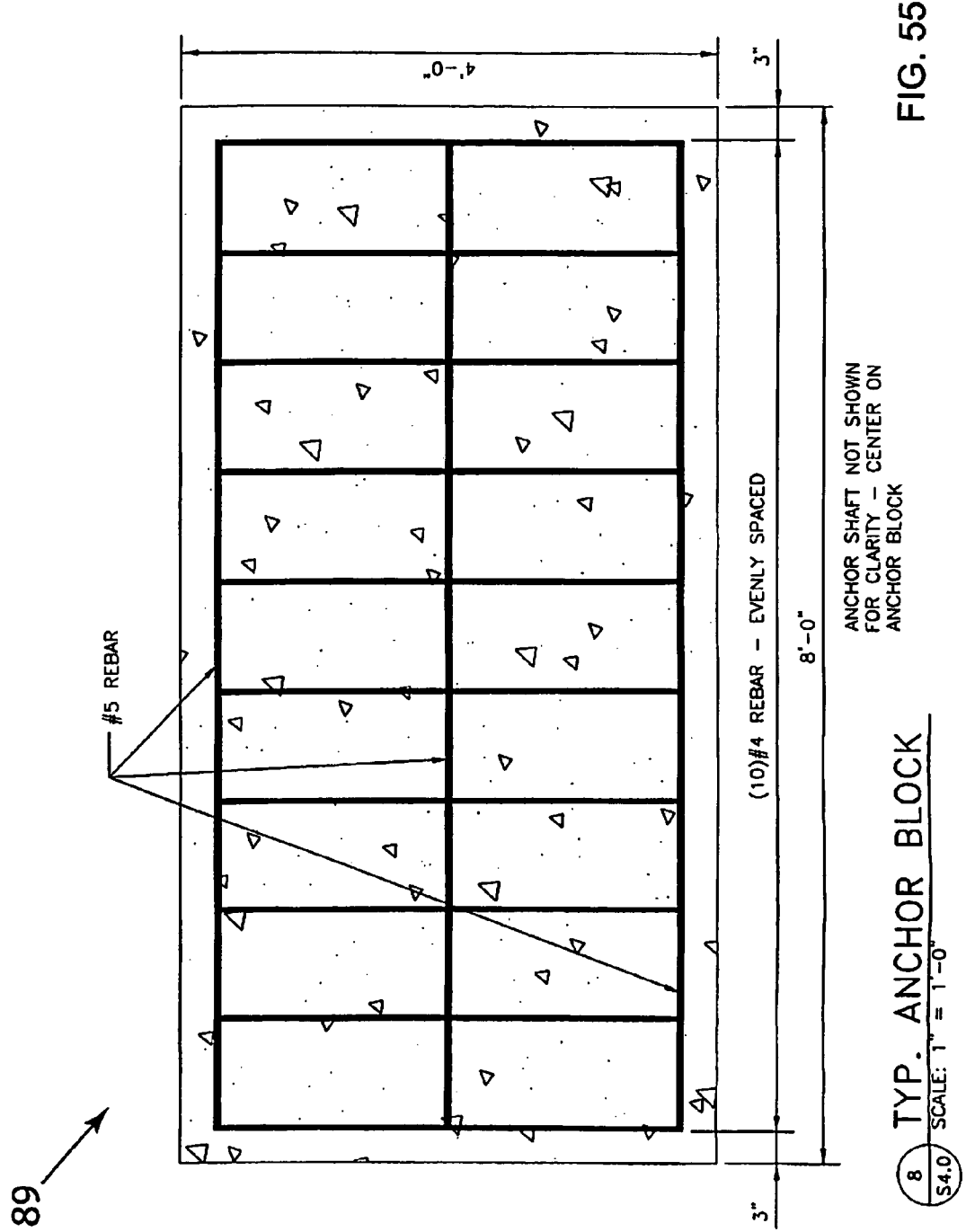
FIG. 55 is a cutaway side elevation view of a foundation system of FIG. 25.

Referring to FIGS. 38 and 50, the uppermost drive modules (e.g., modules 11e, 11i) differ from the drive modules stacked below in that such modules 11e, 11i include structure providing rotational support for the uppermost section of shaft 37. In the examples, upper cross rails 35 of the uppermost drive module (e.g., module 11e, 11i) include a plate 47. A sidewall thrust bearing 49 is welded to a lower surface of plate 47. Shaft 37 of the uppermost drive module 11e, 11i is seated in the sidewall thrust bearing 49. This arrangement secures shaft 37 of uppermost drive module 11e, 11i for rotation. Each shaft 37 of each drive module 11a-11i is co-axial and is axially aligned for rotation about a single rotational axis 51 (FIGS. 34, 38, 43, 46 and 50).

Referring next to FIGS. 18-25, 26, 39, 42, and 54, an exemplary generator module 13 is shown. Generator module 13 includes apparatus for converting kinetic energy created by wind-driven movement of vane assemblies 15 to electrical energy. Preferably, generator module 13 has a tubular frame structure which is vertically aligned with the structure of each drive module 11a-11i and is of an identical shape and size as drive modules 11a-11i. In the examples, generator module 13 is of a substantially cube-type shape having dimensions of 12'8×12'8×12'. As with drive modules 11a-11i, there is no particular requirement with respect to the shape and size of the generator module 13 as such module can be configured and scaled to meet end-user requirements. Drive modules 11a-11i are stacked on, and supported by, generator module 13 as shown, for example in FIGS. 24-25.

Figure 18:
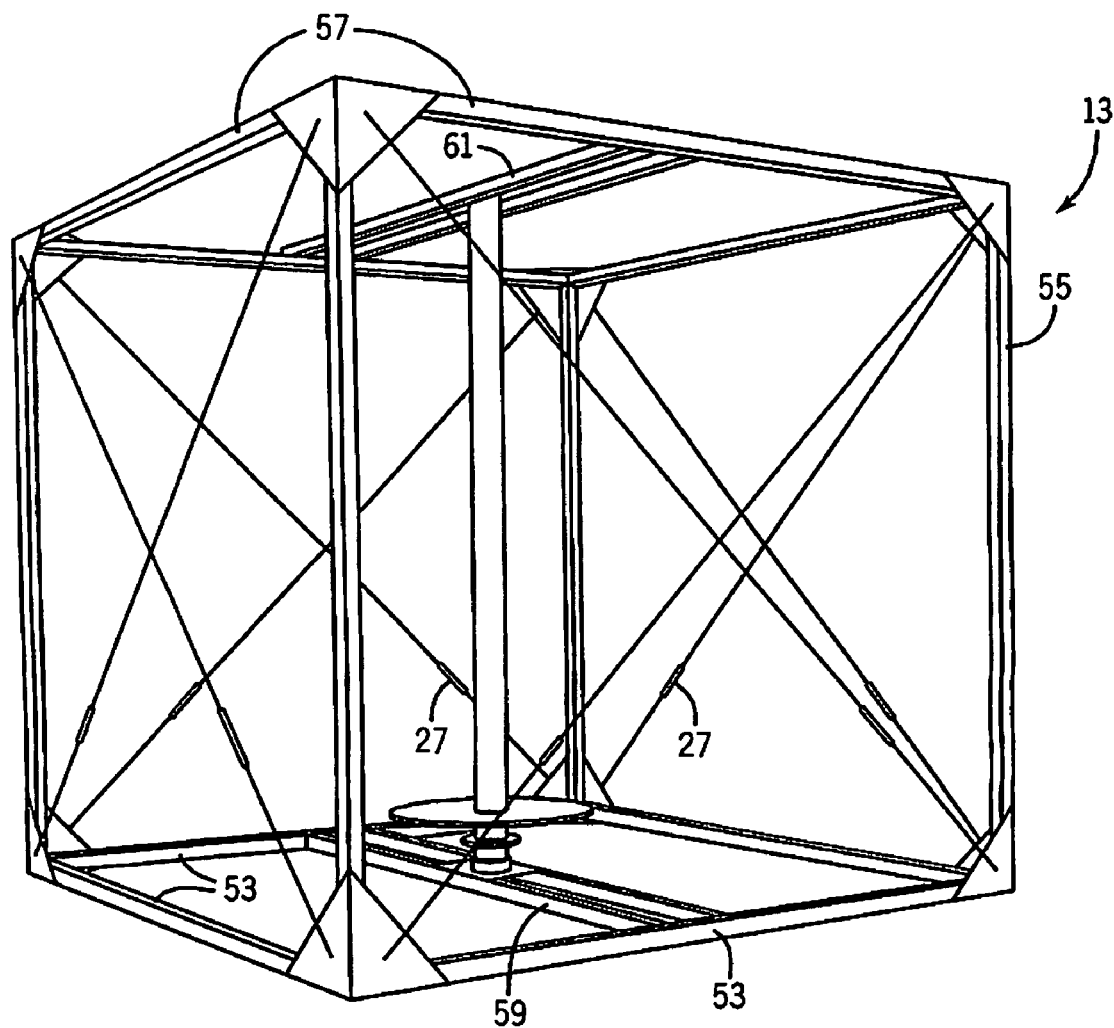
FIG. 18 is a perspective view of a partially assembled exemplary generator module which supports the drive modules of FIGS. 1-3 stacked thereon, but without an electrical power generator attached thereto.
Figure 19:
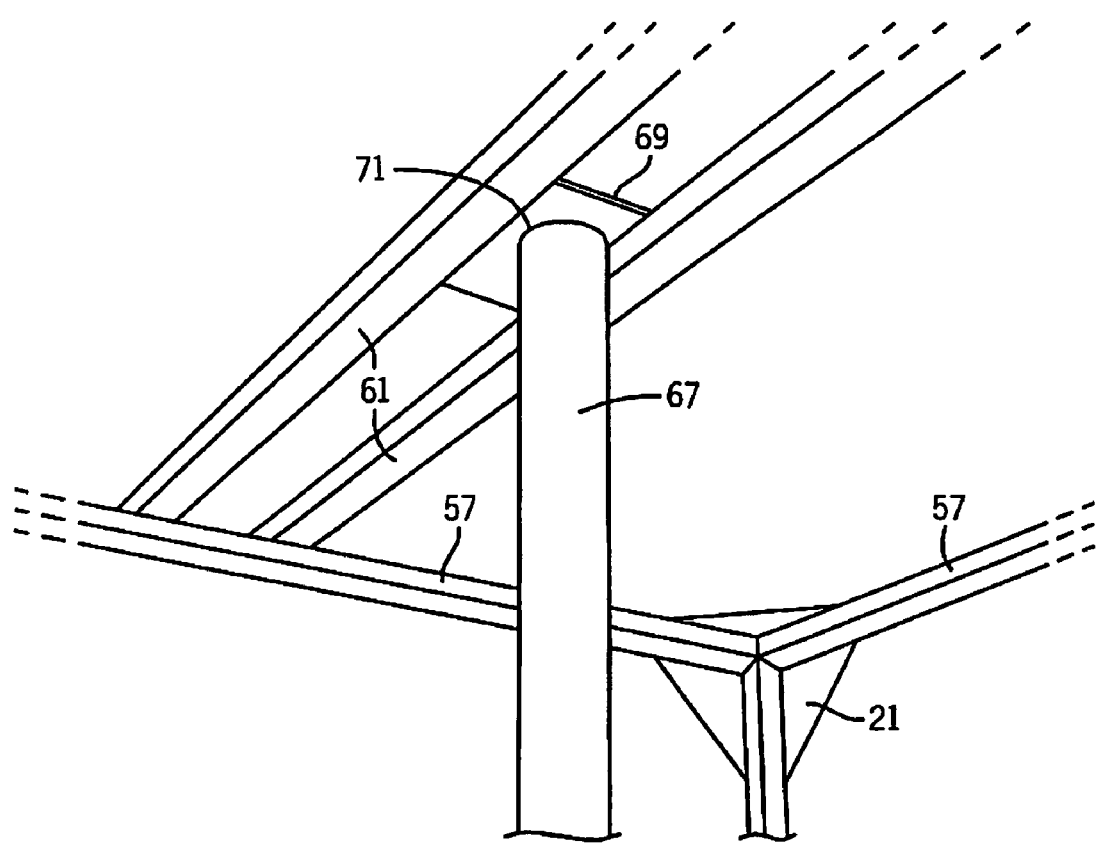
FIG. 19 is a perspective view of a portion of the generator module of FIG. 18 including a drive shaft upper end and plate provided to hold the drive shaft upright prior to assembly of the modular wind-driven electrical power generator apparatus.
Figure 21:
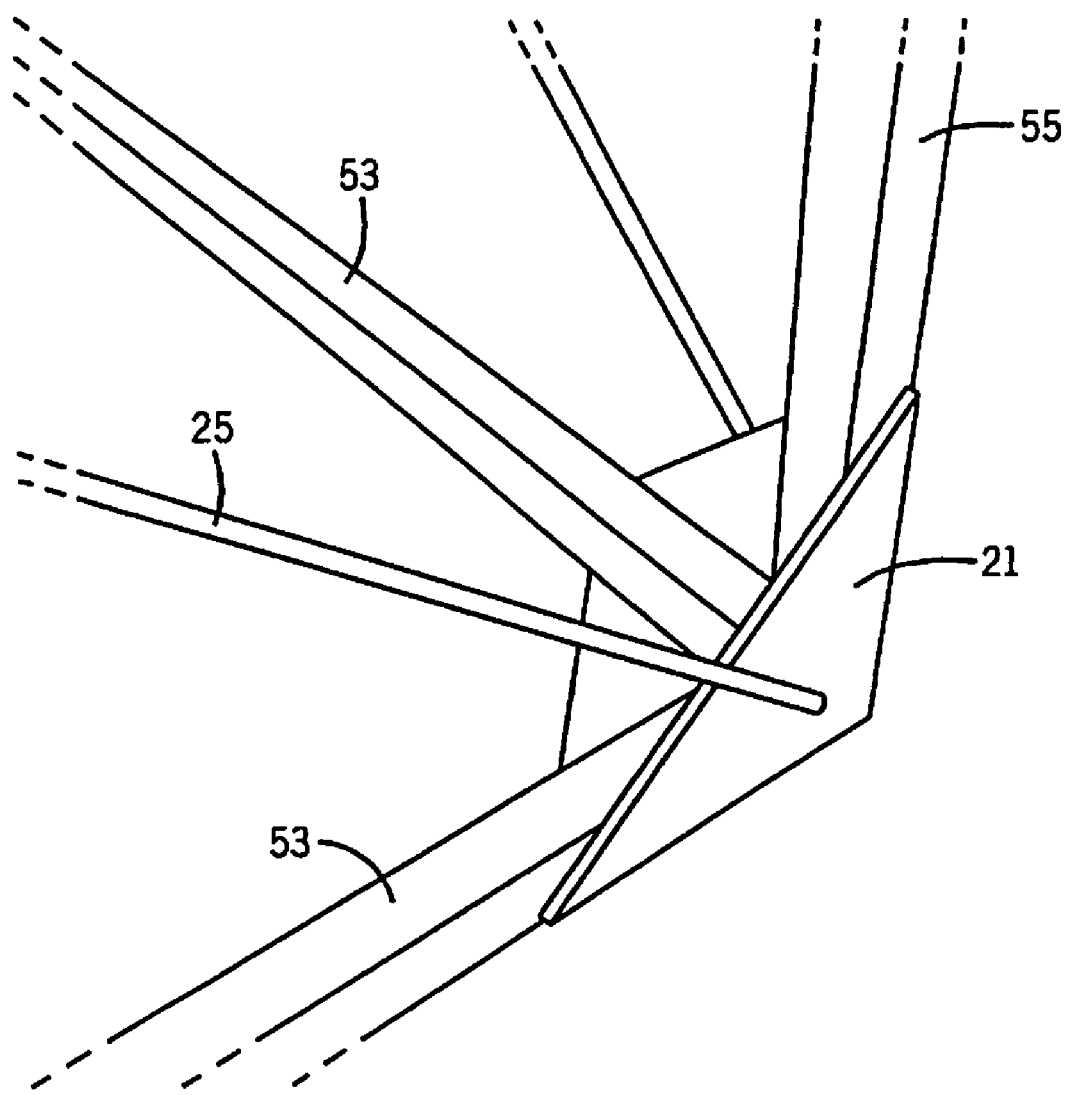
FIG. 21 is a partial perspective view of a corner portion of the frame comprising the generator module of FIGS. 18-20.

Generator module 13 preferably comprises a tubular metal frame consisting of four lower rails 53, four side rails 55, and four upper rails 57. Lower and upper rails 53, 57 are secured together at each corner, preferably by welding, as shown in FIGS. 18-19, and 21. Side rails 55 are secured to the respective corners, again preferably by welding, in position for vertical alignment with each respective side rail 17 of each drive module 11a-11i stacked above generator module 13 to create columns transferring load to the foundation system 89. As with the drive modules, 4"×4"×⅜" A500 grade tubular steel is preferred for use in manufacture of rails 53-57. As shown in FIGS. 21, 31, 35, 39, and 49 (and FIGS. 18-19, 26, and 43) gussets 21 are secured, preferably by welding, to the lower, side and upper rails 53-57 at each corner to reinforce the generator module 13. Bolts 23 further secure gussets 21 to side rails 55. Brace rods 25 (FIG. 21) are preferably welded to opposite gussets 21 and are tensioned by turnbuckles 27 to further provide rigidity to generator module 13 in the same manner as described previously in connection with the drive modules 11a-11i.

Generator module 13 is most preferably connected to the adjacent drive module 11a in stacked relationship in the same manner as described above in connection with the drive modules 11a-111. Connecting pins 29 fitted into sleeves 31 provided in vertically-aligned adjacent side rails 55 and 17 connect adjacent generator and drive modules 13, 11a at each corner. (See FIGS. 34 and 49 and FIGS. 1-3 and 16). Each pin 29 has an outer dimension which fits closely within an inner dimension of the tubular side rails 17, 55. In the exemplary embodiments shown, pins 29 are 3"×3"×⅜"×3' hardened stainless or galvanized tubular steel thereby fitting snugly within the corresponding tubular side rails 17, 55. Each pin 29 is held in place at each corner by bolts 23 located through gussets 21.

Figure 20:
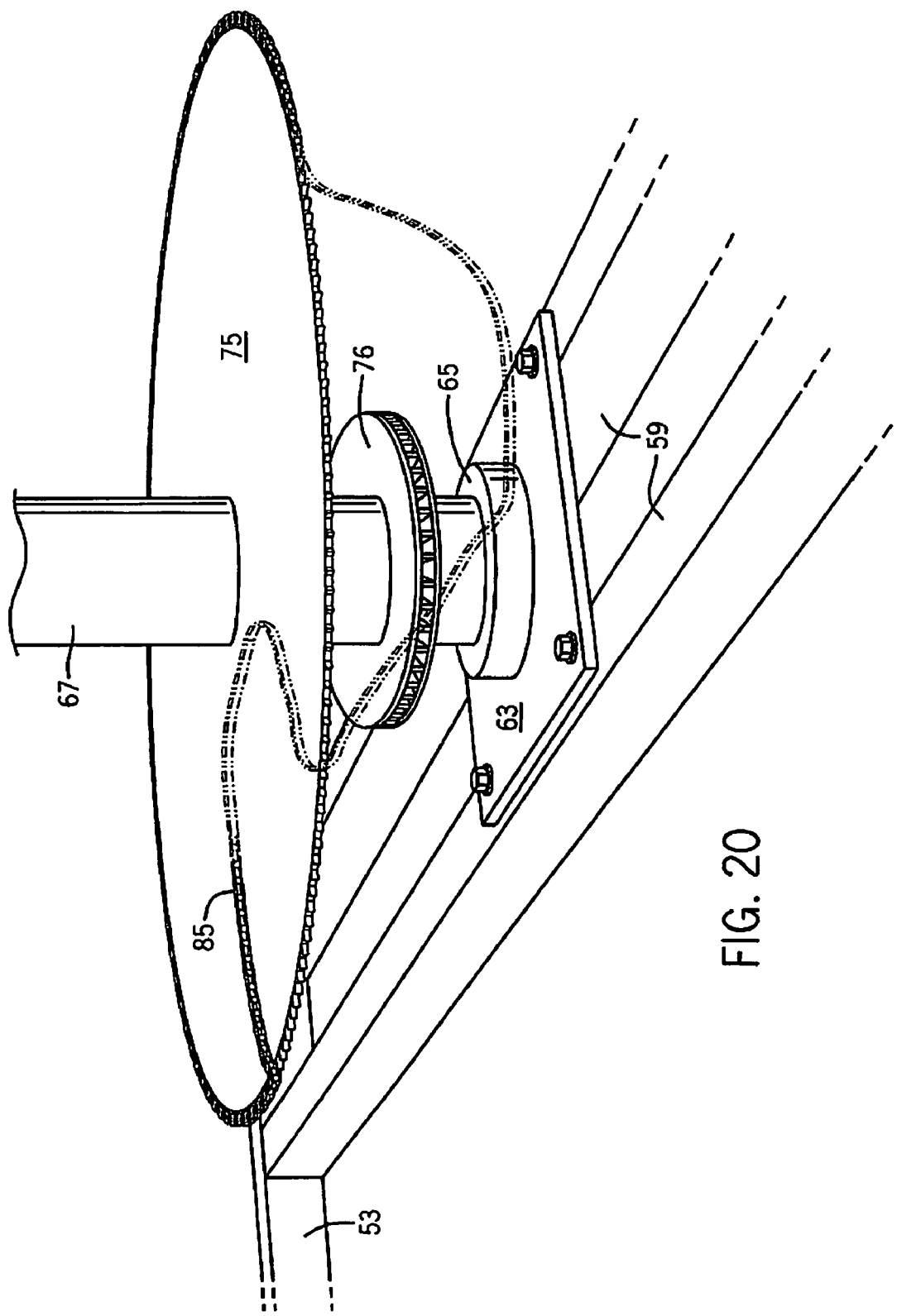
FIG. 20 is a perspective view of a portion of the generator module of FIGS. 18-19 showing securement of a rotatable drive shaft lower end by means of a thrust bearing to the generator module, a brake rotor and gear secured to the drive shaft, and a chain for the gear.

Referring further to FIGS. 18-21, and 24-25, generator module 13 is provided with lower cross rails 59 which span between a parallel pair of the lower rails 53 and a set of upper cross rails 61 which span between a parallel pair of the upper cross rails 57. As illustrated in FIG. 20, lower cross rails 59 support a plate 63 secured thereto. A thrust bearing 65 is attached to plate 63. A suitable thrust bearing 65 is a Consolidated Bearing Co. model XW-6 thrust bearing. Other bearing types may be used, for example a tapered roller thrust bearing may be used as bearing 65. Axial drive shaft 67 has a terminal end seated in bearing 65 as shown in FIG. 20. Drive shaft 67 may, for example, be made of 6" OD×12'×¼"wall steel tube and thrust bearing 65 may be a 6" ID 7⅝" OD thrust bearing.

Plate 69 is welded to upper cross rails 61. An opening 71 in plate 69 is provided to receive drive shaft 67 and to hold drive shaft upright after manufacture and before assembly of the modular wind-driven electrical power generator apparatus embodiments 10 and 10'. Opening 71 is sized slightly larger than shaft 67 so that there is no contact between plate 69 and shaft 67 during operation.

Drive shaft 67 is connected to the lower end 145 of the adjacent drive module 11a shaft 37 in the same manner as described previously with respect to connection of adjacent drive module shafts 37. As illustrated in FIGS. 28, 33-34 and 45-46, an internal sleeve (not shown) identical to sleeve 45 secures drive shaft 67 to the vane assembly 15 shaft 37 of the drive module 11a directly above generator module 13. Shafts 67 and 37 are connected in an axially and vertically aligned position about axis 51. As a result of connection by an internal sleeve such as sleeve 45, drive shaft 67 is linked to each shaft 37 of each drive module 11a-11i so that drive shaft 67 is powered by co-rotation with shafts 37 as explained in more detail below.

Figure 22:
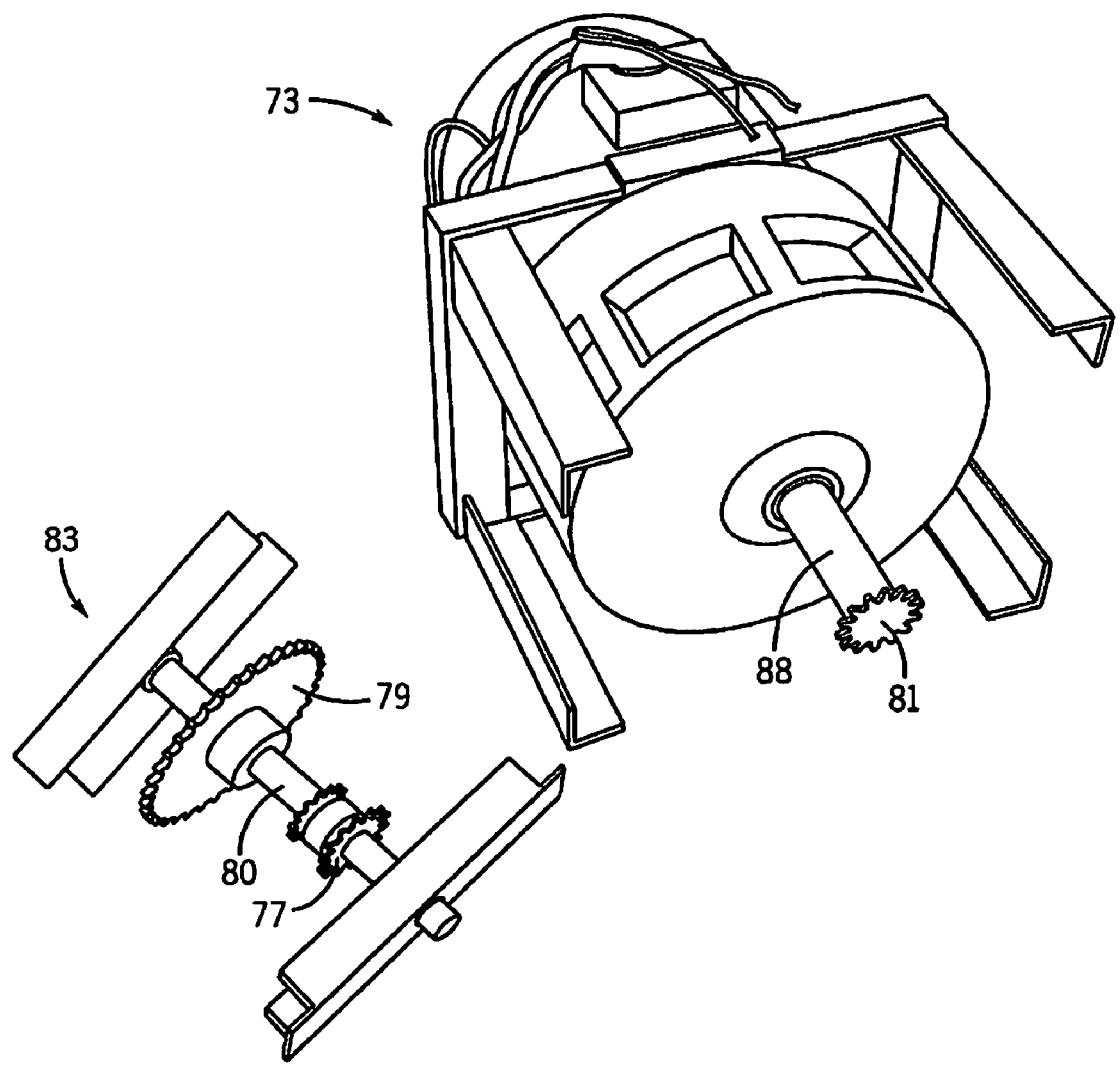
FIG. 22 is a perspective view of an exemplary electrical power generator, transmission, and gear train for mounting on the generator module of FIGS. 18-21.
Figure 23:
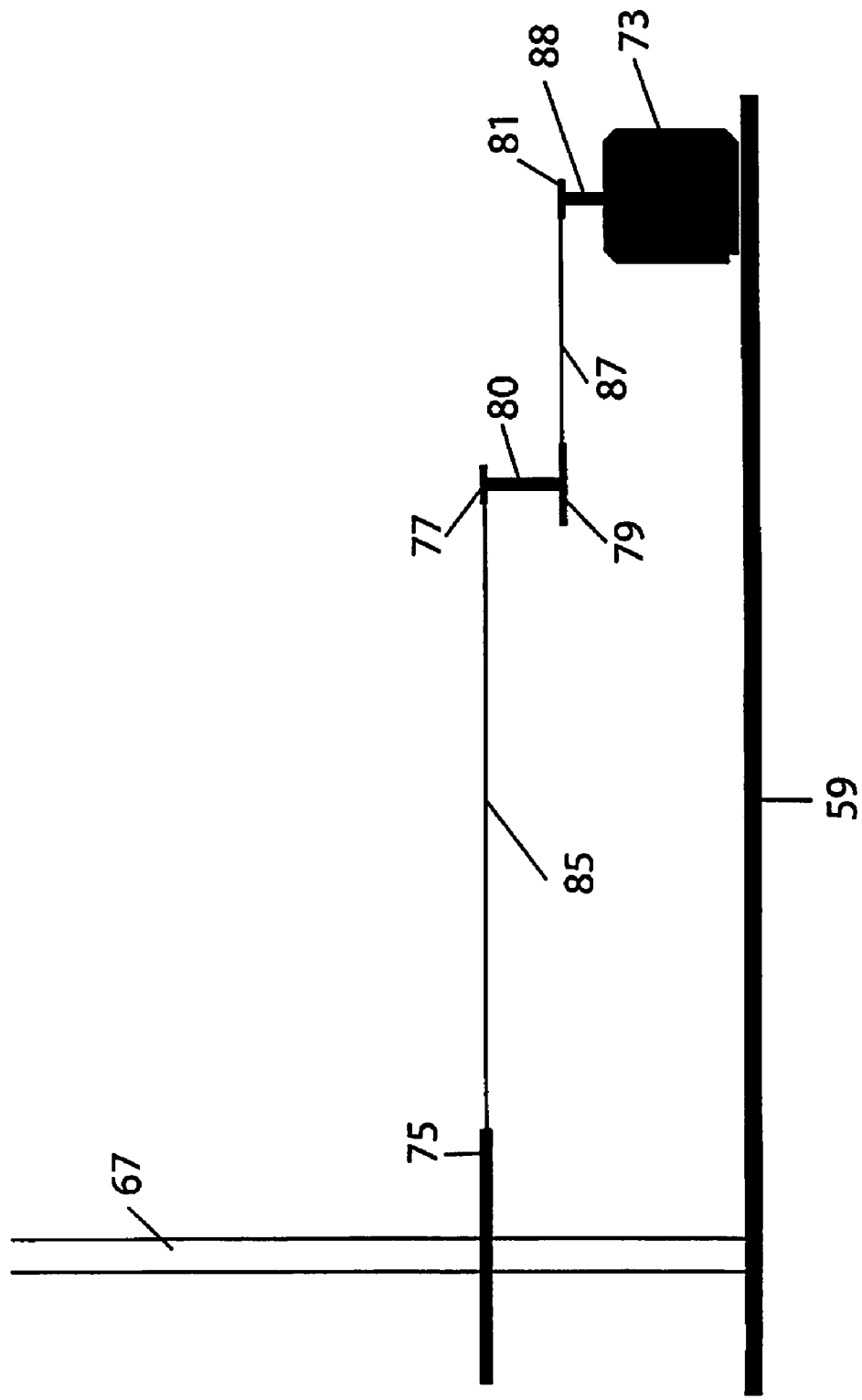
FIG. 23 is a schematic illustration showing an exemplary electrical power generator, transmission, and chain in power-transmission relationship with the generator module drive shaft.

Referring again to FIGS. 18-20, and also to FIGS. 22-23, generator apparatus is provided to convert kinetic energy from drive shaft 67 rotation into electrical power. Drive shaft 67 is in power-transmission relationship with generator 73 through gears 75, 77, 79, 81 transmission 83 and chains 85, 87. A generator 73 suitable for use in the example is a brushless 20 kW Jacobs® alternator available from Wind Turbine Industries, Corp. of Prior Lake, Minn. Preferably, generator 73 is powered at about 1800 rpm. Powering of generator 73 may be implemented by a 43" diameter gear 75 with approximately 508 teeth secured to drive shaft 67. Chain 85 links gear 75 to gear 77 of transmission 83. Gear 77 is preferably 2.5" in diameter and is mounted to shaft 80 to which gear 79 is mounted. Gear 79 is preferably a 7.5" diameter gear. A further chain 87 links gear 79 with gear 81 mounted on drive shaft 88 of generator 73. Generator gear 81 is preferably 2.5" in diameter. Transmission 83 and generator 73 are preferably supported on lower cross rails 59 as shown schematically in FIG. 23. The foregoing gear train arrangement provides an approximate 56:1 gear ratio such that rotation of drive shaft 67 at about 34 rpm results in generator operation at about 1800 rpm. Power-transmission apparatus, other than that shown in the examples, will be known to persons of skill in the art. For example, pulleys and belts may be used in place of the aforementioned gears and chains.

As shown in FIG. 20, a brake rotor 76 may be secured to drive shaft 67 for purposes of slowing or stopping shaft 67 rotation. A conventional brake caliper and hydraulic braking mechanism (not shown) may be used to limit rotation of rotor 76.

FIGS. 26, 30, 39-42, 51-58 and 61 illustrate elements of exemplary foundation systems 89 for securing generator module 13 and modular wind-driven electrical power generator embodiments 10, 10' to earth 91. In the examples, generator module 13 includes four base elements 93, each of which is vertically aligned with a side rail 55 and each base element 93 is connected to a steel bar or rod reinforced concrete pier 95 by anchor bolts 97. Other types of foundation systems, such as a helical tier system may be utilized.

Figure 56:
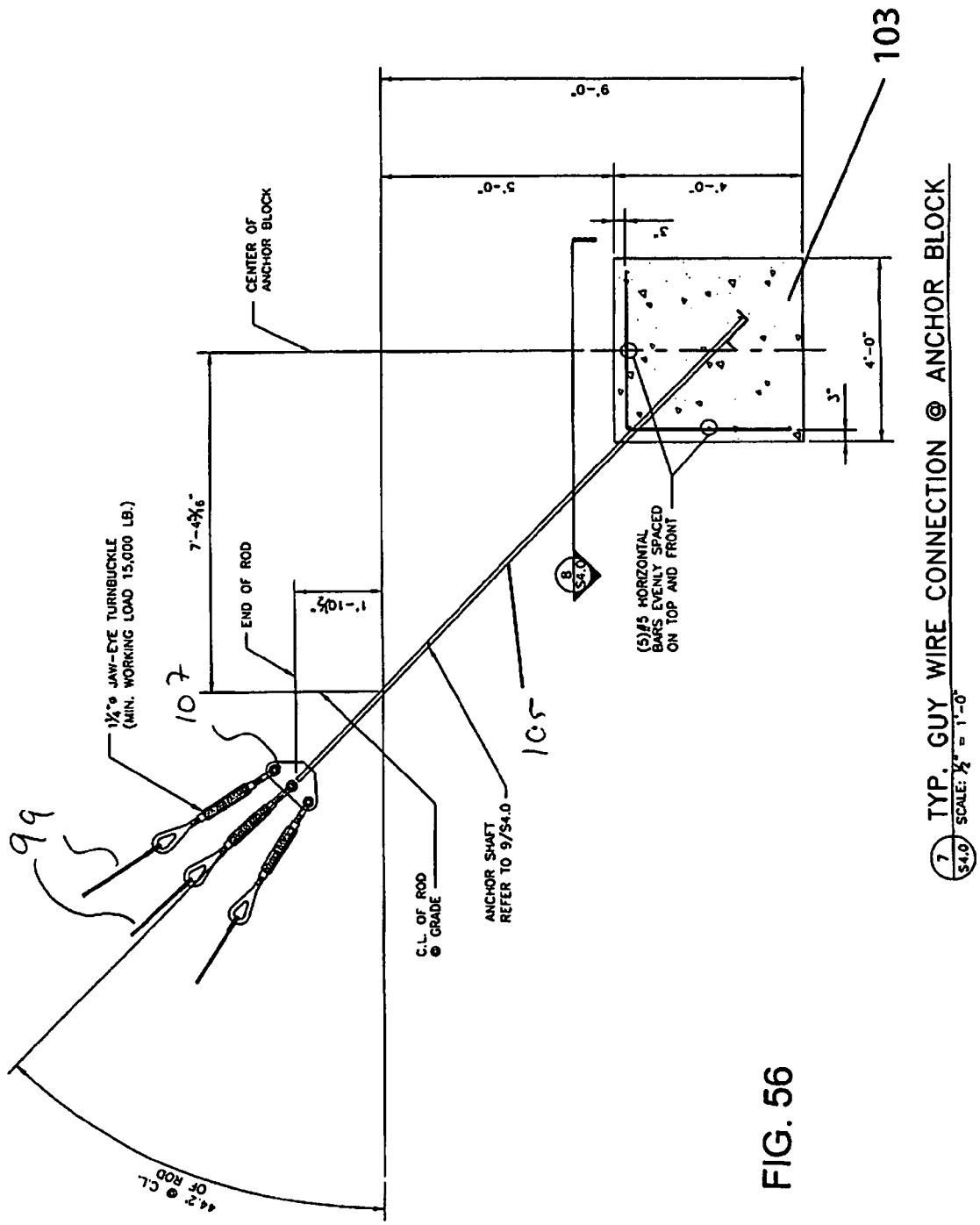
FIG. 56 is a partial top view of one of the foundation blocks and guy wires of FIG. 25.
Figure 57:
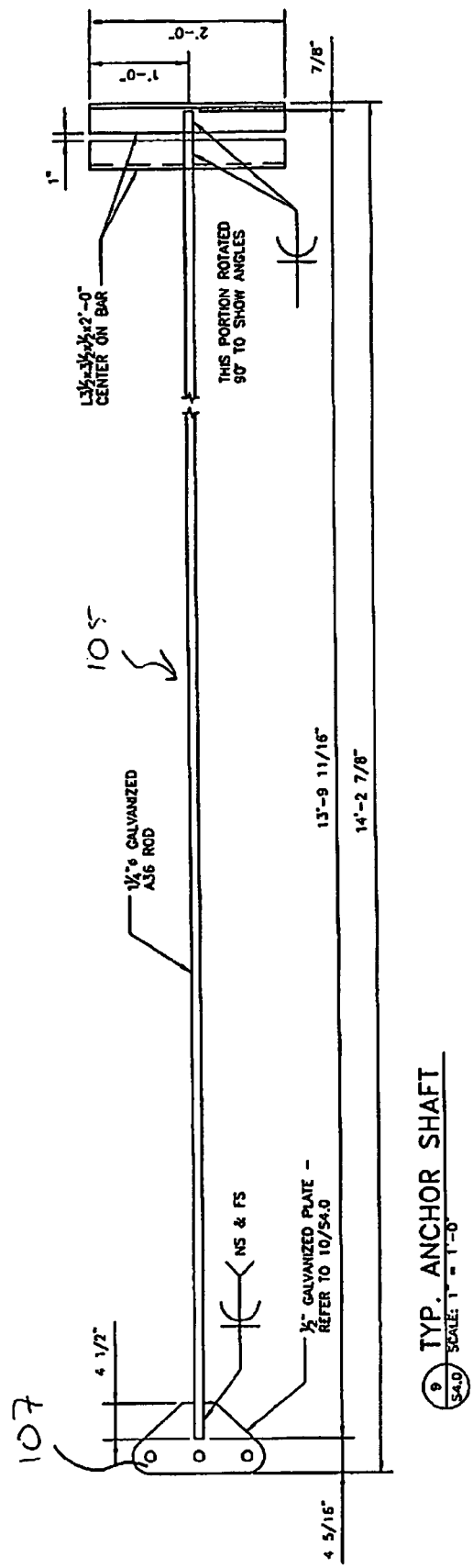
FIG. 57 is a top elevation view of the anchor shaft of FIG. 25.
Figure 58:
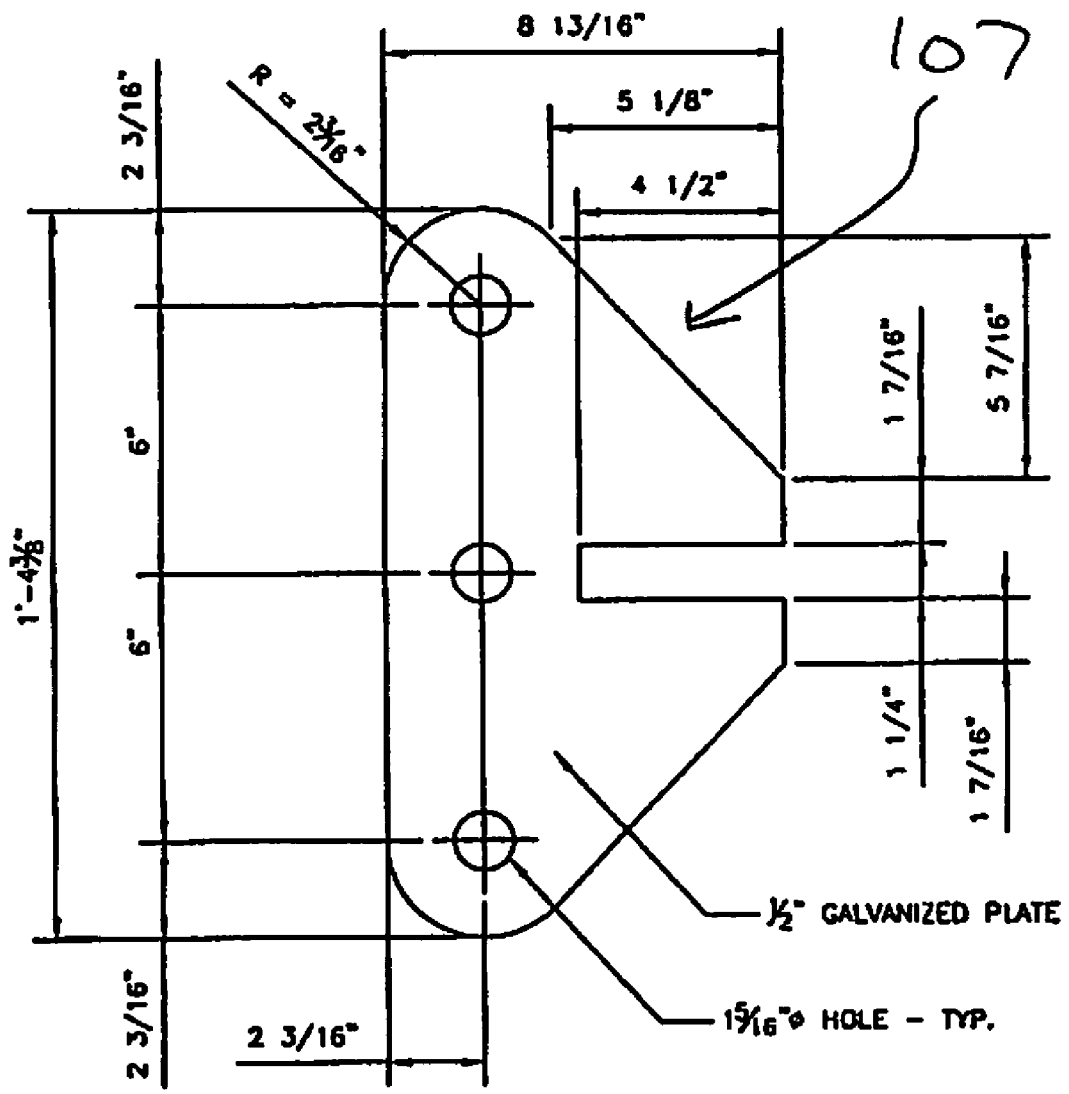
FIG. 58 is a top view of the head of the anchor shaft of FIG. 57.
Figure 59:
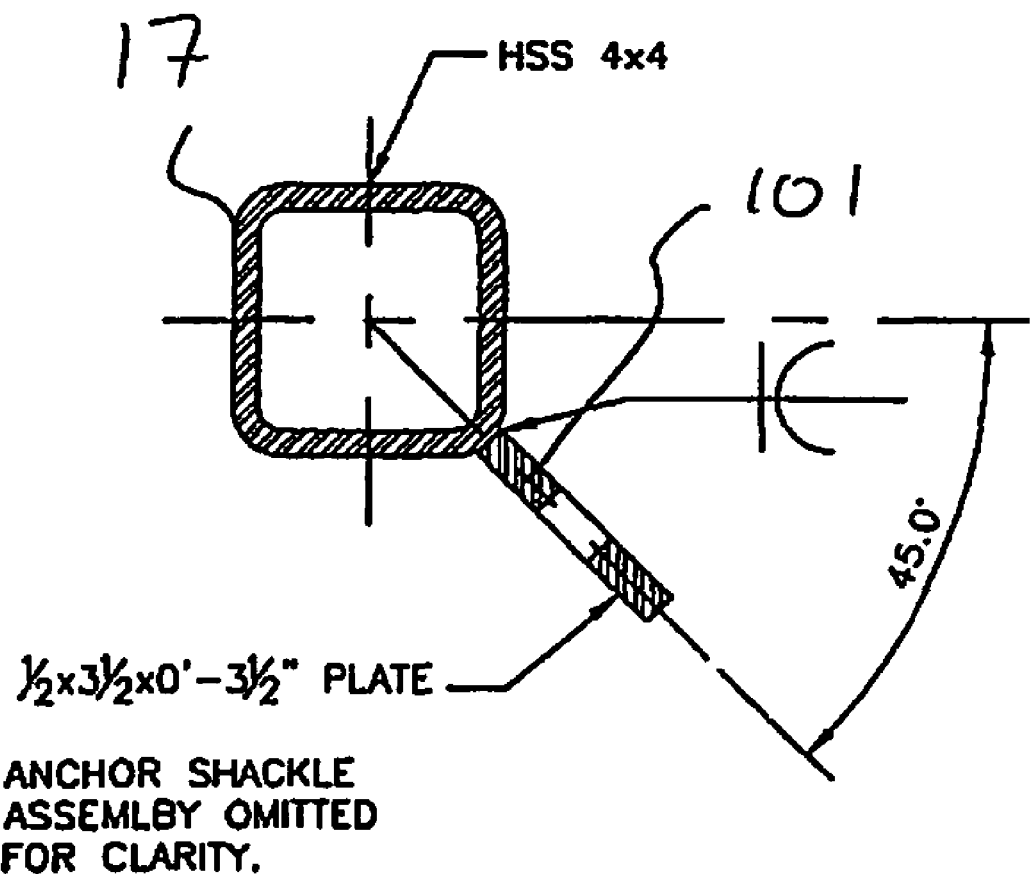
FIG. 59 is a cutaway top view of the side rail and thimble-and-shackle apparatus of FIG. 60.
Figure 60:
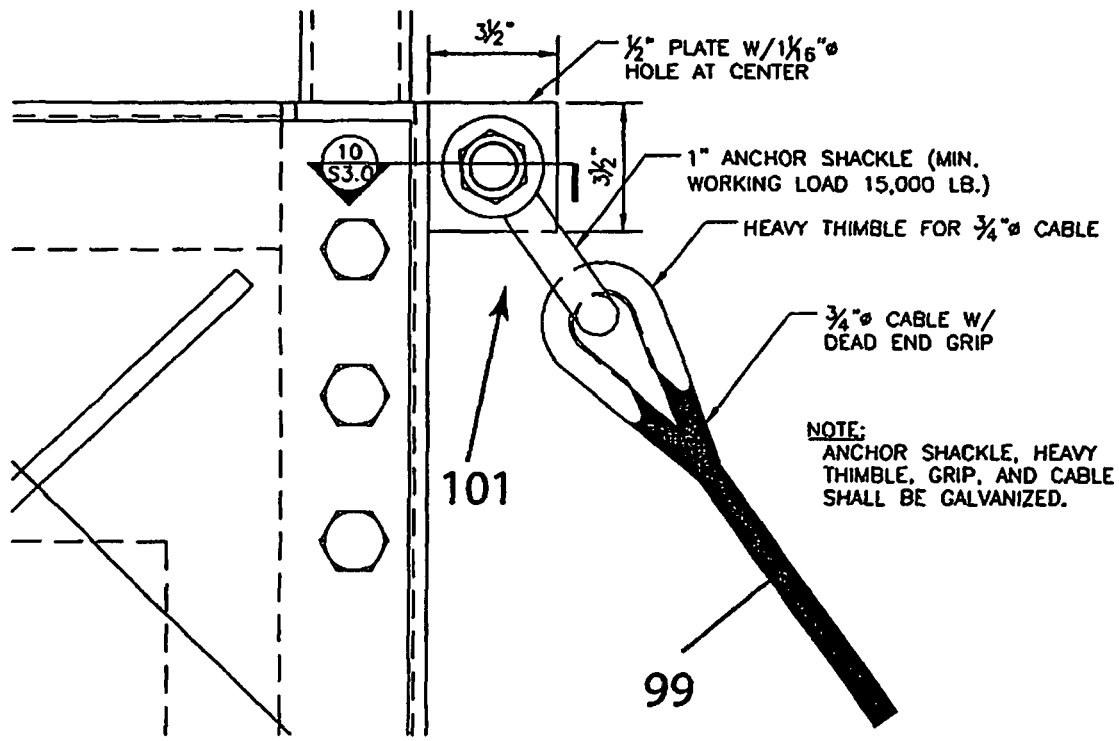
FIG. 60 is a partial side view of a corner of a module with guy wires of FIG. 25.
Figure 61:
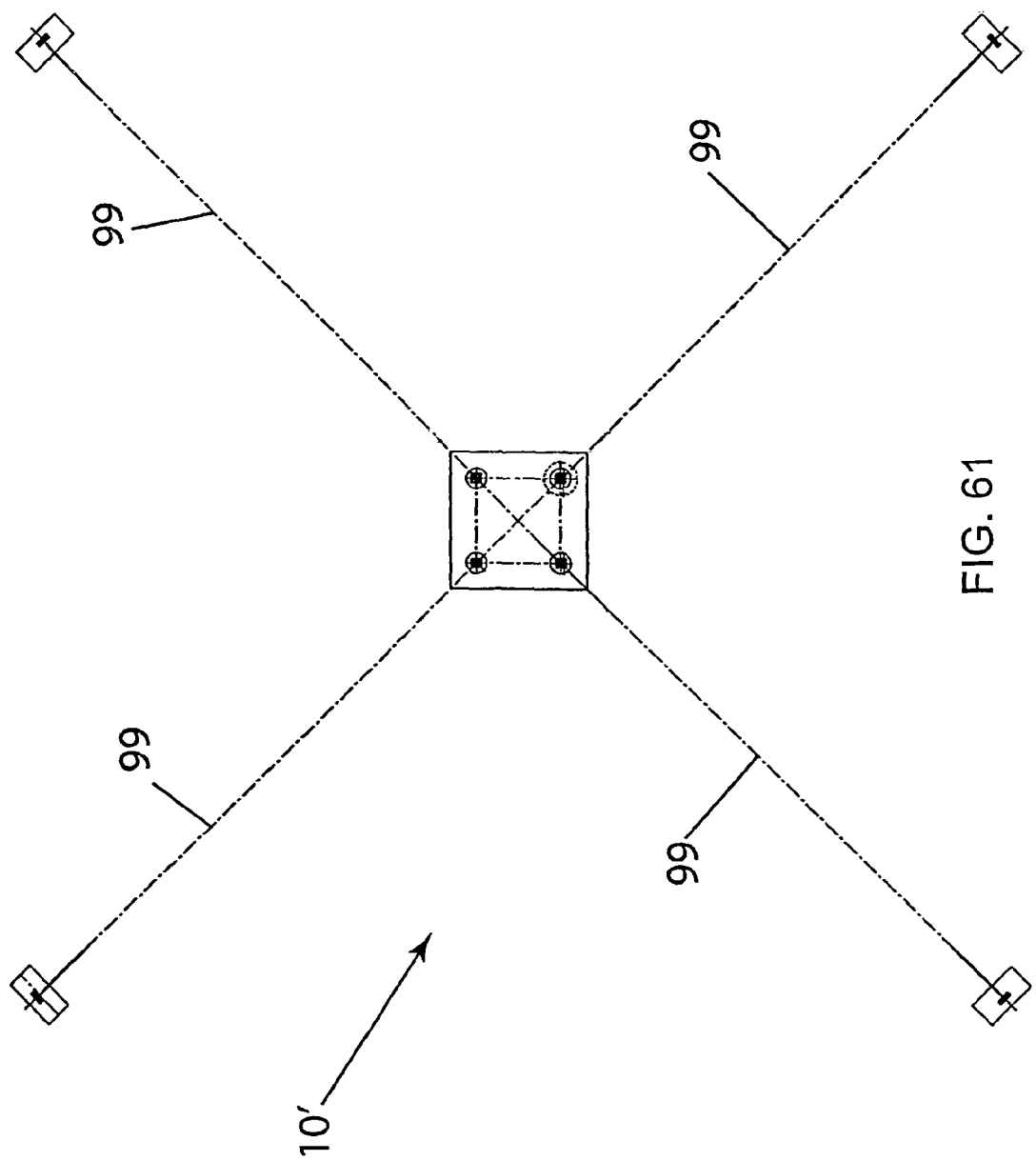
FIG. 61 is a top view of the foundation plan for the framework of FIG. 25.

For guy wire-type modular wind-driven electrical power generator embodiment 10', guy wires 99 are connected at one end to drive module 11i through a thimble-and-shackle apparatus 101 as shown in FIGS. 59 and 60 and are connected at another end to footings 103 as shown in FIGS. 25, 56 and 61. The guy wires 99 are attached to the footings 103 via anchor shafts 105 that include a head 107 capable of receiving three guy wires 99. Tensioned guy wires 99 support modular wind-driven electrical power generator embodiment 10' in an upright position.

Exemplary vane assembly 15 structure and improved methods of manufacture will now be described with reference to FIGS. 1-17C. Each vane assembly 15 of each drive module 11a-11i includes shaft 37 and plural stacks of rotors 115. Each rotor 115 includes vanes 117 which extend radially outward from shaft 37. In the example, each vane assembly 15 comprises four rotors 115a, 115b, 115c, 115d and each rotor 115 includes four vanes 117a, 117b, 117c, 117d for a total of 16 vanes in each exemplary vane assembly 15. Vane assembly 15 may include any number of rotors 115 and each rotor 115 may include a greater or lesser number of vanes 117 provided that vane assembly 15 is balanced for rotation about shaft 37 rotational axis 51. Most typically, rotational axis 51 is a vertical axis as shown in the figures. However, axis 51 is not required to be vertical.

In the example, each rotor 115 and vane 117 of each vane assembly 15 is of an identical structure which advantageously facilitates manufacture and controls cost. However, the number of rotors 115 and vanes 117 and the size of the rotors and vanes may vary from vane assembly 15 to vane assembly 15 provided that the vane assembly 15 is balanced for rotation about axis 51.

Figure 4:
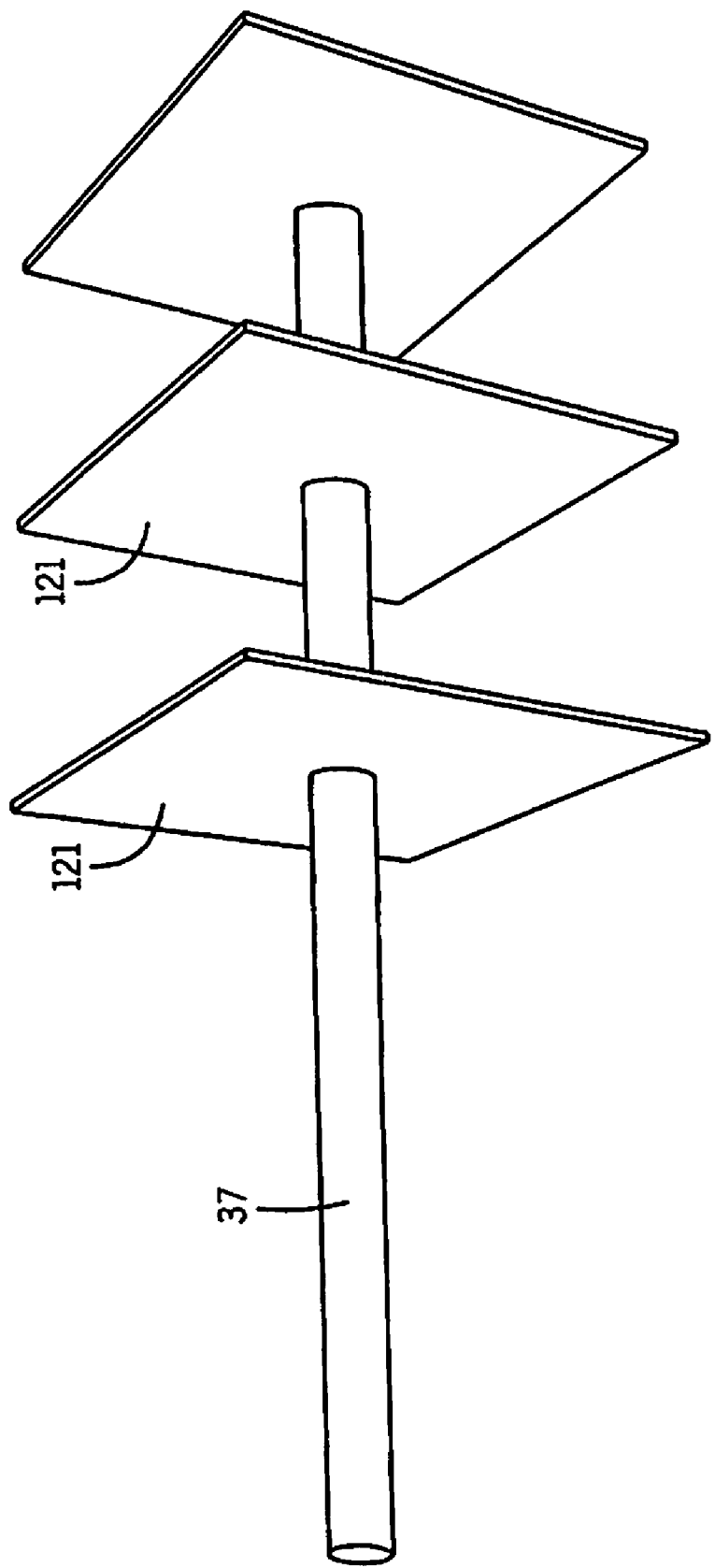
FIG. 4 is perspective view of a partially assembled exemplary shaft of a type used in the drive modules of FIGS. 1-3 with vane-support plates secured thereto.
Figure 5:
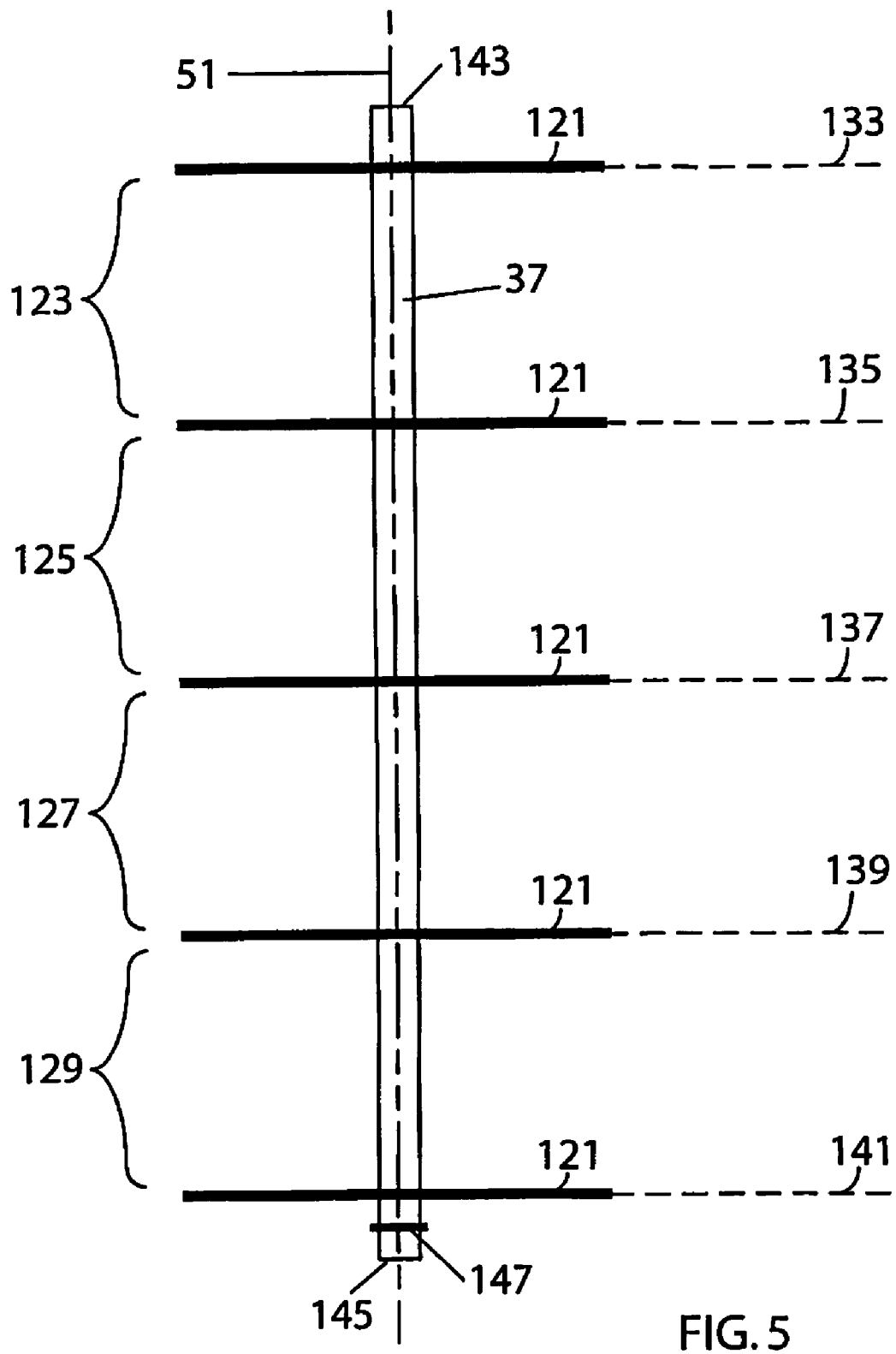
FIG. 5 is a side elevation view of a fully assembled exemplary shaft of a type used in the drive modules of FIGS. 1-3 with vane-support plates secured thereto.
Figure 6:
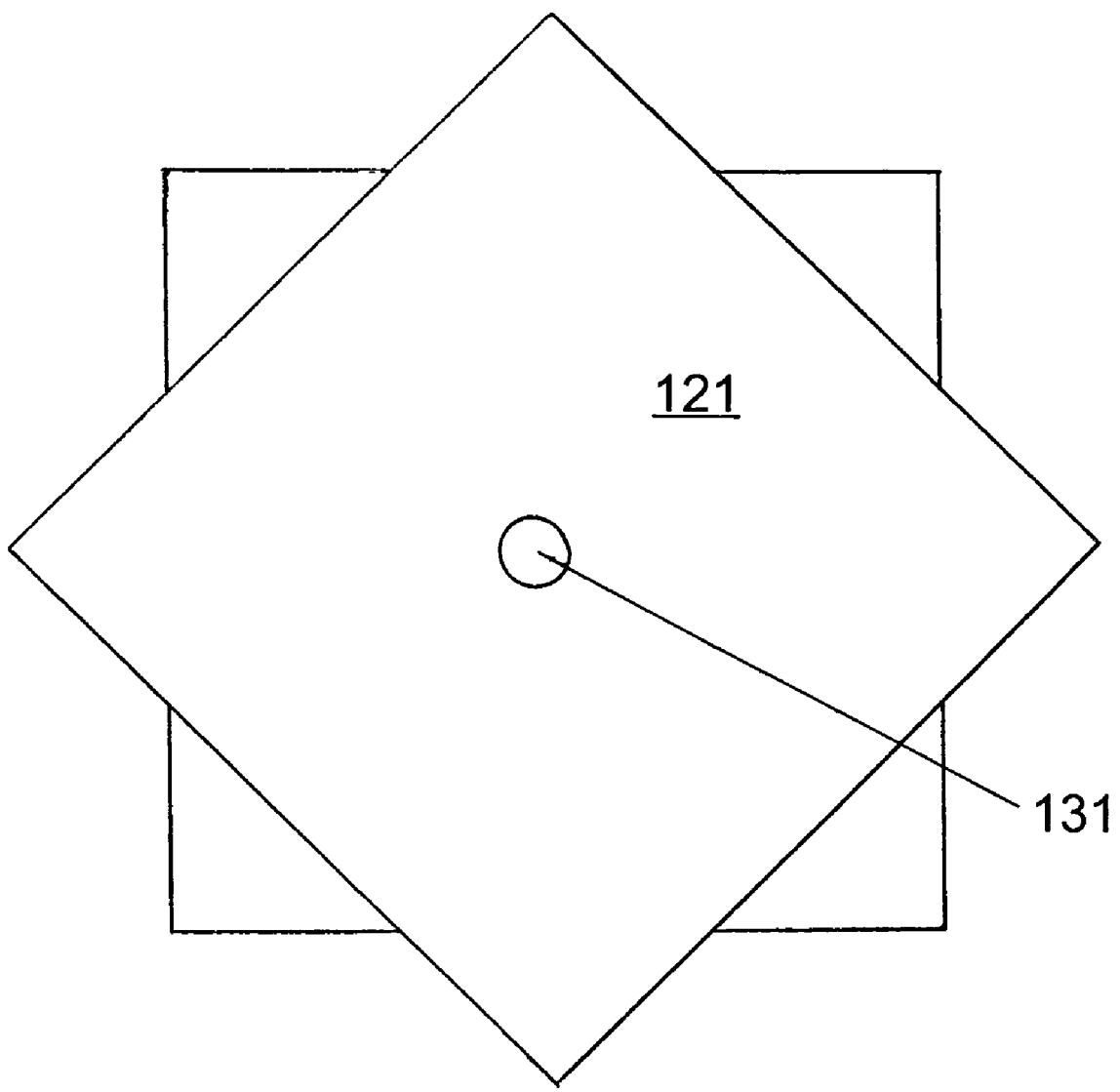
FIGS. 6-8 are top views of alternative exemplary vane-support plate embodiments.
Figure 7:
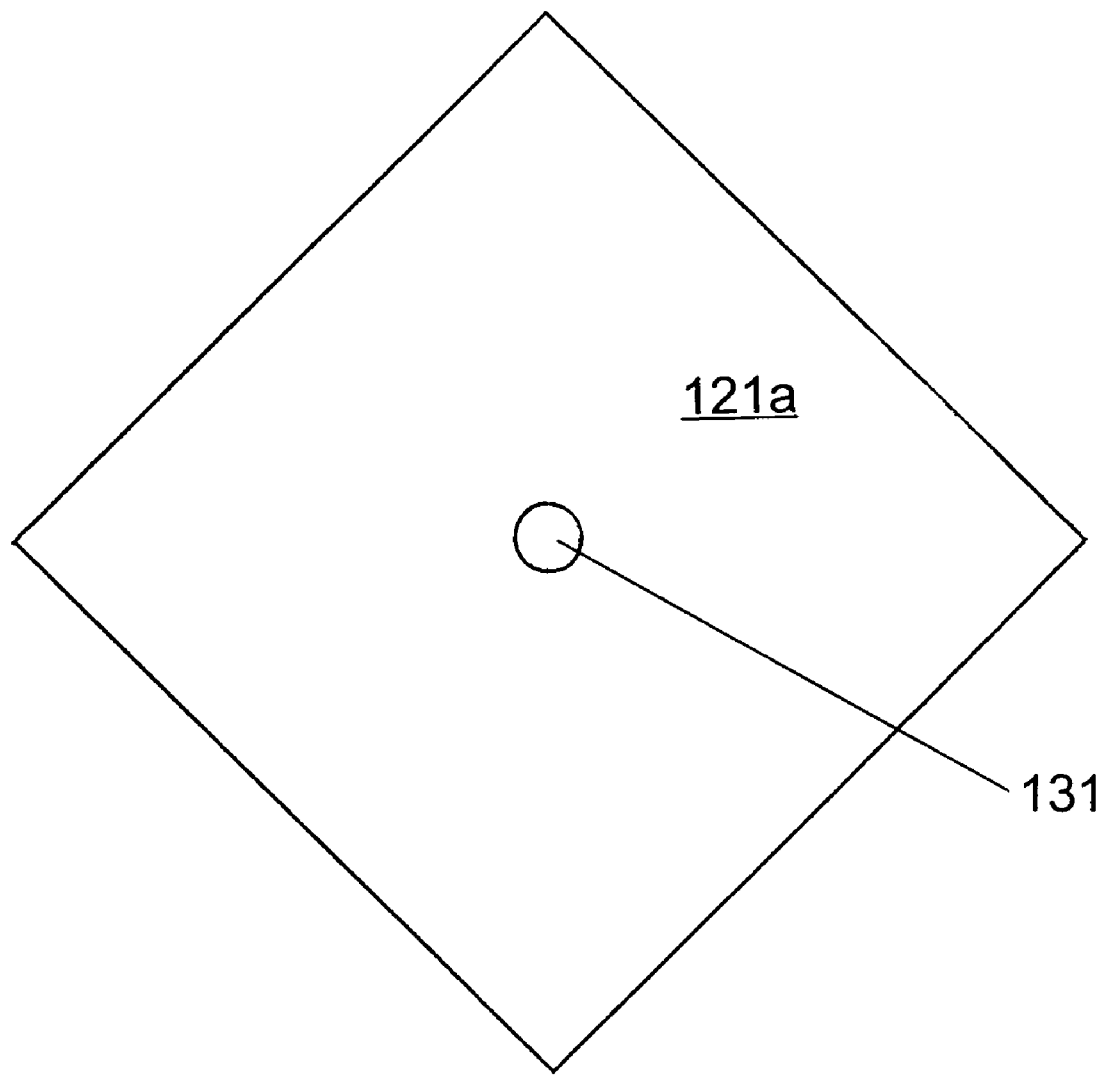
Figure 8:
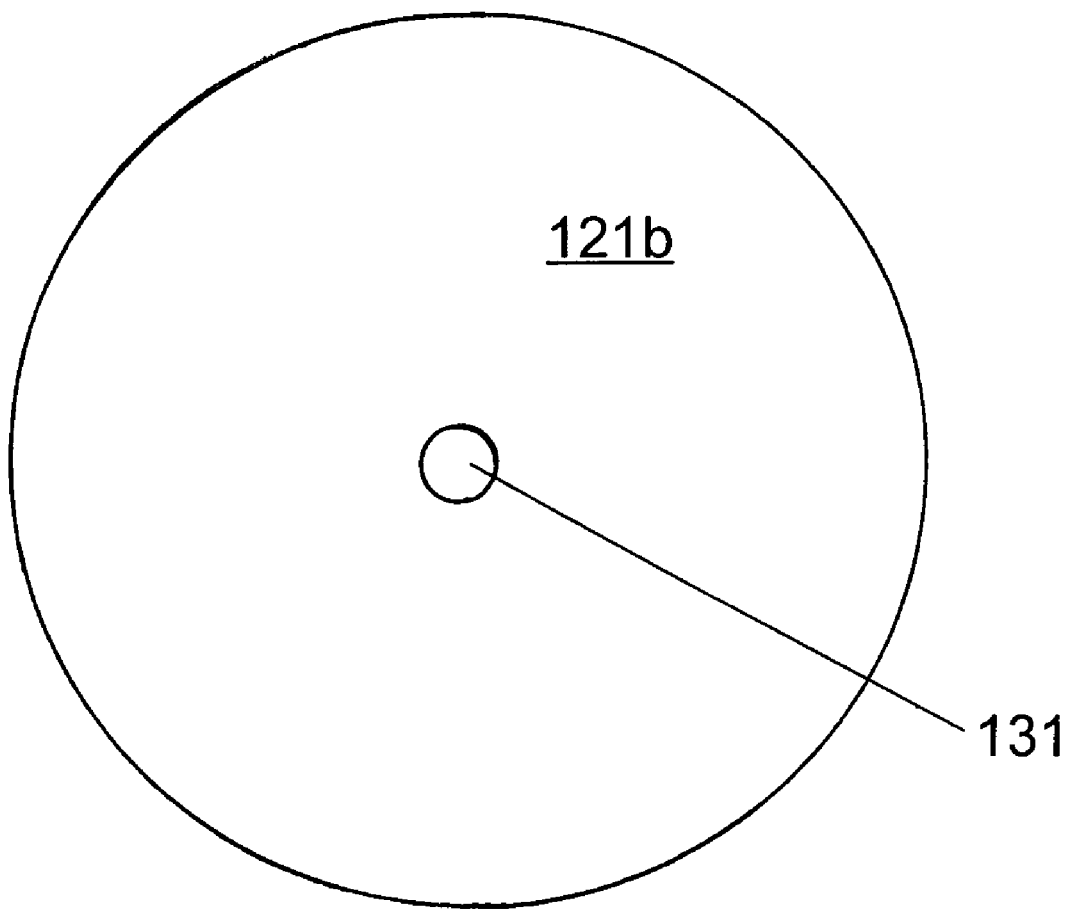

Referring to FIGS. 4 and 5, vane-support plates 121 are spaced apart axially along shaft 37 between shaft 37 upper 143 and lower 145 ends. Vane-support plates 121 are grouped into plate pairs 123, 125, 127, 129. As shown in FIG. 6, each vane-support plate 121 includes a center opening 131 through which shaft 37 is inserted. Each vane-support plate 121 is preferably secured to shaft 37 by welding. Each vane-support plate 121 of the plate pairs 123-129 extends radially outward from shaft 37 so that shaft 37 is balanced during shaft 37 rotational displacement about axis 51. As shown in FIGS. 4 and 5, each vane-support plate 121 is preferably in a separate plane 133, 135, 137, 139, 141 which is perpendicular to shaft 37 and axis 51 and parallel to each other plane. FIGS. 6-7 illustrated that vane-support plates 121 can have different geometries. Plate 121 in FIG. 6 is a sixteen-sided plate formed by welding triangular gussets onto a square plate. Plate 121a is a square and plate 121b is a circle. As is apparent from FIGS. 6-8, the edges or corners of each plate 121-121b extend equidistantly radially outward from center 131 so that each vane-support plate 121-121b is balanced during shaft 37 rotation. A material suitable for use in manufacture of plates 121-121b is ¼" steel plate.

Annular collar 147 is secured in place on shaft 37 proximate shaft lower end 145. Collar 147 supports shaft 37 on thrust bearing 41 provided for each drive module 11a-11i and limits lateral shaft 37 movement as noted previously.

Figure 14:
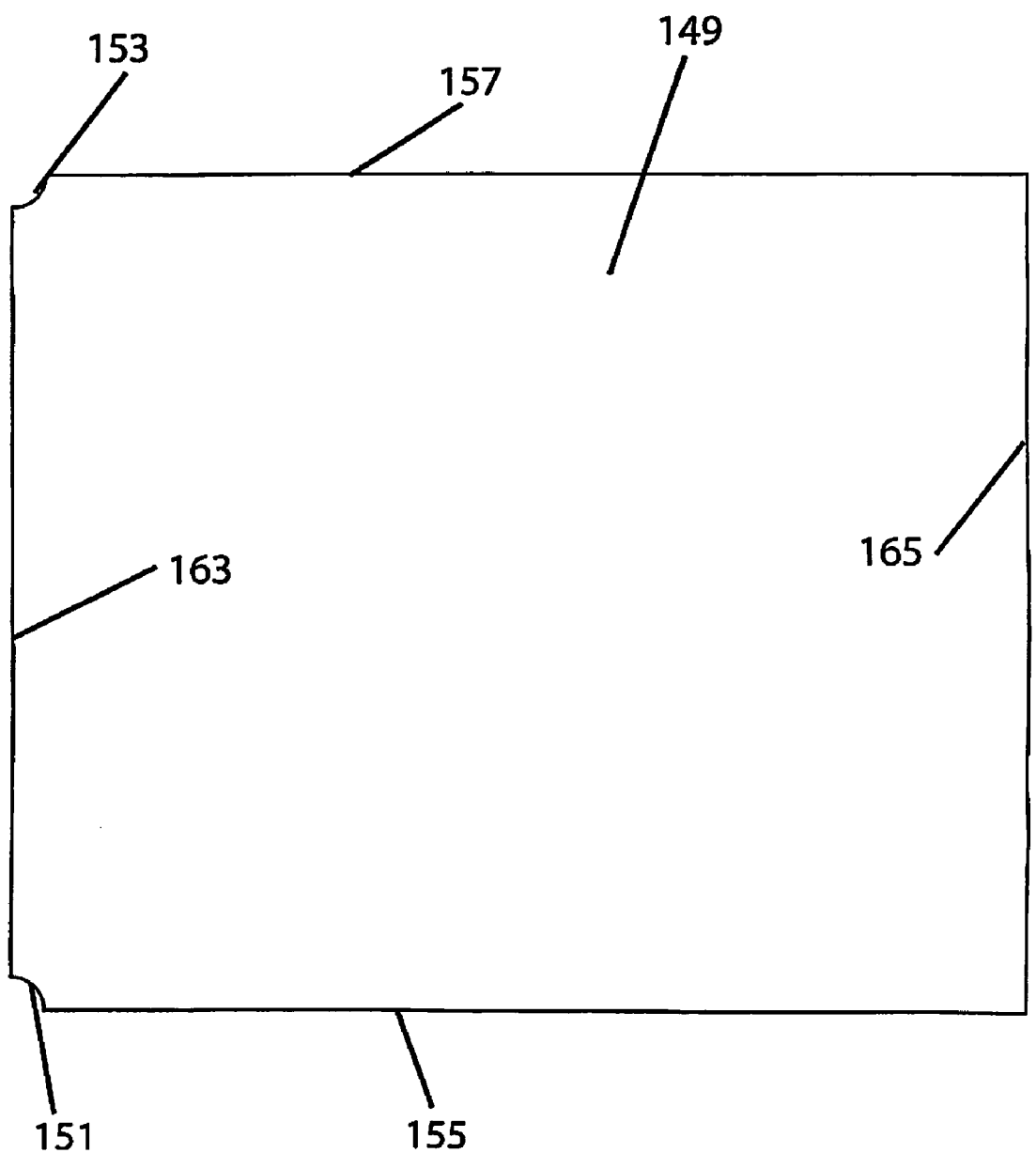
FIG. 14 is a top view of a sheet material panel before bending to form a vane.
Figure 15:
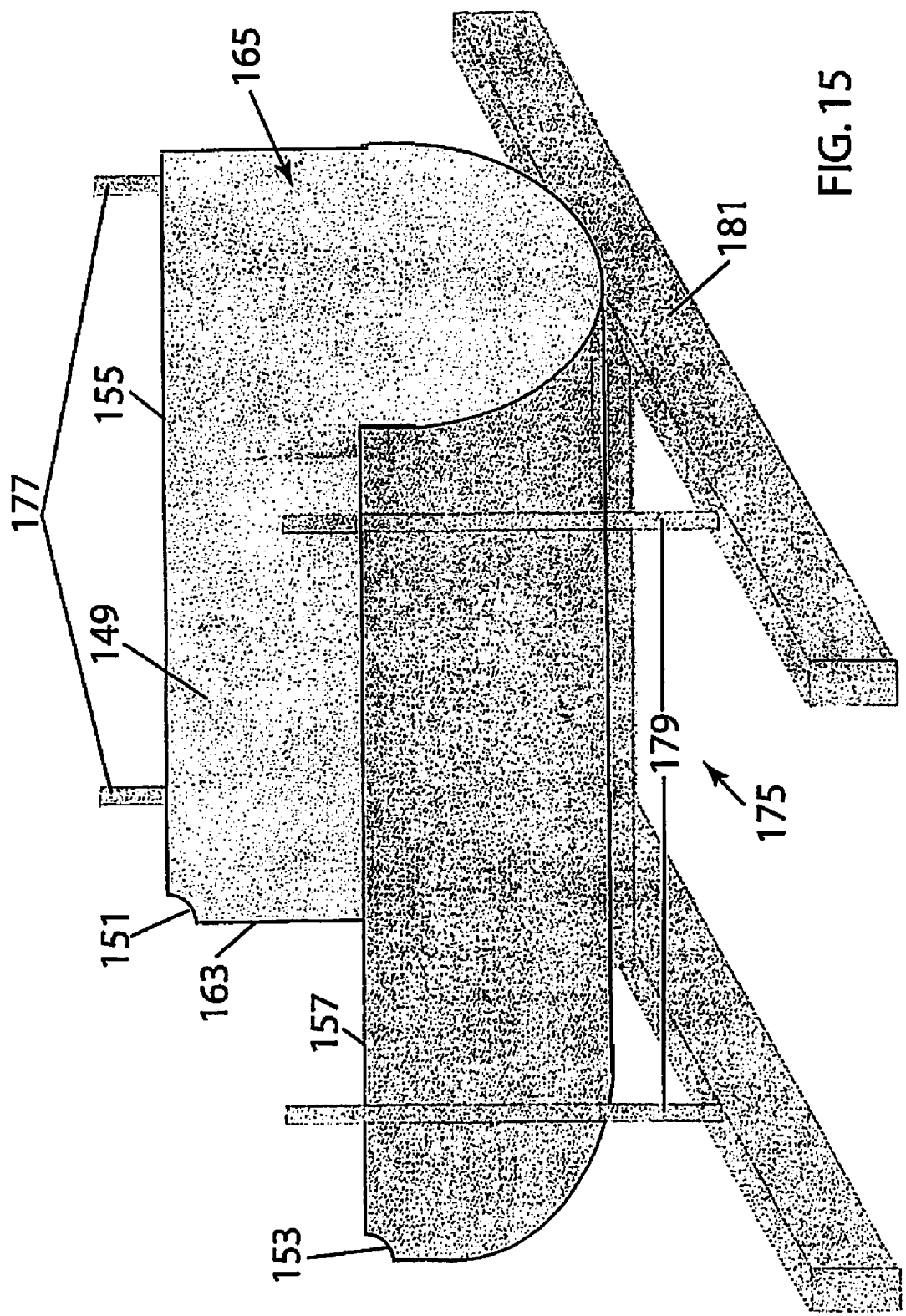
FIG. 15 is a perspective view of the jig of FIG. 13 showing bending of a sheet material panel to form a vane.
Figure 16:
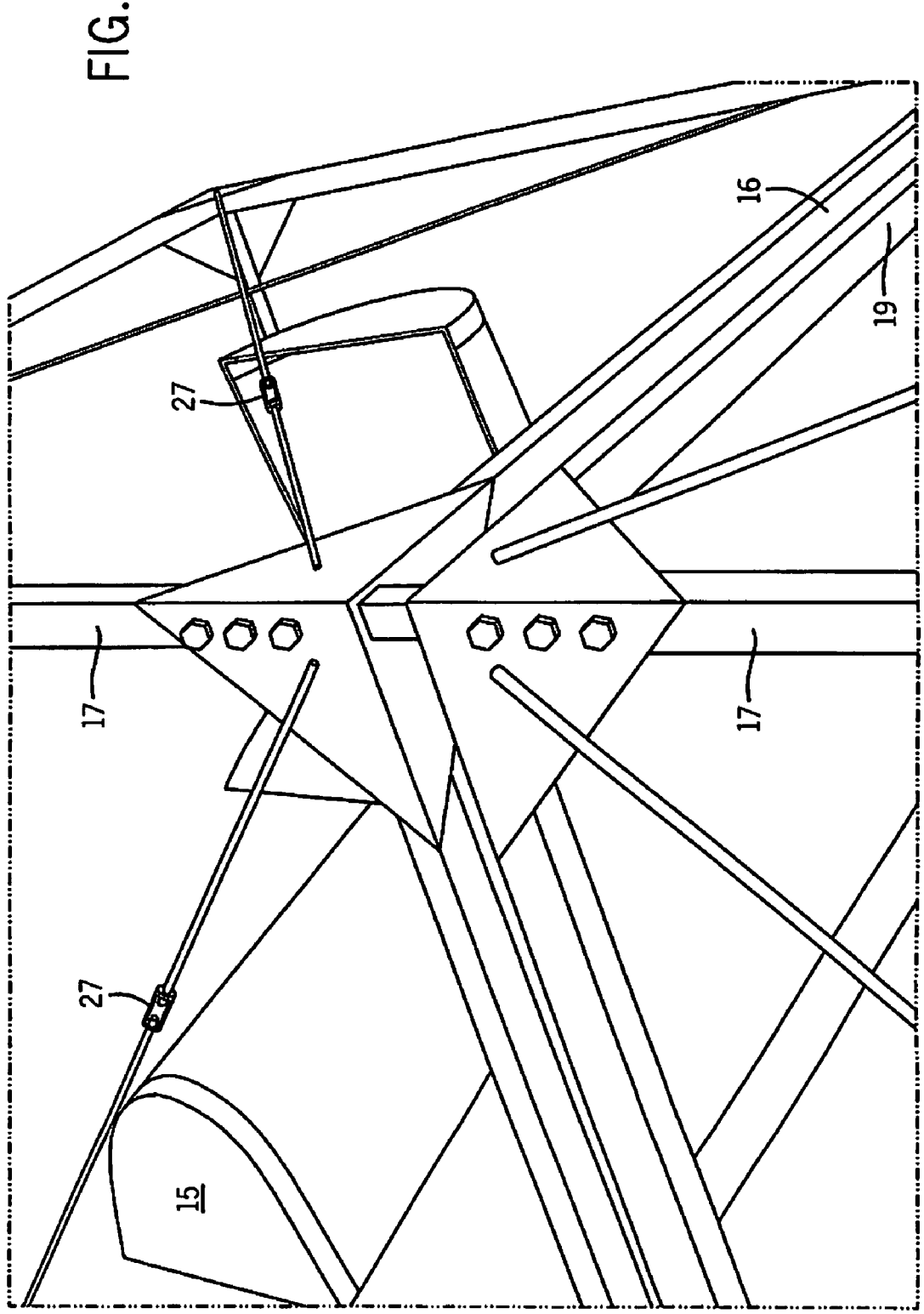
FIG. 16 is perspective view showing connecting structure joining the frames comprising the drive modules of FIGS. 1-3.

Referring to FIGS. 14-15, each vane 117 is formed from a sheet of bendable material 149. A separate bendable material sheet 149 is provided for each vane 117 comprising vane assembly 15. Each sheet 149 includes cut outs 151, 153 provided where sheet 149 abuts shaft 37. The edges defining each cut out 151, 153 are preferably welded directly to shaft 37 during manufacture. If a cylindrical shaft 37 is utilized, cut outs 151, 153 are arcuate as shown in FIG. 14.

Figure 17B:
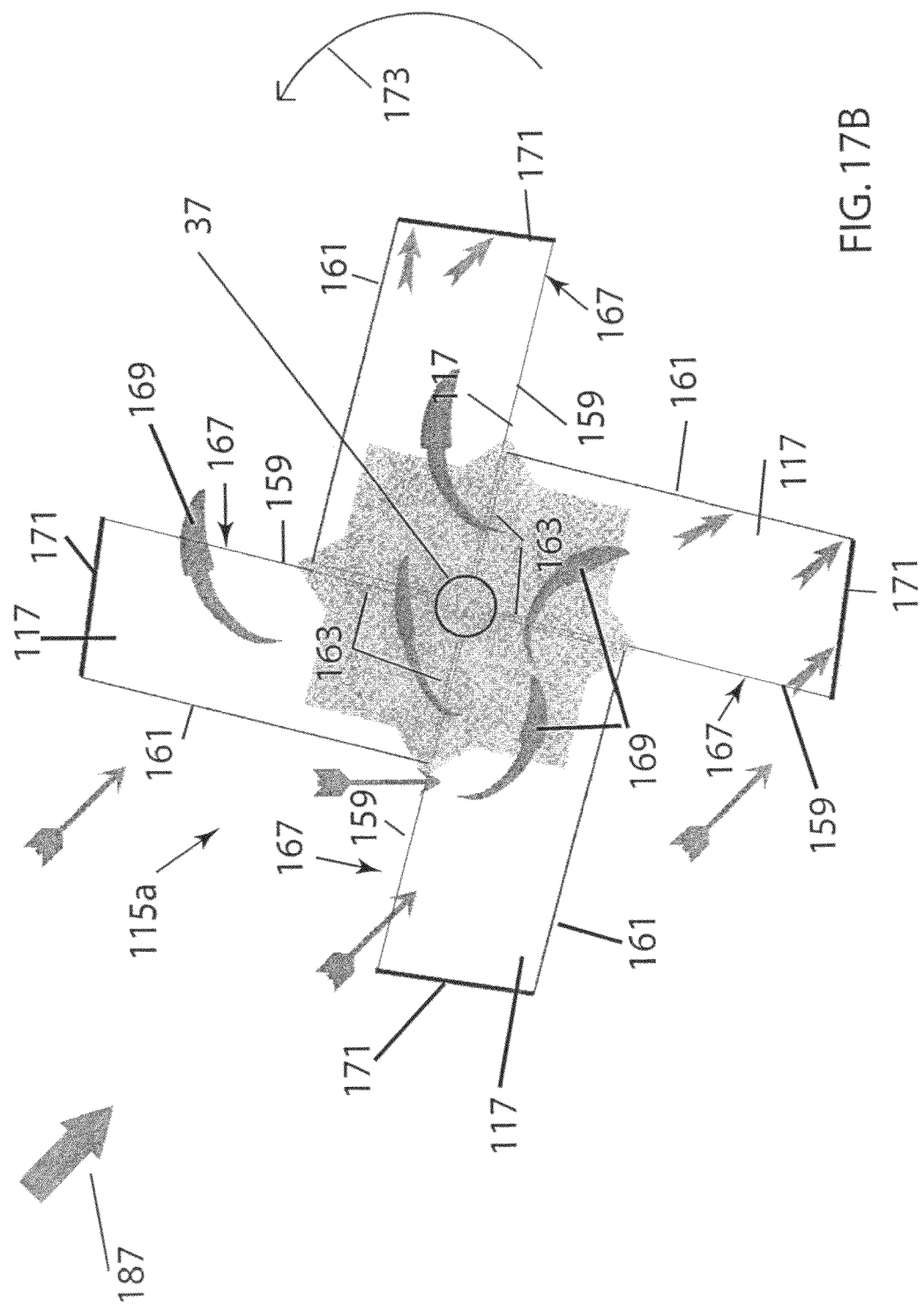
Figure 17C:
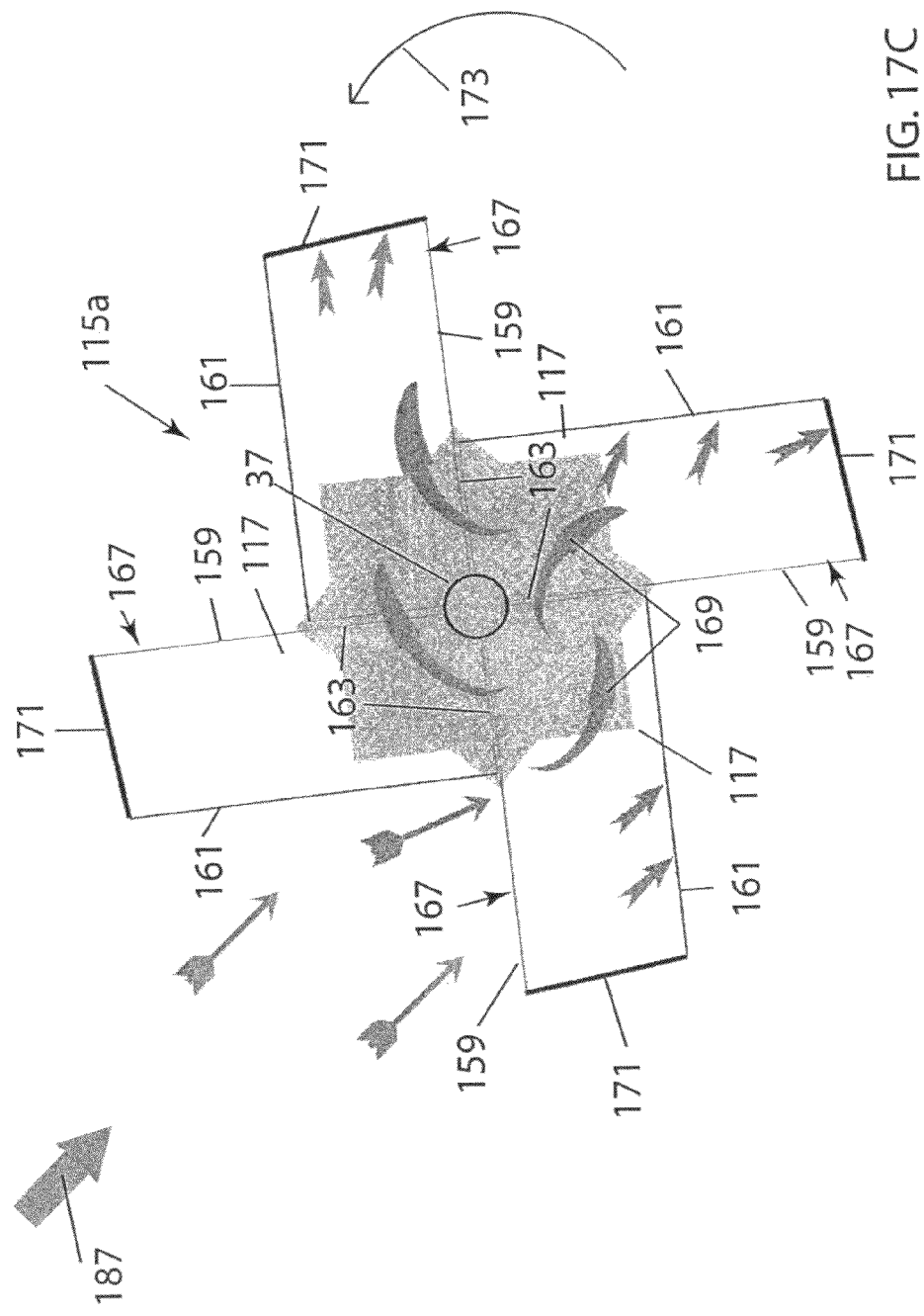

Each vane 117 is formed by bending each sheet of material 149 so that opposite ends 155, 157 of the bendable material sheet 149 are brought toward the other, naturally forming a curved shape including an open vane trailing side 159, a closed vane leading side 161 and open inboard 163 and outboard ends 165. Preferably, bending of sheet 149 results in a generally C-shaped vane 117 as shown in FIGS. 1-3, 9-12 and 15. Open vane trailing side 159 defines a vane 117 air inlet 167 into which air flows along an air flow path 169 between inlet 167 and open inboard end 163. Closed side 161 faces a direction of vane 117 movement during rotation of vanes 117 and shaft 37. End cap 171 is fitted over sheet material 149 to close vane end 165 and hold vane 117 shape prior to assembly of each rotor 115a-115d. End cap 171 may be tack welded to sheet 149. End cap 171 is preferably positioned, but is not required to be positioned, at an angle of between about 75° to 105° to a plane defined by open trailing side 159. It is most preferred that end cap 171 is angled at about 75° to the plane as shown in FIGS. 17A-17C because this angled position improves momentum transfer to vanes 117 as described below.

Referring again to FIGS. 1-3, 9-12 and 15, bending of sheet 149 causes closed vane leading side 161 to assume a generally concave configuration facilitating forward movement of vane 117 and reducing drag as each vane 117 rotates about axis 51 in the direction of arrow 173 responsive to momentum transfer from the air. An exemplary form of sheet material 149 suitable for use with the exemplary vanes 117 can be 5'×6'×20 gauge sheet metal.

Figure 13:
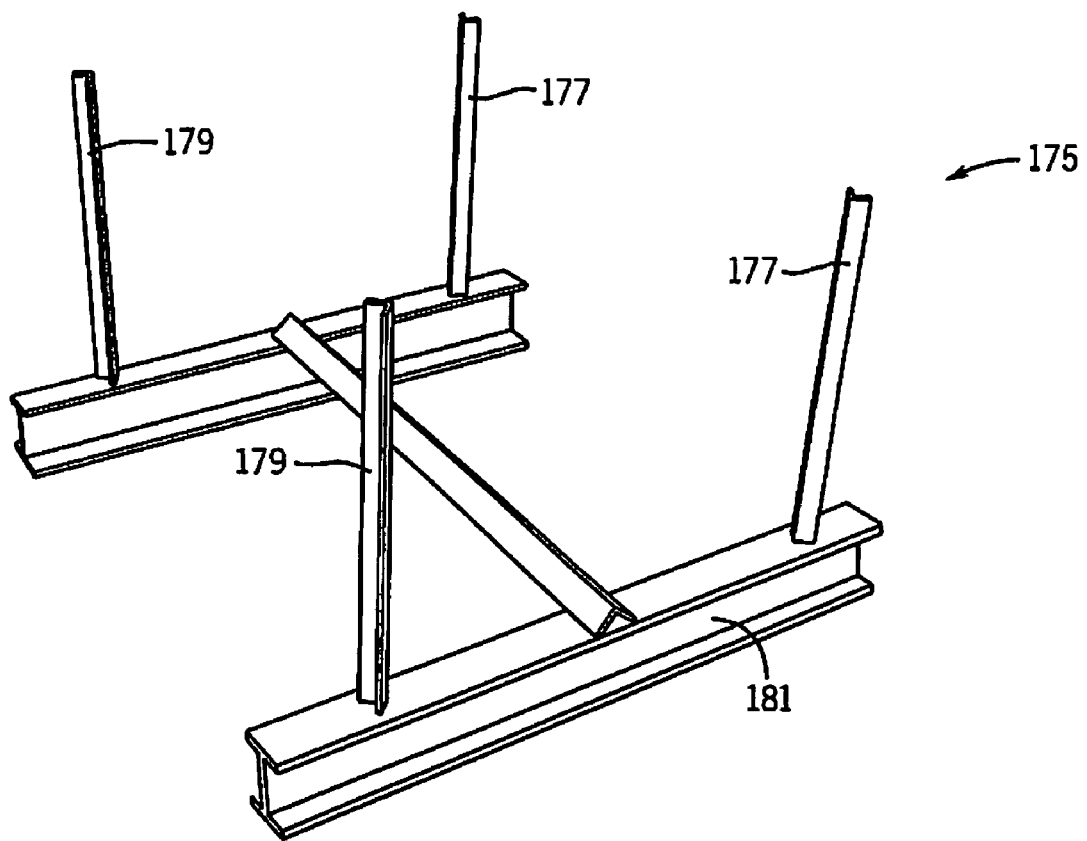
FIG. 13 is a perspective view of an exemplary jig which may be used to form sheet material into vanes having the profile shown in FIGS. 9-11.

Sheet material 149 may be formed into the shape of a vane 117 using a jig 175, an example of which is illustrated in FIGS. 13 and 15. Jig 175 includes two pairs 177, 179 of uprights supported on a base 181. Each upright pair 177, 179 is spaced apart from each other in a plane which is parallel to the other plane. Bending of sheet material 149 between upright pairs 177, 179 so that ends 155, 157 are brought toward the other forms a consistently uniform curvature in each vane 117.

Figure 9:
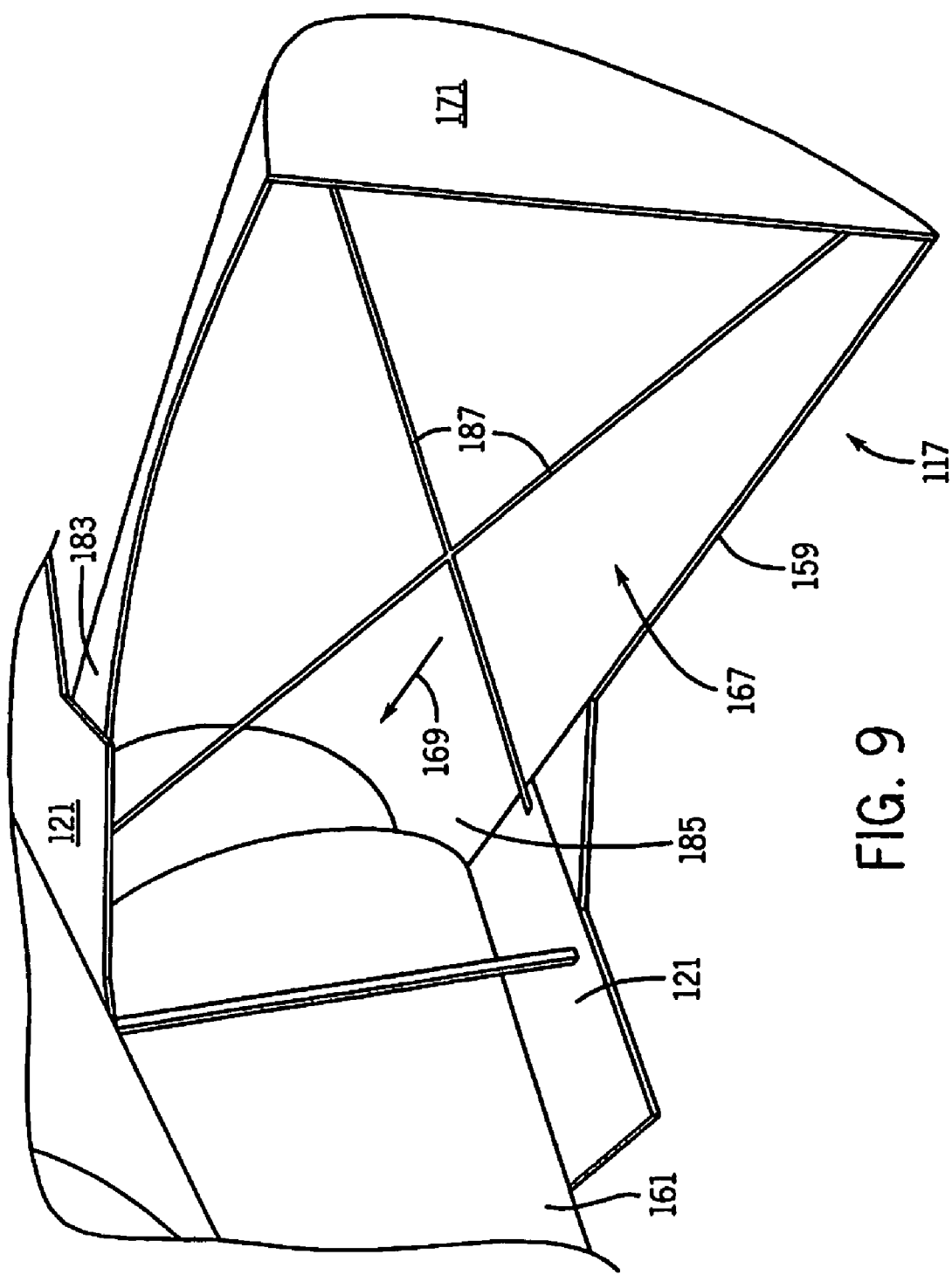
FIG. 9 is a partial perspective view showing an exemplary vane, including a vane trailing side, vane air inlet, and end cap.
Figure 10:
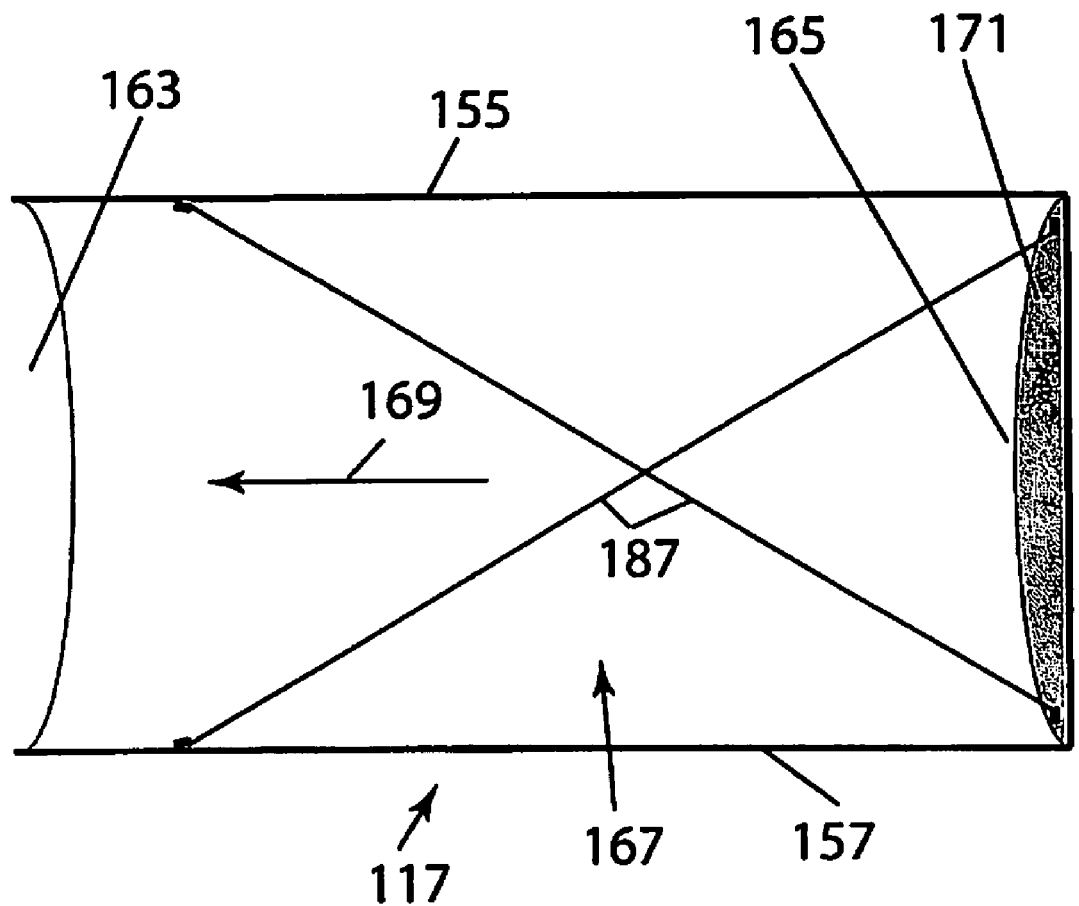
FIG. 10 is a front side elevation view of the vane of FIG. 9.
Figure 11:
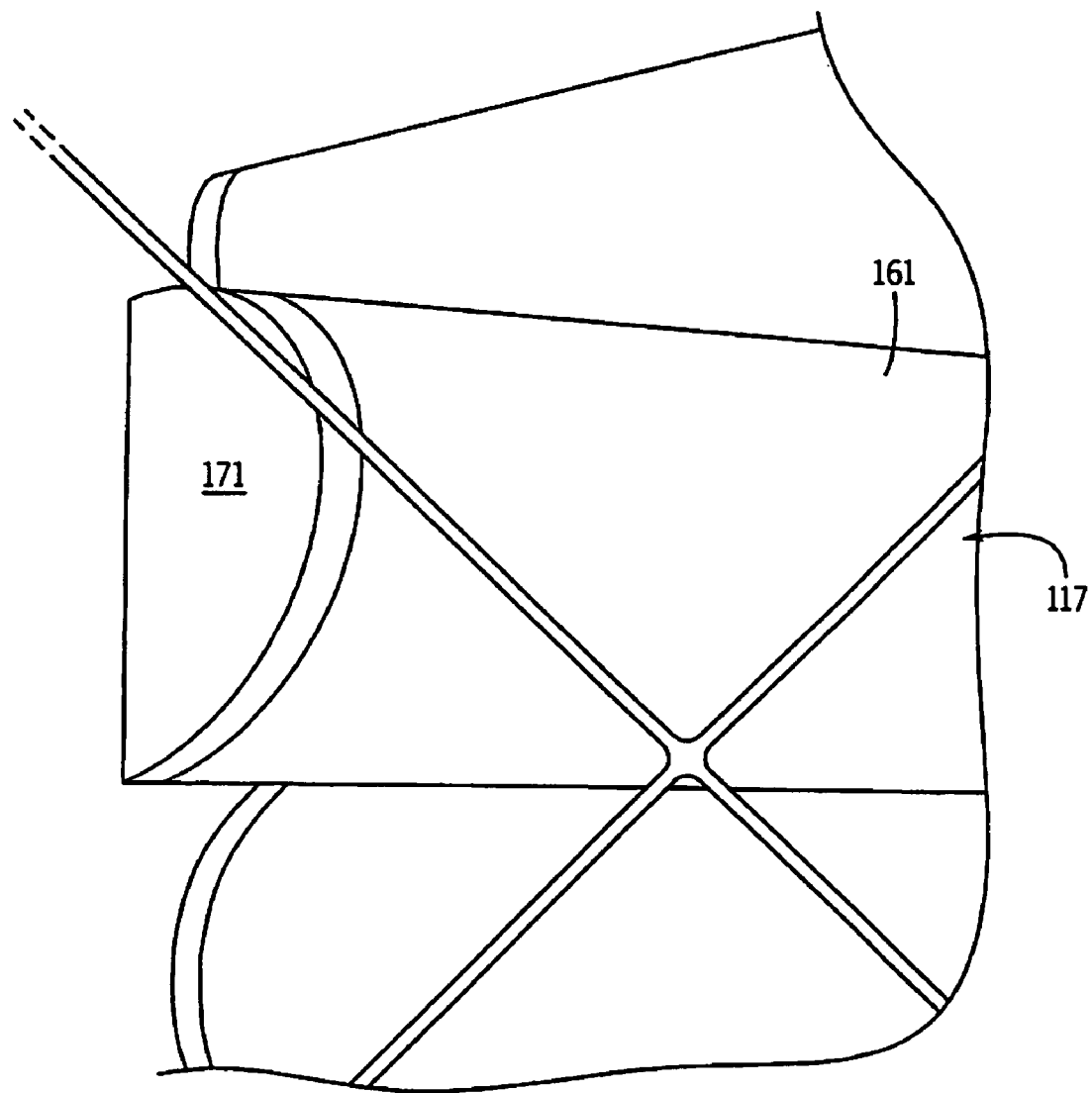
FIG. 11 is a perspective view of the exemplary vane of FIG. 9-10 but showing an exemplary vane leading side and end cap.
Figure 12:
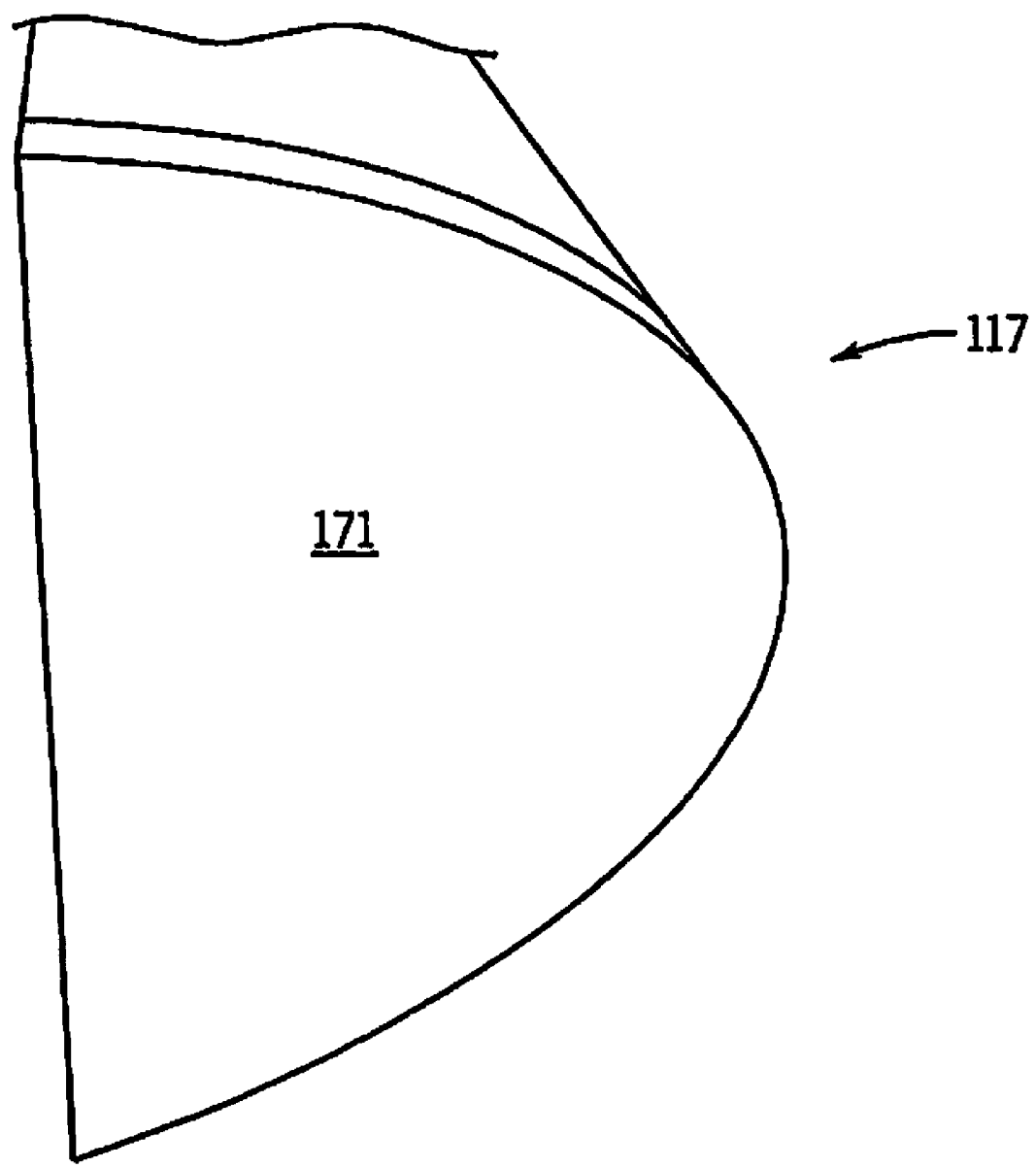
FIG. 12 is a side view of the exemplary vane of FIGS. 9-11 showing the vane profile and end cap.

As illustrated in FIG. 9, each rotor 115a-115d is made by successive attachment of vanes 117 to one plate pair 123-129. Preferably, all vanes 117 comprising a rotor (e.g., rotor 115a) are attached before manufacturing the next rotor (e.g., rotor 115b) so as to avoid overly unbalancing shaft 37 as described below. In the examples, upper 183 and lower 185 sides of each vane 117 formed by bending sheet material 149 are secured between one plate pair (e.g., pairs 123-129). Cut out portions 151, 153 are positioned to abut shaft 37. Each upper and lower side 183, 185 is secured in abutting relationship with a respective vane-support plate 121 of one plate pair 123-129. Sheet 149 is preferably welded to shaft 37 along cut-out portions 151, 153 and to plates 121 of the plate pair 123-129 to provide a 117 held in a fixed-position relationship with shaft 37 and vane-support plates 121 forming one of the plate pairs 123-129. Each vane 117 is held in its curved orientation by means of the foregoing welding operations and by end cap 171 which is preferably tack welded to sheet 149. In the illustrated example, each vane 117 is about 30" in height between upper and lower sides 183, 185, about 28" deep between open trailing side 159 and closed leading side 161, and is about 6' long between ends 163, 165. Cross braces 187 may be provided to further reinforce each vane 117. If provided, cross braces 187 are welded at one end to a vane-support plate 121 and at an opposite end to end cap 171 as shown in FIGS. 9-10. In the embodiment, cross braces 187 are 5/16"×60' rod stock steel.

Each vane 117 of each rotor 115a-115d extends radially outward from shaft 37 so that shaft 37 and vane assembly 15 is balanced during shaft 37 rotational displacement about axis 51. Preferably, each vane 117 is identical and extends outward from shaft 117 an identical linear distance.

The vanes 117 comprising each rotor 115a-115d are preferably arranged about shaft 37 as shown in FIGS. 17A-17C. For a sixteen-sided vane-support plate 121 (FIG. 6), vane upper and lower sides 183, 185 are preferably welded to vane-support plates 121 of a plate pair (e.g. pairs 123-129) so that vane open side 159 bisects the triangular gussets welded to plate 121. This arrangement provides ample support for vanes 117 extending outwardly from vane-support plates 121.

As shown in FIGS. 17A-17C, the open inboard end 163 of each vane 117 is adjacent the open inboard end 163 of the adjacent vane 117. This arrangement provides an air flow path 169 represented by the arrows in FIGS. 17A-17C. Wind-driven air enters each vane 117 through air inlet 167 contacts vane 117 and exits each vane 117 through the outlet provided by inboard open end 163 whereupon the air moves into the inboard open end 163 of the adjacent downstream vane 117 and out of rotor (e.g., rotor 115a-115d) through air inlet 167 of such adjacent downstream vane 117.

Figure 2:
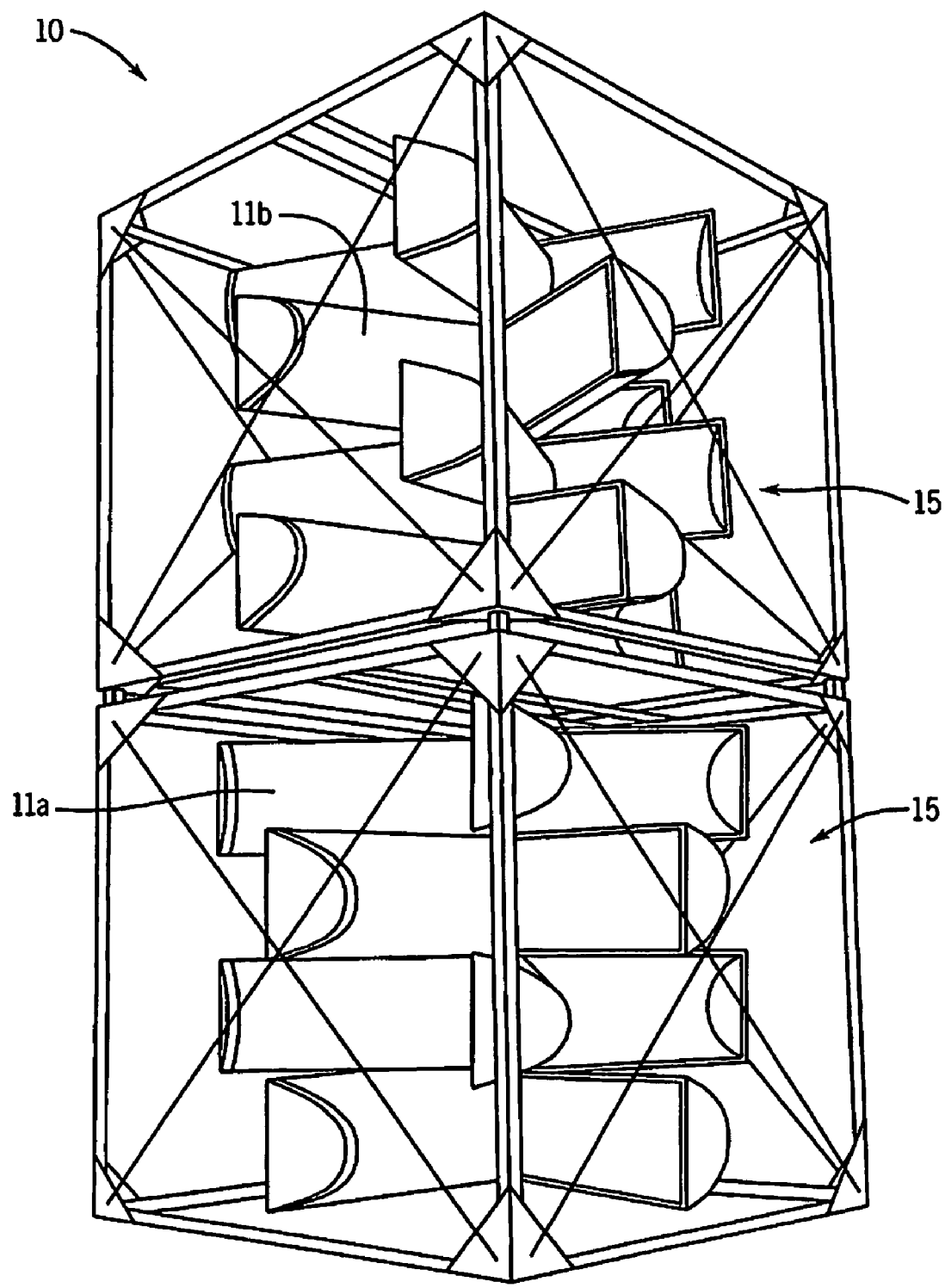
Figure 3:
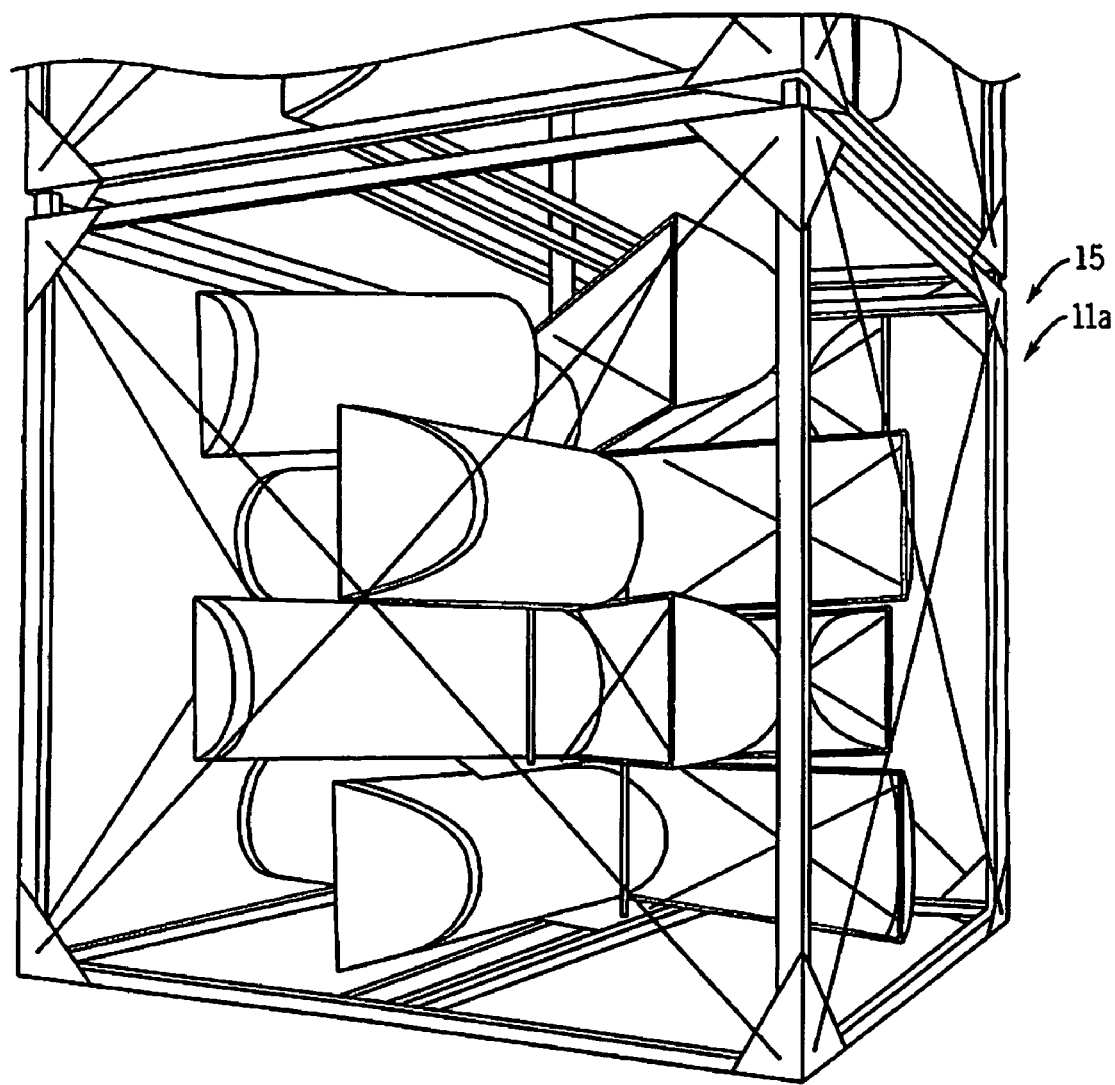
FIG. 3 is an partial view of the generator apparatus of FIGS. 1 and 2.

Each rotor 115a-115d is preferably offset from the adjacent rotor 115a-115d above and/or below by about 45° to provide the staggered vane assembly arrangement shown in FIGS. 1-3. Offsetting of each rotor 115a-115d from the other as described provides for more uniform momentum transfer from the wind to the rotors 115a-115d comprising each vane assembly 15. In addition, offsetting of the rotors 115a-115d is believed to cause a "pull effect" of air passing over the leading side 161 of vanes 117 that would not exist if the vanes 117 were aligned directly above the other.

The modules 11a-11i and 13 comprising wind-driven electrical power generator embodiments 10 and 10' are easily and efficiently manufactured at the manufacturing facility for transport to the site at which the generator will be assembled. Each drive module 11a-11i is first manufactured by assembling the framework of lower, side and upper frame rails.

The vane assemblies 15 may be assembled with shaft 37 mounted in its drive module 11a-11i in an upright, vertical orientation or with shaft 37 positioned outside of the drive module 11a-11i on a set of stands, one for each shaft end 143, 145. Initially, the desired number of plates 121 are secured to shaft 137, preferably by welding for the examples illustrated.

The vanes 117 for each rotor 115a-115d are separately manufactured by bending sheet material 149 with jig 175 preferably followed by attachment of end cap 171 to outboard end 165 to maintain the curved vane 117 profile. Vane 117 inboard end 163 and vane 117 upper and lower sides 183, 185 proximate end 163 are secured to a respective plate pair (e.g., pairs 123-129), preferably be welding. Each vane 117 is added to complete one rotor (e.g., rotor 115a) before proceeding to the next rotor (e.g., rotor 115b) to maintain a generally balanced vane assembly 15. The process is repeated for each vane 117 of each rotor 115a-115d until the vane assembly 15 is completed. If the vane assembly 15 is manufactured outside of the drive module 11a-11i, a crane or other lifting device may be used to position the vane assembly 15 in the drive module 11a-11i.

The novel method of manufacturing the vanes 117 by bending the sheet material 149 and fitting the sheet material 149 of the vane 117 between a plate pair (e.g., 123-129) to assemble the rotors 115a-115d comprising the vane assembly 15 is highly efficient. The method is so efficient that a single worker is capable of manufacturing a vane assembly 15 in less than one eight hour work shift.

The wind-driven electrical power generator embodiments 10 and 10' are assembled at the installation site by successively raising one or more module 11a-11i and connecting a new module below the raised module or modules 11a-11i. The process is repeated until the entire assembly is stacked onto generator module 13.

Once assembled, the vane assemblies 15 provide a self-starting low-speed, wind turbine which rotates about axis 51. As illustrated in FIGS. 17A-17C, wind-driven air moving in the direction of arrow 187 enters the vane 117 air inlet 167 crosswise to the direction of air movement 187. Air enters inlet 167 and comes into contact with end cap 171 and sheet material 149 forming vane 117 as indicated by the arrows in FIGS. 17A-17C. Air moves along flow path 169 toward open inboard end 163, into the open inboard end 163 of the adjacent downstream vane 117 and into contact with end cap 171 and sheet material 149 of the adjacent vane 117 also as indicated by the small arrows.

The momentum of the air changes as the air moves along flow path 169 and changes direction toward inboard open end 163 and toward the adjacent vane 117. Momentum exchange occurs on entrance to each vane 117 and on exit from each vane 117 and on contact between air and each end cap 171. The change in momentum creates forces that turn the vane assemblies 15 on rotational axis 51 providing torque in drive shaft 67.

A novel characteristic of the vane assembly 15 structure manufactured as described herein, is that each rotor 115a-115d is powered through more than 180° of rotation even as the wind direction 187 remains constant. While not wishing to be bound by any particular theory and as shown in FIG. 17A, it is believed that air flow exhaust moving along path 169 from inboard end 163 of a vane 117 crosswise to the direction of wind movement 187 enters the adjacent vane 117 and contacts the angled wall of end cap 171 at the outboard end 165 of the adjacent vane 117. Momentum transfer between the air and the angled end cap 171 powers rotor (e.g., rotor 115a-115d) rotation past 180° as shown in FIG. 17A.

Drive shaft torque powers generator 73 through gears 75-79 and chains 85-87. Generator 73 converts the torque to electrical power.

Use of steel for construction of drive 11a-11i and generator 13 modules is preferred for manufacture of industrial-scale embodiments of modular wind-driven electrical power generators. However, other materials may be used depending on the size of the generator and the requirements of the end users. For example, the bottom, side and upper rails 16, 17, 19, 53, 55, 57 of the drive 11a-11i and generator 13 modules could be manufactured of wood, composite or like materials with the desired rigidity. Sheet material 149 could be made of materials other than bendable 20 gauge metal. For example sheet material 149 could comprise plastic sheet material. As new materials are developed, it is envisioned that such materials could be integrated into modular wind-driven electrical power generators.

The modular wind-driven electrical power generator apparatus embodiments 10 and 10' shown will have particular application for large-scale industrial power generation. One or many generator apparatus may be used to harvest the desired wind energy and to provide the desired electrical power. It is envisioned, however, that modular wind-driven electrical power generators may be scaled to meet the needs of many different end users including residential homeowners, commercial businesses and governmental users. Accordingly, wind-driven electrical power generator apparatus embodiments may be provided to residential homeowners in a smaller scale version or as a kit-type product for assembly by the homeowner.

Figure 62:
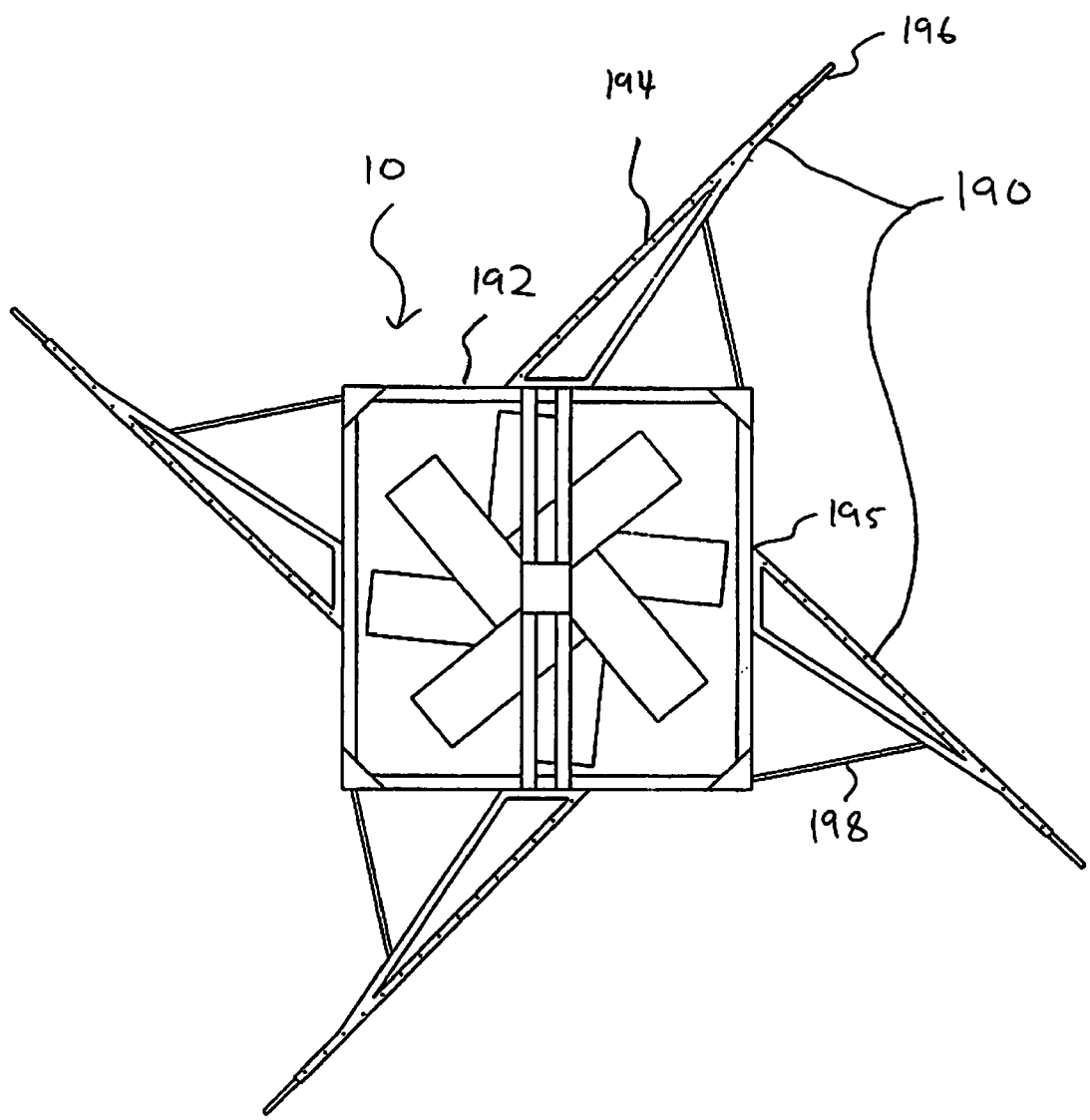
FIG. 62 is a top view of an alternative embodiment of a drive module.
Figure 63:
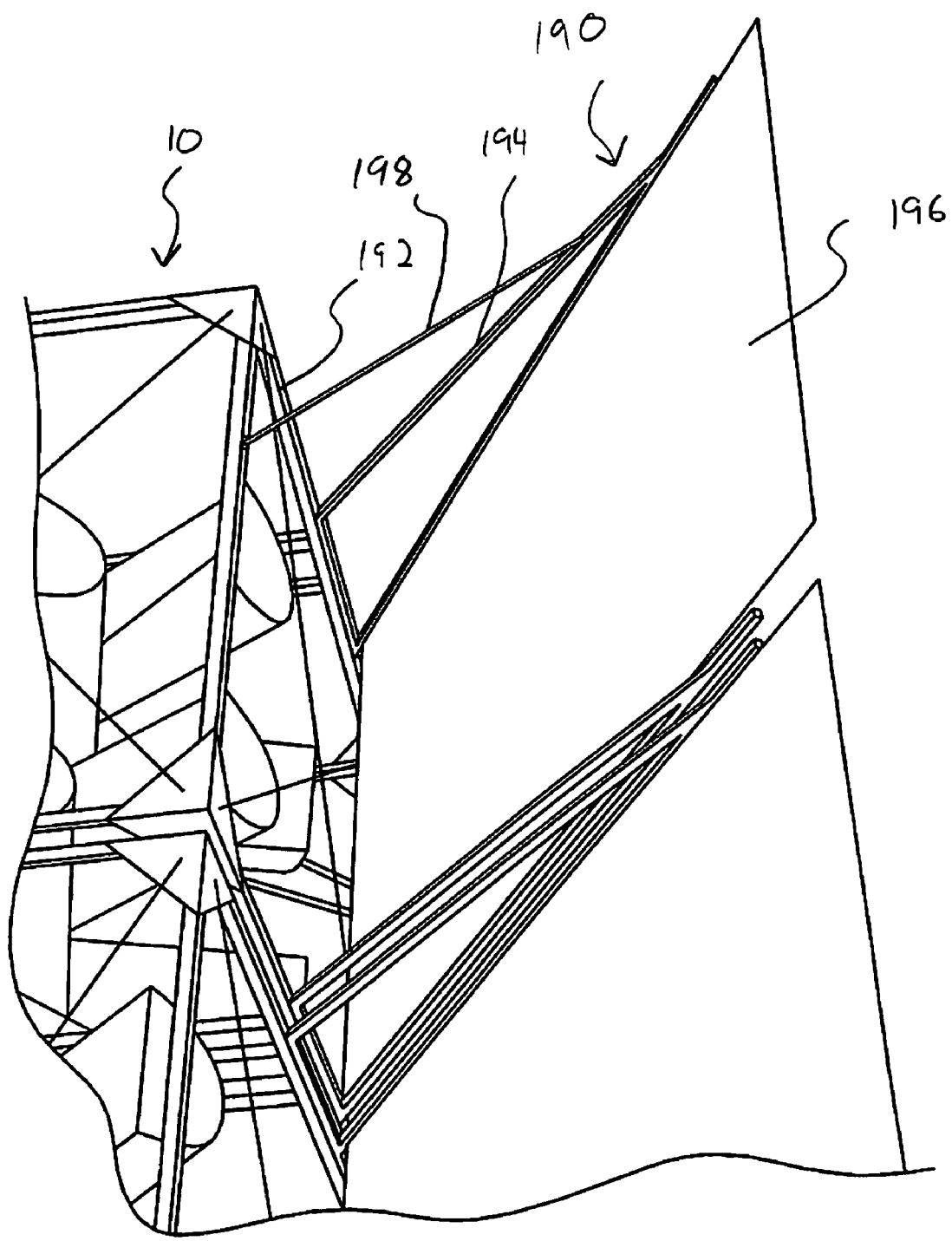
FIG. 63 is a partial perspective view of the drive module of FIG. 62.

Referring now to FIGS. 62-65, alternative embodiments of the drive module 10 are shown. A first alternative embodiment is shown in FIGS. 62 and 63 and includes a first baffle 190 on each outward facing side 192 of the drive module 10. The first baffle 190 includes two triangular shaped supports 194, with one attached to the lower frame rail 16 and one attached to the upper frame rail 19. In this preferred embodiment, the supports 194 are positioned so that the front edge 195 of the support 194 is about in the middle of the length of the rails 16, 19. The first baffle 190 further includes a sail 196 attached between the supports 194. In this preferred embodiment, the sail 196 of the first baffle 190 extends from the leading edge 195 of the supports 194 and is at an angle of between about 30 and about 60 degrees in relation to the rails 16, 19. It is highly preferred that the angle is about 45 degrees. In some embodiments, a secondary support 198 may extend from a module side rail 17 to one or both of the triangular shaped supports 194.

Figure 64:
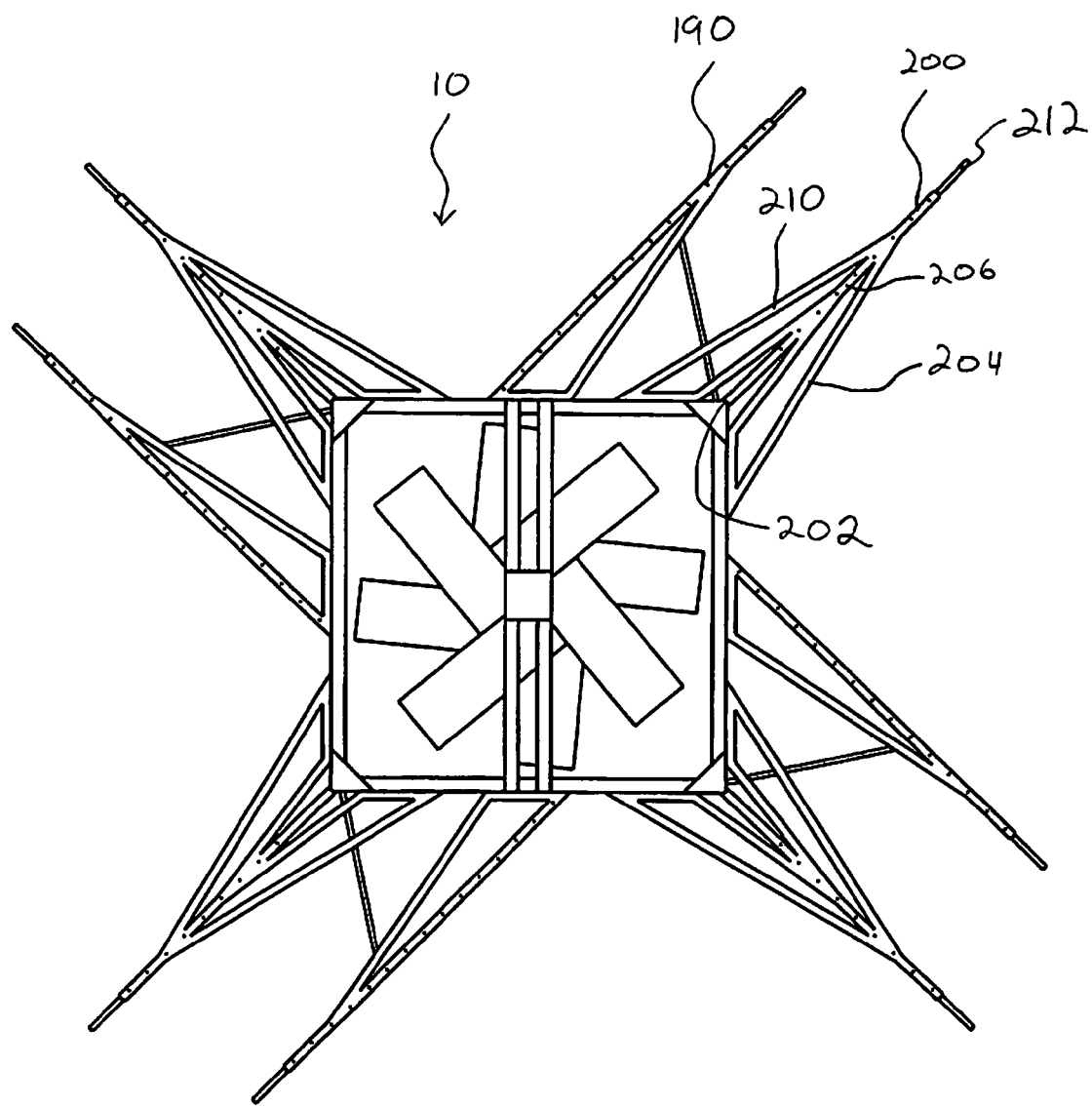
FIG. 64 is a top view of an alternative embodiment of a drive module.
Figure 65:
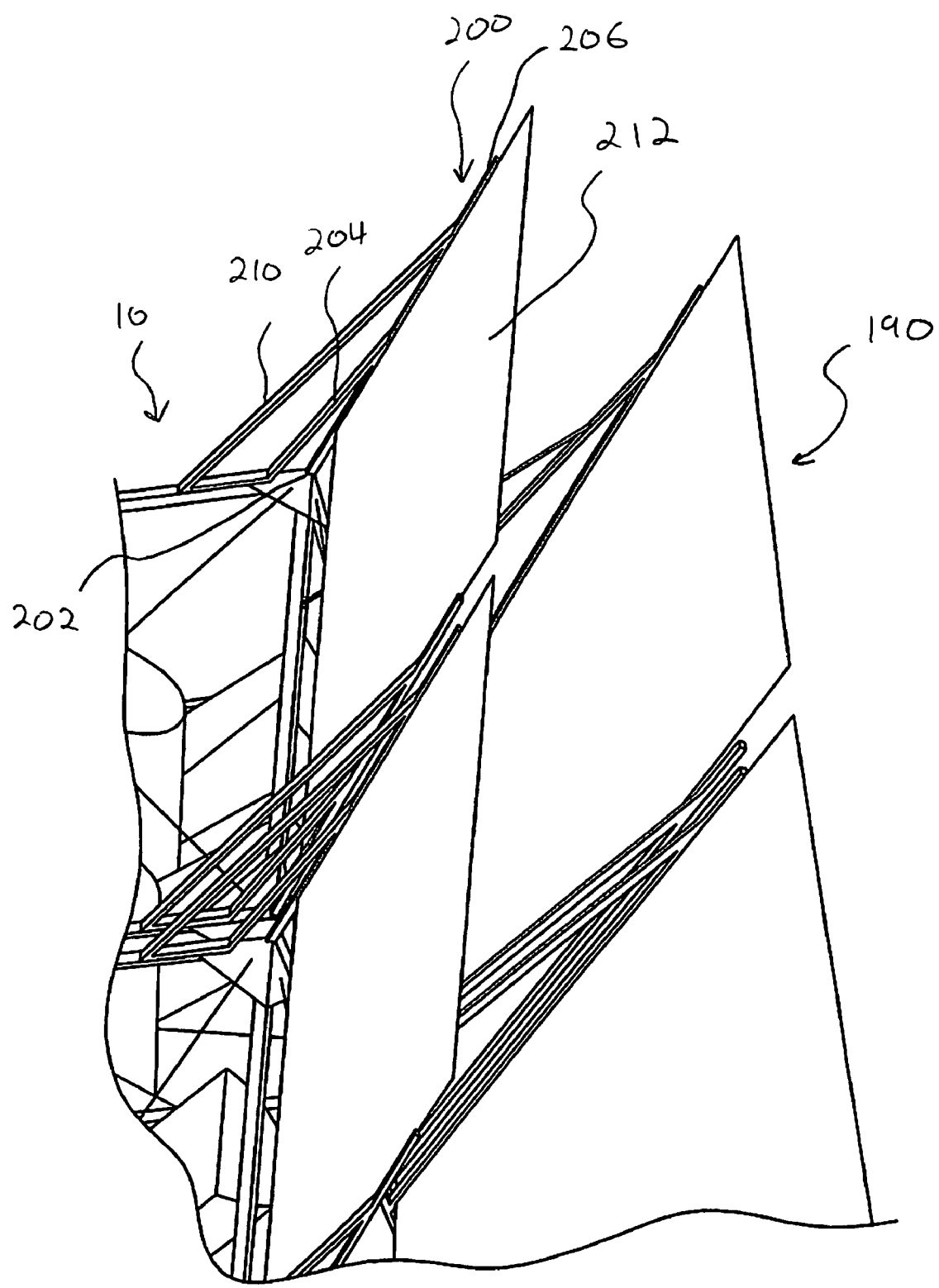
FIG. 65 is a partial perspective view of the drive module of FIG. 64.

In a second alternative embodiment, as shown in FIGS. 64 and 65, the drive module 10 includes the first baffle 190 described above along with a second baffle, 200 extending from each corner 202 of the drive module 10. The second baffle 200 includes two support systems 204, with one attached to the lower frame rails 16 and one attached to the upper frame rails 19. Each support system 204 includes a primary support 206 extending from the corner 202 and two side supports 210, each one extending to the primary support 206 from the frame rail (16, 19) on either side of the corner 202. The side supports 210 may include one or two arms. The second baffle 200 further includes a sail 212 attached between the primary supports 206. In this preferred embodiment the sail 212 does not extend all the way to the corner 202, rather it is offset from the corner 202 to increase airflow to the drive module 10 and allow flow to the first baffle 190. It is preferred that the second baffle 200 extend straight out from the corner 202 creating an angle of about 120 degrees with each side 192 extending from the corner 202; however other angles could be utilized.

The baffle systems described herein serve to funnel air toward the drive module 10. Since the baffles are on each side of the module additional wind is captured by the baffles regardless of which direction the wind is blowing.

While the principles of this invention have been described in connection with specific embodiments, it should be understood clearly that these descriptions are made only by way of example and are not intended to limit the scope of the invention.

The invention claimed is:

1. A method of making a vane assembly for use in a modular wind-driven electrical power generator, the method comprising the steps of:
providing an axial shaft;
securing a plurality of spaced-apart plates around the shaft, each plate extending radially outward from the shaft so that the shaft is balanced during shaft rotational displacement about the axis, each plate being in a separate plane substantially perpendicular to the shaft and parallel to the other planes;
providing plural sheets of bendable material, each sheet for forming a vane;
bending each sheet so that opposite ends are brought toward the other to form a vane with a closed leading side, an open trailing side, open outboard and inboard ends, and opposed upper and lower sides;
securing the upper and lower sides of each vane between two plates to form the vane assembly, each vane extending radially outward from the shaft so that the shaft is balanced during shaft rotational displacement about the axis, the closed leading side faces a direction of shaft rotation and the open trailing side faces a direction opposite to the direction of shaft rotation; and
securing an end cap over each vane outboard end.

2. The method of claim 1 further comprising mounting the axial shaft along a substantially vertical axis in a drive module having substantially open sides.

3. The method of claim 2 wherein the drive module is a frame made of a plurality of rails.

4. The method of claim 3 wherein the step of securing a plurality of spaced-apart plates includes securing five plates to the axial shaft.

5. The method of claim 3 further comprising securing a plurality of baffles spaced apart around an outside of the drive module, each baffle having a wind-directing surface which directs wind toward the vane assembly.

6. The method of claim 5 wherein the drive module has sides and a baffle is secured to each side of the drive module extending outwardly therefrom.

7. The method of claim 6 wherein two sides meet at a corner and wherein a baffle is secured to each corner of the drive module extending outwardly therefrom.

8. The method of claim 1 wherein four vanes are secured between two spaced-apart plates.

9. The method of claim 8 wherein the four vanes between the two spaced-apart plates create a first row of vanes, the method further comprising securing a row of vanes between each plate and an adjacent plate, whereby four rows of vanes are secured.

10. The method of claim 9 wherein the rows of vanes are staggered.

11. The method of claim 1 wherein the end cap is mounted at an angle between about 75 degrees and about 105 degrees to a plane defined by the open trailing side.

12. The method of claim 11 wherein the end cap is mounted at an angle of about 75 degrees to the plane defined by the open trailing side.

13. A modular wind-driven electrical power generator comprising:
   a generator module including:
      an axial drive shaft vertically mounted to the generator module;
      an electrical power generator mounted to the generator module in power-transmission relationship with the drive shaft; and
   at least one drive module stacked on the generator module, each drive module including:
      an axial shaft vertically mounted to the generator module and coupled to the drive shaft; and
      a vane assembly secured to the shaft, the vane assembly including:
         a plurality of spaced-apart plates around the shaft, each plate extending radially outward from the shaft so that the shaft is balanced during shaft rotational displacement about the axis, each plate being in a separate plane substantially perpendicular to the shaft and parallel to the other planes; and
         vanes extending radially outward between two plates from the shaft so that the shaft is balanced during shaft rotational displacement about the axis, each vane having a closed leading side facing a direction of shaft rotation, an open trailing side facing a direction opposite to shaft rotation, an open inboard end and a closed outboard end disposed at an angle of about 75 degrees to a plane defined by the open trailing side, each vane defining a flow path permitting air to pass through the vane open trailing side through the open inboard end and to the open inboard end of an adjacent vane.

14. The modular wind-driven electrical power generator of claim 13 wherein there are five spaced apart plates.

15. The modular wind-driven electrical power generator of claim 13 wherein the at least one drive module is a frame made of a plurality of rails.

16. The modular wind-driven electrical power generator of claim 13 further comprising a plurality of baffles spaced apart around an outside of the at least one drive module, each baffle having a wind-directing surface which directs wind toward the vane assembly.

17. The modular wind-driven electrical power generator of claim 16 wherein the at least one drive module has sides and a baffle is secured with respect to each side of the at least one drive module extending outwardly therefrom.

18. The modular wind-driven electrical power generator of claim 17 wherein two sides of the at least one drive module meet at a corner and wherein a baffle is secured with respect to each corner of the at least one drive module extending outwardly therefrom.

19. The modular wind-driven electrical power generator of claim 13 wherein the at least one drive module comprises a plurality of drive modules stacked on each other.

* * * * *